US012596520B2

(12) United States Patent
Carrigan et al.

(10) Patent No.:  US 12,596,520 B2
(45) Date of Patent:        Apr. 7, 2026

(54) MEDIA CONTROLS USER INTERFACE

(71) Applicant: Apple Inc., Cupertino, CA (US)

(72) Inventors: Taylor G. Carrigan, San Francisco, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/941,961

(22) Filed: Sep. 9, 2022

(65) Prior Publication Data

US 2023/0098814 A1      Mar. 30, 2023

Related U.S. Application Data

(60) Provisional application No. 63/248,385, filed on Sep. 24, 2021.

(51) Int. Cl.
G06F 3/16              (2006.01)

(52) U.S. Cl.
CPC ................................... G06F 3/165 (2013.01)

(58) Field of Classification Search
None
See application file for complete search history.

(56) References Cited

U.S. PATENT DOCUMENTS

| | | | |
|---|---|---|---|
| 5,202,961 | A | 4/1993 | Mills et al. |
| 6,140,987 | A | 10/2000 | Stein et al. |
| 6,504,934 | B1 | 1/2003 | Kasai et al. |

| | | | |
|---|---|---|---|
| 7,571,014 | B1 | 8/2009 | Lambourne et al. |
| 7,656,393 | B2 | 2/2010 | King et al. |
| 7,730,223 | B1 | 6/2010 | Bavor et al. |
| 8,028,323 | B2 | 9/2011 | Weel |
| 8,196,043 | B2 | 6/2012 | Crow et al. |
| 8,234,395 | B2 | 7/2012 | Millington |
| 8,290,603 | B1 | 10/2012 | Lambourne |
| 8,458,780 | B1 | 6/2013 | Takkallapally et al. |
| 9,042,556 | B2 | 5/2015 | Kallai et al. |
| 9,084,003 | B1 | 7/2015 | Sanio et al. |
| 9,112,849 | B1 | 8/2015 | Werkelin Ahlin et al. |
| 9,134,902 | B2 | 9/2015 | Kang et al. |
| 9,202,509 | B2 | 12/2015 | Kallai et al. |
| 9,247,363 | B2 | 1/2016 | Triplett et al. |
| 9,251,787 | B1 | 2/2016 | Hart et al. |
| 9,294,853 | B1 | 3/2016 | Dhaundiyal |
| 9,319,782 | B1 | 4/2016 | Crump et al. |
| 9,374,607 | B2 | 6/2016 | Bates et al. |

(Continued)

FOREIGN PATENT DOCUMENTS

| | | |
|---|---|---|
| AU | 2007100826 A4 | 9/2007 |
| AU | 2008100011 A4 | 2/2008 |

(Continued)

OTHER PUBLICATIONS

Applicant-Initiated Interview Summary received for U.S. Appl. No. 16/922,675, mailed on Nov. 15, 2022, 2 pages.

(Continued)

*Primary Examiner* — Matthew Ell
*Assistant Examiner* — David V Luu
(74) *Attorney, Agent, or Firm* — YHE Law LLP

(57) ABSTRACT

The present disclosure generally relates to providing media playback controls to a user. In some embodiments, methods and user interfaces for displaying media playback controls are described.

42 Claims, 24 Drawing Sheets

(56) References Cited

U.S. PATENT DOCUMENTS

| | | | |
|---|---|---|---|
| D765,118 S | 8/2016 | Bachman et al. | |
| 9,431,021 B1 | 8/2016 | Scalise et al. | |
| 9,450,812 B2 | 9/2016 | Lee et al. | |
| 9,459,786 B2 | 10/2016 | Thakur et al. | |
| D773,510 S | 12/2016 | Foss et al. | |
| 9,519,413 B2 | 12/2016 | Bates | |
| 9,582,178 B2 | 2/2017 | Grant et al. | |
| 9,588,661 B1 | 3/2017 | Jauhal et al. | |
| 9,628,414 B1 | 4/2017 | Umapathy et al. | |
| D789,381 S | 6/2017 | Okumura et al. | |
| 9,680,982 B2 | 6/2017 | Fiedler | |
| 9,710,639 B1 | 7/2017 | Saini | |
| 9,727,749 B2 | 8/2017 | Tzeng et al. | |
| 9,779,613 B2 * | 10/2017 | Bates | G08B 25/008 |
| 9,794,720 B1 | 10/2017 | Kadri | |
| 9,820,323 B1 | 11/2017 | Young et al. | |
| 9,846,564 B1 * | 12/2017 | Toksoz | H04R 3/12 |
| 9,898,250 B1 | 2/2018 | Williams et al. | |
| 9,954,989 B2 | 4/2018 | Zhou | |
| 10,055,094 B2 | 8/2018 | Li et al. | |
| 10,104,089 B2 | 10/2018 | Kim et al. | |
| 10,129,044 B2 | 11/2018 | Kangshang et al. | |
| 10,142,122 B1 | 11/2018 | Hill et al. | |
| 10,198,563 B2 | 2/2019 | Wang et al. | |
| 10,237,141 B2 | 3/2019 | Sasaki et al. | |
| 10,284,980 B1 | 5/2019 | Woo et al. | |
| 10,303,422 B1 | 5/2019 | Woo et al. | |
| 10,310,725 B2 | 6/2019 | Smith et al. | |
| 10,374,804 B2 | 8/2019 | Lee et al. | |
| 10,436,977 B2 | 10/2019 | Bergman et al. | |
| 10,454,781 B2 | 10/2019 | Sasaki et al. | |
| 10,511,456 B2 | 12/2019 | Smith et al. | |
| 10,713,699 B1 | 7/2020 | Lien et al. | |
| 10,732,819 B2 | 8/2020 | Wang et al. | |
| 10,742,645 B2 | 8/2020 | Hevizi et al. | |
| 10,742,648 B2 | 8/2020 | Magyar et al. | |
| 10,779,085 B1 | 9/2020 | Carrigan | |
| 10,824,299 B2 | 11/2020 | Bai | |
| 10,833,887 B2 | 11/2020 | Wu | |
| 11,157,143 B2 | 10/2021 | Yang et al. | |
| 11,343,370 B1 | 5/2022 | Gordon et al. | |
| 11,431,834 B1 | 8/2022 | Gordon et al. | |
| 11,449,212 B2 | 9/2022 | Roard et al. | |
| 11,463,576 B1 | 10/2022 | Gordon et al. | |
| 11,900,015 B2 | 2/2024 | Kim et al. | |
| 2002/0002039 A1 | 1/2002 | Qureshey et al. | |
| 2002/0168938 A1 | 11/2002 | Chang | |
| 2004/0032955 A1 | 2/2004 | Hashimoto et al. | |
| 2004/0261010 A1 | 12/2004 | Matsuishi | |
| 2004/0264916 A1 | 12/2004 | Van et al. | |
| 2005/0233780 A1 | 10/2005 | Jani et al. | |
| 2006/0161621 A1 | 7/2006 | Rosenberg | |
| 2006/0258289 A1 | 11/2006 | Dua | |
| 2007/0027682 A1 | 2/2007 | Bennett | |
| 2007/0113294 A1 | 5/2007 | Field et al. | |
| 2007/0157097 A1 | 7/2007 | Peters et al. | |
| 2008/0081558 A1 | 4/2008 | Dunko et al. | |
| 2008/0091717 A1 | 4/2008 | Garbow et al. | |
| 2008/0122796 A1 | 5/2008 | Jobs et al. | |
| 2008/0273712 A1 | 11/2008 | Eichfeld et al. | |
| 2008/0273713 A1 | 11/2008 | Hartung et al. | |
| 2008/0285772 A1 | 11/2008 | Haulick et al. | |
| 2009/0055377 A1 | 2/2009 | Hedge et al. | |
| 2009/0066648 A1 | 3/2009 | Kerr et al. | |
| 2009/0125571 A1 | 5/2009 | Kiilerich et al. | |
| 2009/0153289 A1 | 6/2009 | Hope et al. | |
| 2009/0304205 A1 | 12/2009 | Hardacker et al. | |
| 2010/0004031 A1 | 1/2010 | Kim | |
| 2010/0017474 A1 | 1/2010 | Kandekar et al. | |
| 2010/0070490 A1 | 3/2010 | Amidon et al. | |
| 2010/0106647 A1 | 4/2010 | Raman | |
| 2010/0178873 A1 | 7/2010 | Lee et al. | |
| 2010/0284389 A1 | 11/2010 | Ramsay et al. | |
| 2010/0293598 A1 | 11/2010 | Collart et al. | |
| 2010/0296678 A1 | 11/2010 | Kuhn-Rahloff et al. | |
| 2010/0299639 A1 | 11/2010 | Ramsay et al. | |
| 2010/0318917 A1 | 12/2010 | Holladay et al. | |
| 2010/0321201 A1 | 12/2010 | Huang et al. | |
| 2011/0071656 A1 | 3/2011 | Mckiel, Jr. | |
| 2011/0106921 A1 | 5/2011 | Brown et al. | |
| 2011/0138284 A1 | 6/2011 | Wigdor et al. | |
| 2011/0159469 A1 | 6/2011 | Hwang et al. | |
| 2011/0159927 A1 | 6/2011 | Choi | |
| 2011/0283334 A1 | 11/2011 | Choi et al. | |
| 2011/0291971 A1 | 12/2011 | Masaki et al. | |
| 2012/0004920 A1 | 1/2012 | Kelly et al. | |
| 2012/0050185 A1 | 3/2012 | Davydov et al. | |
| 2012/0066632 A1 | 3/2012 | Sundermeyer et al. | |
| 2012/0115608 A1 | 5/2012 | Pfeifer et al. | |
| 2012/0178431 A1 | 7/2012 | Gold | |
| 2012/0197419 A1 | 8/2012 | Dhruv et al. | |
| 2012/0210226 A1 | 8/2012 | Mccoy et al. | |
| 2012/0222092 A1 | 8/2012 | Rabii | |
| 2012/0260169 A1 | 10/2012 | Schwartz et al. | |
| 2012/0269361 A1 | 10/2012 | Bhow et al. | |
| 2012/0272230 A1 | 10/2012 | Lee | |
| 2012/0290653 A1 | 11/2012 | Sharkey | |
| 2012/0294118 A1 | 11/2012 | Haulick et al. | |
| 2013/0022221 A1 | 1/2013 | Kallai et al. | |
| 2013/0027289 A1 | 1/2013 | Choi et al. | |
| 2013/0047084 A1 | 2/2013 | Sanders et al. | |
| 2013/0051755 A1 | 2/2013 | Brown et al. | |
| 2013/0053107 A1 | 2/2013 | Kang et al. | |
| 2013/0073584 A1 | 3/2013 | Kuper et al. | |
| 2013/0080516 A1 | 3/2013 | Bologh | |
| 2013/0080955 A1 | 3/2013 | Reimann et al. | |
| 2013/0094666 A1 | 4/2013 | Haaff et al. | |
| 2013/0094770 A1 | 4/2013 | Lee et al. | |
| 2013/0113822 A1 | 5/2013 | Putrevu et al. | |
| 2013/0124207 A1 | 5/2013 | Sarin et al. | |
| 2013/0138272 A1 | 5/2013 | Louise-Babando et al. | |
| 2013/0141378 A1 | 6/2013 | Yumiki et al. | |
| 2013/0159858 A1 | 6/2013 | Joffray et al. | |
| 2013/0162411 A1 | 6/2013 | Moses et al. | |
| 2013/0173794 A1 | 7/2013 | Agerbak et al. | |
| 2013/0191454 A1 | 7/2013 | Oliver et al. | |
| 2013/0194476 A1 | 8/2013 | Shimosato | |
| 2013/0205375 A1 | 8/2013 | Woxblom et al. | |
| 2013/0246522 A1 | 9/2013 | Bilinski et al. | |
| 2013/0246916 A1 | 9/2013 | Reimann et al. | |
| 2013/0268593 A1 | 10/2013 | Parekh | |
| 2013/0275881 A1 | 10/2013 | Hahm et al. | |
| 2013/0283161 A1 | 10/2013 | Reimann et al. | |
| 2013/0305354 A1 | 11/2013 | King et al. | |
| 2013/0322634 A1 | 12/2013 | Bennett et al. | |
| 2013/0324081 A1 | 12/2013 | Gargi et al. | |
| 2013/0329924 A1 | 12/2013 | Fleizach et al. | |
| 2013/0346859 A1 | 12/2013 | Bates et al. | |
| 2013/0346892 A1 | 12/2013 | Wren et al. | |
| 2013/0347022 A1 | 12/2013 | Bates et al. | |
| 2014/0037107 A1 | 2/2014 | Marino et al. | |
| 2014/0046444 A1 | 2/2014 | Reimann | |
| 2014/0047020 A1 | 2/2014 | Matus et al. | |
| 2014/0049447 A1 * | 2/2014 | Choi | G06F 3/1423 |
| | | | 345/1.2 |
| 2014/0053281 A1 | 2/2014 | Benoit et al. | |
| 2014/0075311 A1 | 3/2014 | Boettcher et al. | |
| 2014/0080416 A1 | 3/2014 | Seo et al. | |
| 2014/0114966 A1 | 4/2014 | Bilinski et al. | |
| 2014/0143737 A1 | 5/2014 | Mistry et al. | |
| 2014/0176298 A1 | 6/2014 | Kumar et al. | |
| 2014/0181202 A1 | 6/2014 | Gossain | |
| 2014/0181654 A1 | 6/2014 | Kumar et al. | |
| 2014/0181658 A1 | 6/2014 | Kumar et al. | |
| 2014/0207707 A1 | 7/2014 | Na et al. | |
| 2014/0233755 A1 | 8/2014 | Kim et al. | |
| 2014/0236325 A1 | 8/2014 | Sasaki et al. | |
| 2014/0237361 A1 | 8/2014 | Martin et al. | |
| 2014/0267002 A1 | 9/2014 | Luna | |
| 2014/0267911 A1 | 9/2014 | Grant et al. | |
| 2014/0270183 A1 | 9/2014 | Luna | |
| 2014/0319232 A1 | 10/2014 | Gourlay et al. | |
| 2014/0334644 A1 | 11/2014 | Selig et al. | |
| 2014/0335789 A1 | 11/2014 | Cohen et al. | |

(56) References Cited

U.S. PATENT DOCUMENTS

| | | |
|---|---|---|
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0380234 A1 | 12/2014 | Shim et al. |
| 2015/0032812 A1 | 1/2015 | Dudley |
| 2015/0033361 A1 | 1/2015 | Choi et al. |
| 2015/0052222 A1 | 2/2015 | Farrell et al. |
| 2015/0067803 A1 | 3/2015 | Alduaiji |
| 2015/0081072 A1 | 3/2015 | Kallai et al. |
| 2015/0085057 A1 | 3/2015 | Ouyang et al. |
| 2015/0086041 A1 | 3/2015 | Reimann |
| 2015/0089359 A1 | 3/2015 | Brisebois |
| 2015/0094865 A1 | 4/2015 | Choi et al. |
| 2015/0100623 A1 | 4/2015 | Gudell et al. |
| 2015/0113407 A1 | 4/2015 | Hoffert et al. |
| 2015/0130737 A1 | 5/2015 | Im et al. |
| 2015/0138101 A1 | 5/2015 | Park et al. |
| 2015/0149599 A1 | 5/2015 | Caunter et al. |
| 2015/0189426 A1 | 7/2015 | Pang |
| 2015/0193130 A1 | 7/2015 | Cho et al. |
| 2015/0200715 A1 | 7/2015 | Oiwa et al. |
| 2015/0205511 A1 | 7/2015 | Vinna et al. |
| 2015/0205971 A1 | 7/2015 | Sanio et al. |
| 2015/0212705 A1 | 7/2015 | Sasaki et al. |
| 2015/0215382 A1 | 7/2015 | Arora et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229782 A1 | 8/2015 | Zuidema et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248268 A1 | 9/2015 | Kumar et al. |
| 2015/0253960 A1 | 9/2015 | Lin et al. |
| 2015/0256957 A1 | 9/2015 | Kim et al. |
| 2015/0261415 A1 | 9/2015 | Lee et al. |
| 2015/0261493 A1 | 9/2015 | Lemmon et al. |
| 2015/0286360 A1 | 10/2015 | Wachter |
| 2015/0309768 A1 | 10/2015 | Van Der Heide |
| 2015/0312299 A1 | 10/2015 | Chen |
| 2015/0319046 A1 | 11/2015 | Plummer et al. |
| 2015/0324552 A1 | 11/2015 | Beckhardt |
| 2015/0347738 A1 | 12/2015 | Ulrich et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0370455 A1 | 12/2015 | Van Os et al. |
| 2015/0378522 A1 | 12/2015 | Butts |
| 2016/0004417 A1 | 1/2016 | Bates |
| 2016/0004499 A1 | 1/2016 | Kim et al. |
| 2016/0011850 A1 | 1/2016 | Sheen et al. |
| 2016/0026429 A1 | 1/2016 | Triplett |
| 2016/0043962 A1 | 2/2016 | Kim et al. |
| 2016/0048705 A1 | 2/2016 | Yang |
| 2016/0062487 A1 | 3/2016 | Foss et al. |
| 2016/0062567 A1 | 3/2016 | Yang et al. |
| 2016/0062606 A1 | 3/2016 | Vega et al. |
| 2016/0070244 A1 | 3/2016 | Cipollo et al. |
| 2016/0073197 A1 | 3/2016 | Hammer et al. |
| 2016/0073482 A1 | 3/2016 | Fok et al. |
| 2016/0077734 A1 | 3/2016 | Buxton et al. |
| 2016/0088039 A1 | 3/2016 | Millington et al. |
| 2016/0092072 A1 | 3/2016 | So et al. |
| 2016/0127799 A1 | 5/2016 | Alsina et al. |
| 2016/0134942 A1 | 5/2016 | Lo |
| 2016/0139752 A1 | 5/2016 | Shim et al. |
| 2016/0150624 A1 | 5/2016 | Meerbeek et al. |
| 2016/0155443 A1 | 6/2016 | Khan et al. |
| 2016/0156687 A1 | 6/2016 | Leung |
| 2016/0156957 A1 | 6/2016 | Yun |
| 2016/0156992 A1 | 6/2016 | Kuper |
| 2016/0162252 A1 | 6/2016 | Di Censo et al. |
| 2016/0173318 A1 | 6/2016 | Ha et al. |
| 2016/0183046 A1 | 6/2016 | Kwon |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209058 A1 | 7/2016 | Golden et al. |
| 2016/0209939 A1 | 7/2016 | Zambetti et al. |
| 2016/0210983 A1 | 7/2016 | Amada et al. |
| 2016/0239167 A1 | 8/2016 | Reimann et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0267319 A1 | 9/2016 | Murillo et al. |
| 2016/0291924 A1 | 10/2016 | Bierbower et al. |
| 2016/0294896 A1 | 10/2016 | O'Driscoll et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0320849 A1 | 11/2016 | Koo |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0350839 A1 | 12/2016 | Avidor et al. |
| 2016/0351191 A1 | 12/2016 | Vilermo et al. |
| 2016/0357507 A1 | 12/2016 | Decker et al. |
| 2016/0360344 A1 | 12/2016 | Shim et al. |
| 2016/0364600 A1 | 12/2016 | Shah et al. |
| 2016/0366481 A1 | 12/2016 | Lim et al. |
| 2016/0366531 A1 | 12/2016 | Popova |
| 2016/0372113 A1 | 12/2016 | David et al. |
| 2016/0378424 A1* | 12/2016 | Kanda ..................... G06F 3/013 700/275 |
| 2016/0381476 A1 | 12/2016 | Gossain et al. |
| 2017/0003931 A1 | 1/2017 | Dvortsov et al. |
| 2017/0010794 A1 | 1/2017 | Cho et al. |
| 2017/0013562 A1 | 1/2017 | Lim et al. |
| 2017/0017531 A1 | 1/2017 | Choi et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0041727 A1 | 2/2017 | Reimann |
| 2017/0046025 A1 | 2/2017 | Dascola et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134567 A1 | 5/2017 | Jeon et al. |
| 2017/0142087 A1 | 5/2017 | Maninder et al. |
| 2017/0147129 A1 | 5/2017 | Kyoun et al. |
| 2017/0193813 A1 | 7/2017 | Carroll et al. |
| 2017/0195772 A1 | 7/2017 | Han et al. |
| 2017/0206779 A1 | 7/2017 | Lee et al. |
| 2017/0235545 A1 | 8/2017 | Millington et al. |
| 2017/0242653 A1 | 8/2017 | Lang et al. |
| 2017/0251314 A1 | 8/2017 | Pye et al. |
| 2017/0285788 A1 | 10/2017 | Park et al. |
| 2017/0357420 A1 | 12/2017 | Dye et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0359189 A1 | 12/2017 | Smith et al. |
| 2017/0371535 A1 | 12/2017 | Li et al. |
| 2018/0039916 A1 | 2/2018 | Ravindra |
| 2018/0040324 A1 | 2/2018 | Wilberding |
| 2018/0067712 A1 | 3/2018 | Behzadi et al. |
| 2018/0070187 A1 | 3/2018 | Drinkwater et al. |
| 2018/0096064 A1 | 4/2018 | Lennon et al. |

(56) References Cited

U.S. PATENT DOCUMENTS

| | | | |
|---|---|---|---|
| 2018/0139292 A1 | 5/2018 | Koren et al. | |
| 2018/0190279 A1 | 7/2018 | Anderson et al. | |
| 2018/0199137 A1 | 7/2018 | Mate et al. | |
| 2018/0217709 A1 | 8/2018 | Hotelling | |
| 2018/0329585 A1 | 11/2018 | Carrigan et al. | |
| 2018/0329586 A1 | 11/2018 | Sundstrom et al. | |
| 2018/0335903 A1 | 11/2018 | Coffman et al. | |
| 2018/0337924 A1 | 11/2018 | Graham et al. | |
| 2018/0341448 A1 | 11/2018 | Behzadi et al. | |
| 2018/0351762 A1 | 12/2018 | Iyengar et al. | |
| 2019/0012069 A1 | 1/2019 | Bates | |
| 2019/0012073 A1 | 1/2019 | Hwang | |
| 2019/0012966 A1 | 1/2019 | Shi | |
| 2019/0056907 A1 | 2/2019 | So et al. | |
| 2019/0058777 A1 | 2/2019 | Chen | |
| 2019/0075200 A1 | 3/2019 | Seo et al. | |
| 2019/0076084 A1* | 3/2019 | Kanegae | A61B 5/02405 |
| 2019/0102145 A1 | 4/2019 | Wilberding et al. | |
| 2019/0294406 A1 | 9/2019 | Bierbower et al. | |
| 2020/0050426 A1 | 2/2020 | Jung et al. | |
| 2020/0104018 A1 | 4/2020 | Coffman et al. | |
| 2020/0154583 A1 | 5/2020 | Lee et al. | |
| 2020/0201491 A1 | 6/2020 | Coffman et al. | |
| 2020/0201495 A1 | 6/2020 | Coffman et al. | |
| 2020/0218486 A1 | 7/2020 | Behzadi et al. | |
| 2020/0225817 A1 | 7/2020 | Coffman et al. | |
| 2020/0326811 A1 | 10/2020 | Nolan et al. | |
| 2020/0348830 A1* | 11/2020 | Bates | H04N 21/4325 |
| 2020/0379711 A1 | 12/2020 | Graham et al. | |
| 2020/0379714 A1 | 12/2020 | Graham et al. | |
| 2020/0379716 A1 | 12/2020 | Carrigan et al. | |
| 2020/0379729 A1 | 12/2020 | Graham et al. | |
| 2020/0379730 A1 | 12/2020 | Graham et al. | |
| 2020/0382332 A1 | 12/2020 | Carrigan et al. | |
| 2020/0413197 A1 | 12/2020 | Carrigan et al. | |
| 2021/0011588 A1 | 1/2021 | Coffman et al. | |
| 2021/0255816 A1 | 8/2021 | Behzadi et al. | |
| 2021/0255819 A1 | 8/2021 | Graham et al. | |
| 2021/0263702 A1 | 8/2021 | Carrigan | |
| 2021/0392223 A1 | 12/2021 | Coffman et al. | |
| 2021/0407507 A1 | 12/2021 | Zhou et al. | |
| 2022/0100367 A1 | 3/2022 | Carrigan et al. | |
| 2022/0121342 A1 | 4/2022 | Chundi et al. | |
| 2022/0229524 A1 | 7/2022 | McKenzie et al. | |
| 2022/0279063 A1 | 9/2022 | Coffman et al. | |
| 2022/0286549 A1 | 9/2022 | Coffman et al. | |
| 2022/0291832 A1* | 9/2022 | Bi | G06F 9/5011 |
| 2022/0303383 A1 | 9/2022 | Coffman et al. | |
| 2022/0350482 A1 | 11/2022 | Carrigan et al. | |
| 2023/0073844 A1 | 3/2023 | Coffman et al. | |
| 2023/0084551 A1 | 3/2023 | Coffman et al. | |
| 2023/0104819 A1 | 4/2023 | Coffman et al. | |
| 2023/0106600 A1 | 4/2023 | Coffman et al. | |
| 2023/0106761 A1 | 4/2023 | Coffman et al. | |
| 2023/0266866 A1 | 8/2023 | Bates et al. | |
| 2023/0393809 A1 | 12/2023 | Carrigan et al. | |
| 2023/0403509 A1 | 12/2023 | Carrigan et al. | |
| 2023/0409191 A1 | 12/2023 | Carrigan et al. | |
| 2024/0080642 A1 | 3/2024 | Carrigan et al. | |
| 2024/0406632 A1 | 12/2024 | Carrigan et al. | |
| 2024/0419322 A1 | 12/2024 | Carrigan et al. | |
| 2025/0165216 A1 | 5/2025 | Carrigan et al. | |

FOREIGN PATENT DOCUMENTS

| | | | |
|---|---|---|---|
| CN | 1863281 A | 11/2006 | |
| CN | 102281294 A | 12/2011 | |
| CN | 102301323 A | 12/2011 | |
| CN | 102740146 A | 10/2012 | |
| CN | 102968267 A | 3/2013 | |
| CN | 103260079 A | 8/2013 | |
| CN | 103593154 A | 2/2014 | |
| CN | 103795866 A | 5/2014 | |
| CN | 103914238 A | 7/2014 | |
| CN | 103997366 A | 8/2014 | |
| CN | 104106036 A | 10/2014 | |
| CN | 104583998 A | 4/2015 | |
| CN | 104584061 A | 4/2015 | |
| CN | 104956276 A | 9/2015 | |
| CN | 105051676 A | 11/2015 | |
| CN | 105374192 A | 3/2016 | |
| CN | 105474580 A | 4/2016 | |
| CN | 105549947 A | 5/2016 | |
| CN | 105657465 A | 6/2016 | |
| CN | 105745863 A | 7/2016 | |
| CN | 105794231 A | 7/2016 | |
| CN | 105830015 A | 8/2016 | |
| CN | 105900376 A | 8/2016 | |
| CN | 105940678 A | 9/2016 | |
| CN | 106030700 A | 10/2016 | |
| CN | 106062810 A | 10/2016 | |
| CN | 106134209 A | 11/2016 | |
| CN | 106170783 A | 11/2016 | |
| CN | 103914238 B | 2/2017 | |
| CN | 106383645 A | 2/2017 | |
| CN | 106416142 A | 2/2017 | |
| CN | 107077288 A | 8/2017 | |
| CN | 107250949 A | 10/2017 | |
| CN | 107533368 A | 1/2018 | |
| CN | 107683470 A | 2/2018 | |
| CN | 107819928 A | 3/2018 | |
| CN | 107949879 A | 4/2018 | |
| CN | 104012150 B | 5/2018 | |
| CN | 108289239 A | 7/2018 | |
| CN | 108958608 A | 12/2018 | |
| CN | 109117078 A | 1/2019 | |
| CN | 109196825 A | 1/2019 | |
| CN | 109287140 A | 1/2019 | |
| CN | 109302531 A | 2/2019 | |
| CN | 109314795 A | 2/2019 | |
| CN | 109348052 A | 2/2019 | |
| CN | 109461462 A | 3/2019 | |
| CN | 109584879 A | 4/2019 | |
| CN | 109688441 A | 4/2019 | |
| CN | 109688442 A | 4/2019 | |
| CN | 109584879 B | 7/2021 | |
| CN | 113835583 A | 12/2021 | |
| CN | 108958608 B | 7/2022 | |
| EP | 1133119 A2 | 9/2001 | |
| EP | 2018032 A1 | 1/2009 | |
| EP | 2750062 A2 | 7/2014 | |
| EP | 2770673 A1 | 8/2014 | |
| EP | 2993909 A1 | 3/2016 | |
| EP | 3038427 A1 | 6/2016 | |
| EP | 3138300 A1 | 3/2017 | |
| EP | 3163495 A1 | 5/2017 | |
| EP | 3410027 A1 | 12/2018 | |
| EP | 3420441 A1 | 1/2019 | |
| EP | 3445058 A1 | 2/2019 | |
| EP | 3038427 B1 | 12/2019 | |
| FR | 3069679 A1 | 2/2019 | |
| GB | 2341698 A | 3/2000 | |
| GB | 0412212 | 7/2004 | |
| GB | 2402105 A | 12/2004 | |
| JP | 2004-96397 A | 3/2004 | |
| JP | 2006-185154 A | 7/2006 | |
| JP | 2011-60281 A | 3/2011 | |
| JP | 2013-200879 A | 10/2013 | |
| JP | 2014-44483 A | 3/2014 | |
| JP | 2015-533441 A | 11/2015 | |
| JP | 2016-63531 A | 4/2016 | |
| JP | 2017-41008 A | 2/2017 | |
| JP | 2017-212096 A | 11/2017 | |
| KR | 10-2010-0036351 A | 4/2010 | |
| KR | 10-2014-0148289 A | 12/2014 | |
| KR | 10-2015-0031010 A | 3/2015 | |
| KR | 10-2015-0121177 A | 10/2015 | |
| KR | 10-2016-0012008 A | 2/2016 | |
| KR | 10-2016-0141847 A | 12/2016 | |
| KR | 10-2017-0008601 A | 1/2017 | |
| KR | 10-2017-0027999 A | 3/2017 | |
| KR | 10-2017-0100358 A | 9/2017 | |
| KR | 10-2018-0034637 A | 4/2018 | |
| KR | 10-2019-0002658 A | 1/2019 | |

(56) References Cited

FOREIGN PATENT DOCUMENTS

| | | | |
|---|---|---|---|
| KR | 10-2019-0014495 | A | 2/2019 |
| KR | 10-2019-0057414 | A | 5/2019 |
| KR | 10-2011177 | B1 | 8/2019 |
| WO | 2008/027924 | A2 | 3/2008 |
| WO | 2008/051472 | A1 | 5/2008 |
| WO | 2009/005563 | A1 | 1/2009 |
| WO | 2009/010827 | A2 | 1/2009 |
| WO | 2009/067670 | A1 | 5/2009 |
| WO | 2009/086599 | A1 | 7/2009 |
| WO | 2010/087988 | A1 | 8/2010 |
| WO | 2011/027964 | A1 | 3/2011 |
| WO | 2012/004288 | A1 | 1/2012 |
| WO | 2012/104288 | A1 | 8/2012 |
| WO | 2013/049346 | A1 | 4/2013 |
| WO | 2013/153405 | A2 | 10/2013 |
| WO | 2014/004180 | A1 | 1/2014 |
| WO | 2014/004182 | A1 | 1/2014 |
| WO | 2014/018242 | A1 | 1/2014 |
| WO | 2014/030320 | A1 | 2/2014 |
| WO | 2014/092980 | A1 | 6/2014 |
| WO | 2014/107469 | A2 | 7/2014 |
| WO | 2014/128800 | A1 | 8/2014 |
| WO | 2014/151089 | A1 | 9/2014 |
| WO | 2014/204960 | A1 | 12/2014 |
| WO | 2015/008409 | A1 | 1/2015 |
| WO | 2015/076930 | A1 | 5/2015 |
| WO | 2015/102572 | A1 | 7/2015 |
| WO | 2015/114690 | A1 | 8/2015 |
| WO | 2015/124831 | A1 | 8/2015 |
| WO | 2015/134692 | A1 | 9/2015 |
| WO | 2016/033400 | A1 | 3/2016 |
| WO | 2016/040405 | A1 | 3/2016 |
| WO | 2016/057117 | A1 | 4/2016 |
| WO | 2017/027526 | A1 | 2/2017 |
| WO | 2017/058293 | A1 | 4/2017 |
| WO | 2017/058442 | A1 | 4/2017 |
| WO | 2017/147081 | A1 | 8/2017 |
| WO | 2017/173155 | A1 | 10/2017 |
| WO | 2017/218143 | A1 | 12/2017 |
| WO | 2017/218192 | A1 | 12/2017 |
| WO | 2017/218199 | A1 | 12/2017 |
| WO | 2018/144339 | A2 | 8/2018 |
| WO | 2018/213401 | A1 | 11/2018 |
| WO | 2018/213415 | A1 | 11/2018 |
| WO | 2020/243691 | A1 | 12/2020 |

OTHER PUBLICATIONS

Applicant-Initiated Interview Summary received for U.S. Appl. No. 17/314,948, mailed on Oct. 21, 2022, 6 pages.
Applicant-Initiated Interview Summary received for U.S. Appl. No. 17/747,804, mailed on Mar. 17, 2023, 4 pages.
Applicant-Initiated Interview Summary received for U.S. Appl. No. 17/752,582, mailed on Apr. 17, 2023, 3 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Corrected Notice of Allowance received for U.S. Appl. No. 16/922,675, mailed on Apr. 14, 2023, 6 pages.
Corrected Notice of Allowance received for U.S. Appl. No. 16/922,675, mailed on Jan. 9, 2023, 3 pages.
Corrected Notice of Allowance received for U.S. Appl. No. 16/922,675, mailed on Jan. 20, 2023, 3 pages.
Corrected Notice of Allowance received for U.S. Appl. No. 18/077,905, mailed on Apr. 10, 2023, 2 pages.
Corrected Notice of Allowance received for U.S. Appl. No. 18/077,905, mailed on Apr. 19, 2023, 2 pages.
Corrected Notice of Allowance received for U.S. Appl. No. 18/077,905, mailed on Apr. 26, 2023, 3 pages.

Cohn Emily, "Sonos Just Fixed the Most Annoying Thing About Its iPhone App", online available at: https://www.businessinsider.com/sonos-mobile-app-works-on-lock-screen-2016-6, Jun. 27, 2016, 2 pages.
Decision to Grant received for Danish Patent Application No. PA202170320, mailed on Nov. 10, 2022, 2 pages.
Decision to Grant received for European Patent Application No. 20158824.1, mailed on Dec. 15, 2022, 3 pages.
Extended European Search Report received for European Patent Application No. 22195584.2, mailed on Jan. 5, 2023, 13 pages.
Extended European Search Report received for European Patent Application No. 22201007.6, mailed on Jan. 12, 2023, 7 pages.
Final Office Action received for U.S. Appl. No. 17/314,948, mailed on Mar. 7, 2023, 31 pages.
Final Office Action received for U.S. Appl. No. 17/747,804, mailed on Apr. 28, 2023, 17 pages.
Fingas Jon, "Sonos Puts Speaker Controls on Your iPhone's Lock Screen", online available at https://www.engadget.com/2016-06-21-sonos-ios-lock-screen-controls.html, Jun. 21, 2016, 3 pages.
Intention to Grant received for Danish Patent Application No. PA202270464, mailed on Feb. 20, 2023, 2 pages.
Intention to Grant received for European Patent Application No. 18728002.9, mailed on Apr. 12, 2023, 9 pages.
International Preliminary Report on Patentability received for PCT Patent Application No. PCT/US2021/048358, mailed on Apr. 6, 2023, 15 pages.
International Search Report and Written Opinion received for PCT Patent Application No. PCT/US2022/043733, mailed on Jan. 3, 2023, 12 pages.
Invitation to Pay Search Fees received for European Patent Application No. 20760624.5, mailed on Jan. 2, 2023, 3 pages.
Kazmucha Allyson, "Sonos Controller App for iPhone and iPad Review", online available at https://www.imore.com/sonos-controller-app-iphone-and-ipad-review, Mar. 1, 2018, 4 pages.
Minutes of Oral Proceedings received for European Patent Application No. 18728002.9, mailed on Dec. 22, 2022, 7 pages.
Non-Final Office Action received for U.S. Appl. No. 17/747,804, mailed on Mar. 1, 2023, 14 pages.
Non-Final Office Action received for U.S. Appl. No. 17/752,582, mailed on Mar. 6, 2023, 17 pages.
Non-Final Office Action received for U.S. Appl. No. 17/835,110, mailed on Apr. 3, 2023, 28 pages.
Non-Final Office Action received for U.S. Appl. No. 17/867,317, mailed on Feb. 28, 2023, 18 pages.
Non-Final Office Action received for U.S. Appl. No. 18/077,971, mailed on Apr. 3, 2023, 24 pages.
Notice of Acceptance received for Australian Patent Application No. 2021261941, mailed on Mar. 15, 2023, 3 pages.
Notice of Acceptance received for Australian Patent Application No. 2022200515, mailed on Dec. 21, 2022, 3 pages.
Notice of Acceptance received for Australian Patent Application No. 2022200901, mailed on Mar. 9, 2023, 3 pages.
Notice of Allowance received for Chinese Patent Application No. 202011450203.2, mailed on Sep. 30, 2022, 4 pages (1 page of English Translation and 3 pages of Official Copy).
Notice of Allowance received for Japanese Patent Application No. 2022-014389, mailed on Jan. 27, 2023, 4 pages (1 page of English Translation and 3 pages of Official Copy).
Notice of Allowance received for Korean Patent Application No. 10-2022-7006175, mailed on Jan. 12, 2023, 7 pages (2 pages of English Translation and 5 pages of Official Copy).
Notice of Allowance received for U.S. Appl. No. 16/888,775, mailed on Feb. 21, 2023, 5 pages.
Notice of Allowance received for U.S. Appl. No. 16/888,775, mailed on Oct. 19, 2022, 6 pages.
Notice of Allowance received for U.S. Appl. No. 16/922,675, mailed on Dec. 8, 2022, 9 pages.
Notice of Allowance received for U.S. Appl. No. 16/922,675, mailed on Mar. 22, 2023, 8 pages.
Notice of Allowance received for U.S. Appl. No. 18/077,905, mailed on Mar. 24, 2023, 18 pages.
Office Action received for Australian Patent Application No. 2021261941, mailed on Nov. 3, 2022, 3 pages.

(56) References Cited

OTHER PUBLICATIONS

Office Action received for Australian Patent Application No. 2022200515, mailed on Nov. 2, 2022, 2 pages.
Office Action received for Australian Patent Application No. 2022200901, mailed on Dec. 19, 2022, 4 pages.
Office Action received for Australian Patent Application No. 2022241590, mailed on Mar. 17, 2023, 5 pages.
Office Action received for Australian Patent Application No. 2022241590, mailed on Nov. 18, 2022, 8 pages.
Office Action received for Chinese Patent Application No. 201811539259.8, mailed on Mar. 13, 2023, 16 pages (8 pages of English Translation and 8 pages of Official Copy).
Office Action received for Chinese Patent Application No. 202110235995.X, mailed on Sep. 30, 2022, 13 pages (7 pages of English Translation and 6 pages of Official Copy).
Office Action received for Danish Patent Application No. PA202270464, mailed on Dec. 20, 2022, 3 pages.
Office Action received for Danish Patent Application No. PA202270464, mailed on Oct. 25, 2022, 9 pages.
Office Action received for European Patent Application No. 20719301.2, mailed on Jan. 24, 2023, 9 pages.
Office Action received for European Patent Application No. 20760624.5, mailed on Mar. 7, 2023, 13 pages.
Office Action received for Korean Patent Application No. 10-2022-7001521, mailed on Dec. 26, 2022, 13 pages (6 pages of English Translation and 7 pages of Official Copy).
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Summons to Attend Oral Proceedings received for European Patent Application No. 21160991.2, mailed on Oct. 19, 2022, 10 pages.
Supplemental Notice of Allowance received for U.S. Appl. No. 16/888,775, mailed on Mar. 1, 2023, 2 pages.
2017-41008, JP, A, Cited by the Japanese Patent Office in an Office Action for related Patent Application No. 2022-014389 on Jan. 27, 2023.
Office Action received for Korean Patent Application No. 10-2023-7008877, mailed on Nov. 29, 2023, 7 pages (3 pages of English Translation and 4 pages of Official Copy).
Applicant-Initiated Interview Summary received for U.S. Appl. No. 17/978,930, mailed on Mar. 13, 2024, 3 pages.
International Search Report and Written Opinion received for PCT Patent Application No. PCT/US2023/032084, mailed on Nov. 27, 2023, 10 pages.
Office Action received for Chinese Patent Application No. 202010728844.3, mailed on Jan. 27, 2024, 16 pages (8 pages of English Translation and 8 pages of Official Copy).
Office Action received for European Patent Application No. 22201007.6, mailed on Mar. 13, 2024, 4 pages.
Notice of Acceptance received for Australian Patent Application No. 2022218540, mailed on Oct. 16, 2023, 3 pages.
Notice of Allowance received for Chinese Patent Application No. 202111483033.2, mailed on Oct. 7, 2023, 4 pages (1 page of English Translation and 3 pages of Official Copy).
Notice of Allowance received for U.S. Appl. No. 18/077,891, mailed on Oct. 19, 2023, 18 pages.
Office Action received for European Patent Application No. 20719301.2, mailed on Oct. 20, 2023, 11 pages.
Office Action received for European Patent Application No. 22201007.6, mailed on Oct. 9, 2023, 5 pages.
Non-Final Office Action received for U.S. Appl. No. 17/978,930, mailed on Feb. 12, 2024, 25 pages.
Office Action received for Indian Patent Application No. 202117048581, mailed on Feb. 1, 2024, 6 pages.
Advisory Action received for U.S. Appl. No. 17/747,804, mailed on Jun. 23, 2023, 6 pages.

Applicant-Initiated Interview Summary received for U.S. Appl. No. 17/306,354, mailed on Jun. 28, 2023, 3 pages.
Applicant-Initiated Interview Summary received for U.S. Appl. No. 17/747,804, mailed on May 31, 2023, 4 pages.
Applicant-Initiated Interview Summary received for U.S. Appl. No. 17/867,317, mailed on May 30, 2023, 4 pages.
Corrected Notice of Allowance received for U.S. Appl. No. 17/019,845, mailed on Aug. 7, 2023, 4 pages.
Corrected Notice of Allowance received for U.S. Appl. No. 17/752,582, mailed on Jul. 17, 2023, 3 pages.
Corrected Notice of Allowance received for U.S. Appl. No. 18/077,905, mailed on May 4, 2023, 2 pages.
Decision to Grant received for Danish Patent Application No. PA202270464, mailed on May 9, 2023, 1 page.
Decision to Grant received for European Patent Application No. 18728002.9, mailed on Aug. 31, 2023, 4 pages.
Extended European Search Report received for European Patent Application No. 23168537.1, mailed on Jul. 25, 2023, 13 pages.
Extended European Search Report received for European patent Application No. 23191379.9, mailed on Sep. 18, 2023, 8 pages.
Non-Final Office Action received for U.S. Appl. No. 17/306,354, mailed on Jun. 2, 2023, 21 pages.
Notice of Acceptance received for Australian Patent Application No. 2022235591, mailed on Aug. 18, 2023, 3 pages.
Notice of Allowance received for U.S. Appl. No. 16/922,675, mailed on Jul. 19, 2023, 13 pages.
Notice of Allowance received for U.S. Appl. No. 17/019,845, mailed on Jun. 5, 2023, 10 pages.
Notice of Allowance received for U.S. Appl. No. 17/306,354, mailed on Jul. 24, 2023, 7 pages.
Notice of Allowance received for U.S. Appl. No. 17/752,582, mailed on Jun. 13, 2023, 18 pages.
Notice of Allowance received for U.S. Appl. No. 17/867,317, mailed on Aug. 30, 2023, 6 pages.
Notice of Allowance received for U.S. Appl. No. 17/867,317, mailed on Jul. 6, 2023, 11 pages.
Office Action received for Australian Patent Application No. 2022218540, mailed on Aug. 3, 2023, 5 pages.
Office Action received for Australian Patent Application No. 2022235591, mailed on Jun. 6, 2023, 3 pages.
Office Action received for Australian Patent Application No. 2022235591, mailed on Jun. 28, 2023, 3 pages.
Office Action received for Australian Patent Application No. 2022241590, mailed on Aug. 15, 2023, 6 pages.
Office Action received for Australian Patent Application No. 2022241590, mailed on Jun. 7, 2023, 7 pages.
Office Action received for Chinese Patent Application No. 201811539259.8, mailed on May 24, 2023, 25 pages (5 pages of English Translation and 20 pages of Official Copy).
Office Action received for European Patent Application No. 20746429.8, mailed on Sep. 20, 2023, 10 pages.
Office Action received for European Patent Application No. 21197457.1, mailed on May 30, 2023, 8 pages.
Action received for Korean Patent Application No. 10-2022-7001521, mailed on Jun. 21, 2023, 10 pages (5 page of English Translation and 5 pages of Official Copy).
Office Action received for Korean Patent Application No. 10-2022-7001521, mailed on Dec. 19, 2023, 7 pages (3 pages of English Translation and 4 pages of Official Copy).
Notice of Allowance received for Korean Patent Application No. 10-2023-7008877, mailed on Feb. 20, 2024, 7 pages (2 pages of English Translation and 5 pages of Official Copy).
Office Action received for Australian Patent Application No. 2023203357, mailed on Feb. 14, 2024, 3 pages.
Office Action received for Japanese Patent Application No. 2023-022576, mailed on Feb. 26, 2024, 10 pages (5 pages of English Translation and 5 pages of Official Copy).
Extended European Search Report received for European Patent Application No. 23190753.6, mailed on Nov. 22, 2023, 13 pages.
Notice of Acceptance received for Australian Patent Application No. 2022241590, mailed on Nov. 14, 2023, 3 pages.

(56)        References Cited

OTHER PUBLICATIONS

Office Action received for Japanese Patent Application No. 2022-129377, mailed on Nov. 10, 2023, 6 pages (3 pages of English Translation and 3 pages of Official Copy).

Summons to Attend Oral Proceedings received for European Patent Application No. 21197457.1, mailed on Nov. 23, 2023, 12 pages.

2006-185154, JP, A, Cited by Japanese Patent Office in an Office Action for related Patent Application No. 2022-129377 on Nov. 10, 2023.

2011-60281, JP, A, Cited by Japanese Patent Office in an Office Action for related Patent Application No. 2022-129377 on Nov. 10, 2023.

2015-533441, JP, A, Cited by Japanese Patent Office in an Office Action for related Patent Application 2022-129377 on Nov. 10, 2023.

Advisory Action received for U.S. Appl. No. 16/583,989, mailed on Sep. 22, 2020, 5 pages.

Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.

Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.

Applicant-Initiated Interview Summary received for U.S. Appl. No. 15/910,263, mailed on Nov. 18, 2020, 6 pages.

Applicant-Initiated Interview Summary received for U.S. Appl. No. 16/583,989, mailed on Aug. 3, 2020, 6 pages.

Applicant-Initiated Interview Summary received for U.S. Appl. No. 16/583,989, mailed on Mar. 25, 2020, 4 pages.

Applicant-Initiated Interview Summary received for U.S. Appl. No. 16/584,490, mailed on Jan. 31, 2020, 4 pages.

Applicant-Initiated Interview Summary received for U.S. Appl. No. 16/584,490, mailed on Jul. 28, 2020, 4 pages.

Applicant-Initiated Interview Summary received for U.S. Appl. No. 16/584,743, mailed on May 1, 2020, 5 pages.

Applicant-Initiated Interview Summary received for U.S. Appl. No. 16/586,002, mailed on Apr. 28, 2020, 5 pages.

Applicant-Initiated Interview Summary received for U.S. Appl. No. 16/702,968, mailed on Jul. 1, 2020, 5 pages.

Applicant-Initiated Interview Summary received for U.S. Appl. No. 16/702,968, mailed on Sep. 28, 2020, 6 pages.

Applicant-Initiated Interview Summary received for U.S. Appl. No. 16/723,583, mailed on Dec. 28, 2020, 6 pages.

Applicant-Initiated Interview Summary received for U.S. Appl. No. 16/803,849, mailed on Aug. 21, 2020, 5 pages.

Applicant-Initiated Interview Summary received for U.S. Appl. No. 16/803,849, mailed on Dec. 21, 2020, 5 pages.

Applicant-Initiated Interview Summary received for U.S. Appl. No. 16/803,849, mailed on Feb. 28, 2022, 9 pages.

Applicant-Initiated Interview Summary received for U.S. Appl. No. 16/803,849, mailed on Oct. 12, 2021, 6 pages.

Applicant-Initiated Interview Summary received for U.S. Appl. No. 16/807,604, mailed on Dec. 21, 2020, 7 pages.

Applicant-Initiated Interview Summary received for U.S. Appl. No. 16/807,604, mailed on Jul. 24, 2020, 5 pages.

Applicant-Initiated Interview Summary received for U.S. Appl. No. 16/836,571, mailed on Jul. 7, 2021, 6 pages.

Applicant-Initiated Interview Summary received for U.S. Appl. No. 16/922,675, mailed on Dec. 16, 2020, 3 pages.

Applicant-Initiated Interview Summary received for U.S. Appl. No. 16/922,675, mailed on Nov. 2, 2020, 3 pages.

Applicant-Initiated Interview Summary received for U.S. Appl. No. 16/922,675, mailed on Sep. 3, 2021, 2 pages.

Applicant-Initiated Interview Summary received for U.S. Appl. No. 17/031,833, mailed on Dec. 21, 2020, 5 pages.

Applicant-Initiated Interview Summary received for U.S. Appl. No. 17/031,833, mailed on May 24, 2021, 6 pages.

Applicant-Initiated Interview Summary received for U.S. Appl. No. 17/168,069, mailed on Nov. 17, 2021, 2 pages.

Applicant-Initiated Interview Summary received for U.S. Appl. No. 17/461,103, mailed on Jan. 26, 2022, 6 pages.

Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.

Boxer David, "Change the permissions of the Google Drive file or folder or Share the file or folder", Blake School Website, Online Available at: https://support.blakeschool.org/hc/en-US/articles/231790648-Change-the-permissions-of-the-Google-Drive-file-or-folder-or-Share-the-file-or-folder, Oct. 31, 2016, 2 pages.

Brief Communication Regarding Oral Proceedings received for European Patent Application No. 18197583.0, mailed on Feb. 18, 2021, 2 pages.

Brief Communication Regarding Oral Proceedings received for European Patent Application No. 20158824.1, mailed on May 30, 2022, 1 page.

Call Me, "Samsung R3 speaker gives you a delicious 360 degree sound experience—with WiFi and Bluetooth | Call me", 0:24 / 3:22, Available Online at: <https://www.youtube.com/watch?v=4Uv_sOhrlro>, Sep. 22, 2016, 3 pages.

COMPUTERADV, "Sonos App Navigation & Menu on iPhone", Available online at: https://www.youtube.com/watch?v=Jhz9XvWQ204, Aug. 4, 2015, 1 page.

Corrected Notice of Allowance received for U.S. Appl. No. 15/910,263, mailed on Feb. 10, 2021, 3 pages.

Corrected Notice of Allowance received for U.S. Appl. No. 15/910,263, mailed on Mar. 17, 2021, 3 pages.

Corrected Notice of Allowance received for U.S. Appl. No. 15/910,263, mailed on Mar. 18, 2021, 3 pages.

Corrected Notice of Allowance received for U.S. Appl. No. 16/584,743, mailed on Dec. 30, 2020, 3 pages.

Corrected Notice of Allowance received for U.S. Appl. No. 16/702,968, mailed on Jun. 8, 2021, 3 pages.

Corrected Notice of Allowance received for U.S. Appl. No. 16/702,968, mailed on Jun. 16, 2021, 4 pages.

Corrected Notice of Allowance received for U.S. Appl. No. 16/702,968, mailed on Jun. 28, 2021, 4 pages.

Corrected Notice of Allowance received for U.S. Appl. No. 16/702,968, mailed on May 26, 2021, 4 pages.

Corrected Notice of Allowance received for U.S. Appl. No. 16/702,966, mailed on May 28, 2021, 4 pages.

Corrected Notice of Allowance received for U.S. Appl. No. 16/803,849, mailed on Jul. 7, 2022, 3 pages.

Corrected Notice of Allowance received for U.S. Appl. No. 16/803,849, mailed on Jun. 8, 2022, 3 pages.

Corrected Notice of Allowance received for U.S. Appl. No. 16/807,604, mailed on Jul. 26, 2021, 3 pages.

Corrected Notice of Allowance received for U.S. Appl. No. 16/807,604, mailed on Jun. 28, 2021, 3 pages.

Corrected Notice of Allowance received for U.S. Appl. No. 16/807,604, mailed on May 28, 2021, 3 pages.

Corrected Notice of Allowance received for U.S. Appl. No. 16/807,604, mailed on Oct. 4, 2021, 5 pages.

Corrected Notice of Allowance received for U.S. Appl. No. 16/807,604, mailed on Oct. 14, 2021, 3 pages.

Corrected Notice of Allowance received for U.S. Appl. No. 16/807,604, mailed on Oct. 22, 2021, 3 pages.

Corrected Notice of Allowance received for U.S. Appl. No. 16/836,571, mailed on Dec. 6, 2021, 5 pages.

Corrected Notice of Allowance received for U.S. Appl. No. 16/836,571, mailed on Mar. 25, 2022, 2 pages.

Corrected Notice of Allowance received for U.S. Appl. No. 16/836,571, mailed on Nov. 4, 2021, 4 pages.

Corrected Notice of Allowance received for U.S. Appl. No. 16/836,571, mailed on Nov. 18, 2021, 3 pages.

Corrected Notice of Allowance received for U.S. Appl. No. 16/836,571, mailed on Oct. 12, 2021, 4 pages.

Corrected Notice of Allowance received for U.S. Appl. No. 16/922,675, mailed on Mar. 4, 2022, 6 pages.

(56) References Cited

OTHER PUBLICATIONS

Corrected Notice of Allowance received for U.S. Appl. No. 17/031,833, mailed on Aug. 2, 2021, 3 pages.
Corrected Notice of Allowance received for U.S. Appl. No. 17/168,069, mailed on Feb. 9, 2022, 2 pages.
Corrected Notice of Allowance received for U.S. Appl. No. 17/461,103, mailed on Apr. 14, 2022, 2 pages.
Corrected Notice of Allowance received for U.S. Appl. No. 17/461,103, mailed on Aug. 3, 2022, 2 pages.
Corrected Notice of Allowance received for U.S. Appl. No. 17/461,103, mailed on May 10, 2022, 2 pages.
Crutnacker, "Amazon Echo Tips and Tricks: Playing Music Demonstration", Available Online at: https://www.youtube.com/watch?v=W_bqq2ynUll, Nov. 4, 2015, 1 page.
Customize Notifications and Content on Your Galaxy Phone's Lock Screen, Online Available at: https://www.samsung.com/us/support/answer/ANS00062636, Oct. 4, 2017, 5 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA202070560, mailed on Oct. 21, 2021, 2 pages.
Decision to Grant received for European Patent Application No. 18197583.0, mailed on Feb. 3, 2022, 3 pages.
Decision to Grant received for European Patent Application No. 18197589.7, mailed on Jun. 10, 2021, 2 pages.
Decision to Grant received for European Patent Application No. 19207753.5, mailed on Jun. 2, 2022, 3 pages.
Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.
Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 21160991.2, mailed on Jul. 16, 2021, 14 pages.
Extended European Search Report received for European Patent Application No. 21197457.1, mailed on Nov. 15, 2021, 8 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 15/910,263, mailed on Aug. 28, 2019, 32 pages.
Final Office Action received for U.S. Appl. No. 16/583,989, mailed on Jul. 10, 2020, 23 pages.
Final Office Action received for U.S. Appl. No. 16/584,490, mailed on May 1, 2020, 48 pages.
Final Office Action received for U.S. Appl. No. 16/702,968, mailed on Jul. 27, 2020, 21 pages.
Final Office Action received for U.S. Appl. No. 16/723,583, mailed on Feb. 5, 2021, 15 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 16/922,675, mailed on Dec. 3, 2020, 21 pages.
Final Office Action received for U.S. Appl. No. 16/922,675, mailed on Nov. 30, 2020, 12 pages.

Final Office Action received for U.S. Appl. No. 17/031,833, mailed on Jan. 26, 2021, 17 pages.
Gil Lory, "How to control Apple TV with your Apple Watch", Available online at: https://www.imore.com/how-control-your-apple-tv-remote-app%ADapple-watch], Jun. 6, 2016, 24 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
HOBBYISTSOFTWARELTD, "VLC Remote", Online available at: https://watchaware.com/watch-apps/297244048, 2016, 7 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA202070560, mailed on Apr. 26, 2021, 2 pages.
Intention to Grant received for Danish Patent Application No. PA202170320, mailed on Jul. 27, 2022, 2 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 20158824.1, mailed on Aug. 11, 2022, 10 pages.
International Preliminary Report on Patentability received for PCT Patent Application No. PCT/US2018/032904, mailed on Nov. 28, 2019, 14 pages.
International Preliminary Report on Patentability received for PCT Patent Application No. PCT/US2020/024390, mailed on Dec. 9, 2021, 20 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2020/035488, mailed on Dec. 9, 2021, 16 pages.
International Search Report and Written Opinion received for PCT Patent Application No. PCT/US2018/032904, mailed on Oct. 1, 2018, 21 pages.
International Search Report and written Opinion received for PCT Patent Application No. PCT/US2020/024390, mailed on Aug. 17, 2020, 22 pages.
International Search Report and Written Opinion received for PCT Patent Application No. PCT/US2020/024390, mailed on Oct. 23, 2020, 26 pages.

(56) References Cited

OTHER PUBLICATIONS

International Search Report and Written Opinion received for PCT Patent Application No. PCT/US2020/035446, mailed on Nov. 10, 2020, 20 pages.
International Search Report and Written Opinion received for PCT Patent Application No. PCT/US2020/035488, mailed on Nov. 17, 2020, 21 pages.
International Search Report and Written Opinion received for PCT Patent Application No. PCT/US2021/048358, mailed on Feb. 24, 2022, 21 pages.
Invitation to Pay Addition Fees and Partial International Search Report received for PCT Patent Application No. PCT/US2018/032904, mailed on Jul. 31, 2018, 18 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2020/035446, mailed on Sep. 11, 2020, 12 pages.
Invitation to Pay Additional Fees received for PCT Patent Application No. PCT/US2020/035488, mailed on Sep. 23, 2020, 15 pages.
Invitation to Pay Additional Fees received for PCT Patent Application No. PCT/US2021/048358, mailed on Dec. 23, 2021, 14 pages.
Invitation to Pay Search Fees received for European Patent Application No. 18728002.9, mailed on Sep. 2, 2020, 8 pages.
Invitation to Pay Search Fees received for European Patent Application No. 20719301.2, mailed on Dec. 17, 2020, 5 pages.
Jarvie, "Alexa plays me music", Available online at: https://www.youtube.com/watch?v=bR2ZC8Sy8YQ, Feb. 23, 2015, 1 page.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Minutes of the Oral Proceedings received for European Patent Application No. 18197583.0, mailed on Mar. 9, 2021, 6 pages.
NBC News, "NBC News—YouTube Democratic Debate (full)", Online available at:- https://www.youtube.com/watch?v=ti2Nokoq1J4, Jan. 17, 2016, 1 page.
Nikolov Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 15/910,263, mailed on Jun. 15, 2020, 38 pages.
Non-Final Office Action received for U.S. Appl. No. 15/910,263, mailed on Mar. 4, 2019, 26 pages.
Non-Final Office Action received for U.S. Appl. No. 16/583,989, mailed on Jan. 24, 2020, 20 pages.
Non-Final Office Action received for U.S. Appl. No. 16/584,490, mailed on Dec. 10, 2019, 27 pages.
Non-Final Office Action received for U.S. Appl. No. 16/584,743, mailed on Feb. 6, 2020, 15 pages.
Non-Final Office Action received for U.S. Appl. No. 16/586,002, mailed on Feb. 20, 2020, 15 pages.
Non-Final Office Action received for U.S. Appl. No. 16/702,968, mailed on Apr. 8, 2020, 20 pages.
Non-Final Office Action received for U.S. Appl. No. 16/723,583, mailed on Aug. 13, 2020, 13 pages.
Non-Final Office Action received for U.S. Appl. No. 16/803,849, mailed on Jul. 13, 2020, 23 pages.
Non-Final Office Action received for U.S. Appl. No. 16/803,849, mailed on May 14, 2021, 34 pages.

Non-Final Office Action received for U.S. Appl. No. 16/807,604, mailed on Jun. 2, 2020, 28 pages.
Non-Final Office Action received for U.S. Appl. No. 16/836,571, mailed on Mar. 25, 2021, 28 pages.
Non-Final Office Action received for U.S. Appl. No. 16/922,675, mailed on Aug. 13, 2020, 17 pages.
Non-Final Office Action received for U.S. Appl. No. 16/922,675, mailed on Jun. 8, 2022, 21 pages.
Non-Final Office Action received for U.S. Appl. No. 16/922,675, mailed on May 4, 2021, 23 pages.
Non-Final Office Action received for U.S. Appl. No. 17/031,833, mailed on Dec. 7, 2020, 13 pages.
Non-Final Office Action received for U.S. Appl. No. 17/168,069, mailed on Jul. 21, 2021, 17 pages.
Non-Final Office Action received for U.S. Appl. No. 17/314,948, mailed on Aug. 1, 2022, 33 pages.
Non-Final Office Action received for U.S. Appl. No. 17/461,103, mailed on Nov. 22, 2021, 15 pages.
Notice of Acceptance received for Australian Patent Application No. 2018223051, mailed on Oct. 30, 2018, 3 pages.
Notice of Acceptance received for Australian Patent Application No. 2018236872, mailed on Jul. 9, 2019, 3 pages.
Notice of Acceptance received for Australian Patent Application No. 2019268111, mailed on Feb. 18, 2021, 3 pages.
Notice of Acceptance received for Australian Patent Application No. 2020257092, mailed on Aug. 27, 2021, 3 pages.
Notice of Acceptance received for Australian Patent Application No. 2020282362, mailed on Jan. 4, 2022, 3 pages.
Notice of Acceptance received for Australian Patent Application No. 2021201403, mailed on Oct. 22, 2021, 3 pages.
Notice of Acceptance received for Australian Patent Application No. 2021203669, mailed on May 25, 2022, 3 pages.
Notice of Acceptance received for Australian Patent Application No. 2021204454, mailed on Feb. 25, 2022, 3 pages.
Notice of Acceptance for Australian Patent Application No. 2022202458, mailed on May 6, 2022, 3 pages.
Notice of Allowance received for Chinese Patent Application No. 201811539260.0, mailed on Mar. 15, 2021, 2 pages (1 page of English Translation and 1 page of Official Copy).
Notice of Allowance for Chinese Patent Application No. 201880001436.9, mailed on May 8, 2020, 3 pages (2 pages of English Translation and 1 page of Official Copy).
Notice of Allowance for Chinese Patent Application No. 202010125114.4, mailed on Nov. 24, 2021, 2 pages (1 page of English Translation and 1 page of Official Copy).
Notice of Allowance received for Danish Patent Application No. PA201770408, mailed on Feb. 8, 2019, 2 pages.
Notice of Allowance received for Japanese Patent Application No. 2020-558885, mailed on Jul. 26, 2021, 4 pages (1 page of English Translation and 3 pages of Official Copy).
Notice of Allowance received for Japanese Patent Application No. 2021-026630, mailed on Jan. 7, 2022, 4 pages (1 page of English Translation and 3 pages of Official Copy).
Notice of Allowance received for Japanese Patent Application No. 2021-563716, mailed on Mar. 14, 2022, 4 pages (1 page of English Translation and 3 pages of Official Copy).
Notice of Allowance received for Japanese Patent Application No. 2022-079682, mailed on Jul. 15, 2022, 4 pages (1 page of English Translation and 3 pages of Official Copy).
Notice of Allowance received for Korean Patent Application No. 10-2020-7031319, mailed on Apr. 6, 2021, 5 pages (2 pages of English Translation and 3 pages of Official Copy).
Notice of Allowance received for Korean Patent Application No. 10-2021-7021047, mailed on Dec. 6, 2021, 3 pages (1 page of English Translation and 2 pages of Official Copy).
Notice of Allowance received for Korean Patent Application No. 10-2021-7035472, mailed on Nov. 23, 2021, 4 pages (2 pages of English Translation and 2 pages of Official Copy).
Notice of Allowance received for U.S. Appl. No. 16/702,968, mailed on Apr. 21, 2021, 20 pages.
Notice of Allowance received for U.S. Appl. No. 15/910,263, mailed on Feb. 18, 2021, 3 pages.

(56) References Cited

OTHER PUBLICATIONS

Notice of Allowance received for U.S. Appl. No. 15/910,263, mailed on Jan. 22, 2021, 33 pages.
Notice of Allowance received for U.S. Appl. No. 16/583,989, mailed on Apr. 1, 2021, 5 pages.
Notice of Allowance received for U.S. Appl. No. 16/583,989, mailed on Dec. 24, 2020, 7 pages.
Notice of Allowance received for U.S. Appl. No. 16/584,490, mailed on Aug. 27, 2020, 13 pages.
Notice of Allowance received for U.S. Appl. No. 16/584,490, mailed on Mar. 26, 2021, 13 pages.
Notice of Allowance received for U.S. Appl. No. 16/584,743, mailed on Aug. 7, 2020, 8 pages.
Notice of Allowance received for U.S. Appl. No. 16/584,743, mailed on Nov. 16, 2020, 7 pages.
Notice of Allowance received for U.S. Appl. No. 16/586,002, mailed on Jun. 9, 2020, 5 pages.
Notice of Allowance received for U.S. Appl. No. 16/803,849, mailed on May 17, 2022, 12 pages.
Notice of Allowance received for U.S. Appl. No. 16/807,604, mailed on Apr. 30, 2021, 25 pages.
Notice of Allowance received for U.S. Appl. No. 16/836,571, mailed on Feb. 14, 2022, 31 pages.
Notice of Allowance received for U.S. Appl. No. 16/836,571, mailed on Sep. 8, 2021, 25 pages.
Notice of Allowance received for U.S. Appl. No. 16/888,775, mailed on Jan. 12, 2022, 5 pages.
Notice of Allowance received for U.S. Appl. No. 16/888,775, mailed on Jul. 26, 2021, 5 pages.
Notice of Allowance received for U.S. Appl. No. 16/888,775, mailed on Jun. 3, 2021, 11 pages.
Notice of Allowance received for U.S. Appl. No. 16/922,675, mailed on Feb. 10, 2022, 8 pages.
Notice of Allowance received for U.S. Appl. No. 16/922,675, mailed on Jan. 21, 2021, 7 pages.
Notice of Allowance received for U.S. Appl. No. 16/922,675, mailed on Sep. 27, 2021, 10 pages.
Notice of Allowance received for U.S. Appl. No. 17/031,833, mailed on Jun. 25, 2021, 15 pages.
Notice of Allowance received for U.S. Appl. No. 17/031,833, mailed on Sep. 20, 2021, 6 pages.
Notice of Allowance received for U.S. Appl. No. 17/168,069, mailed on Jan. 19, 2022, 12 pages.
Notice of Allowance received for U.S. Appl. No. 17/168,069, mailed on Mar. 22, 2022, 5 pages.
Notice of Allowance received for U.S. Appl. No. 17/461,103, mailed on Jun. 20, 2022, 6 pages.
Notice of Allowance received for U.S. Appl. No. 17/461,103, mailed on Mar. 17, 2022, 10 pages.
Office Action received for Australian Patent Application No. 2018236870, mailed on Jul. 29, 2019, 7 pages.
Office Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2019268111, mailed on Oct. 27, 2020, 7 pages.
Office Action received for Australian Patent Application No. 2020257092, mailed on Mar. 3, 2021, 7 pages.
Office Action received for Australian Patent Application No. 2020257092, mailed on Nov. 30, 2020, 6 pages.
Office Action received for Australian Patent Application No. 2020282362, mailed on Nov. 25, 2021, 3 pages.
Office Action received for Australian Patent Application No. 2021201403, mailed on Mar. 16, 2021, 3 pages.
Office Action received for Australian Patent Application No. 2021203669, mailed on Apr. 5, 2022, 3 pages.
Office Action received for Australian Patent Application No. 2021204454, mailed on Aug. 9, 2021, 7 pages.
Office Action received for Chinese Patent Application No. 201811539259.8, mailed on Apr. 3, 2020, 10 pages (6 pages of English Translation and 4 pages of Official Copy).
Office Action received for Chinese Patent Application No. 201811539259.8, mailed on Sep. 3, 2020, 10 pages (6 pages of English Translation and 4 pages of Official Copy).
Office Action received for Chinese Patent Application No. 201811539259.8, mailed on Sep. 18, 2019, 12 pages (6 pages of English Translation and 6 pages of Official Copy).
Office Action received for Chinese Patent Application No. 201811539260.0, mailed on Jun. 3, 2020, 8 pages (5 pages of English Translation and 3 pages of Official Copy).
Office Action received for Chinese Patent Application No. 201811539260.0, mailed on Nov. 4, 2020, 9 pages (5 pages of English Translation and 4 pages of Official Copy).
Office Action received for Chinese Patent Application No. 201811539260.0, mailed on Oct. 8, 2019, 14 pages (7 pages of English Translation and 7 pages of Official Copy).
Office Action received for Chinese Patent Application No. 201880001436.9, mailed on Apr. 28, 2019, 19 pages (11 pages of English Translation and 8 pages of Official Copy).
Office Action received for Chinese Patent Application No. 201880001436.9, mailed on Nov. 6, 2019, 24 pages (15 pages of English Translation and 9 pages of Official Copy).
Office Action received for Chinese Patent Application No. 201911128105.4, mailed on Apr. 8, 2021, 10 pages (5 pages of English Translation and 5 pages of Official Copy).
Office Action received for Chinese Patent Application No. 201911128105.4, mailed on Jan. 4, 2021, 14 pages (7 pages of English Translation and 7 pages of Official Copy).
Office Action received for Chinese Patent Application No. 201911128105.4, mailed on Jul. 3, 2020, 18 pages (9 pages of English Translation and 9 pages of Official Copy).
Office Action received for Chinese Patent Application No. 202010125114.4, mailed on Aug. 21, 2020, 16 pages (8 pages of English Translation and 8 pages of Official Copy).
Office Action received for Chinese Patent Application No. 202010125114.4, mailed on Jun. 7, 2021, 7 pages (4 pages of English Translation and 3 pages of Official Copy).
Office Action received for Chinese Patent Application No. 202010125114.4, mailed on Mar. 1, 2021, 15 pages (9 pages of English Translation and 6 pages of Official Copy).
Office Action received for Chinese Patent Application No. 202011450203.2, mailed on Apr. 20, 2022, 9 pages (5 pages of English Translation and 4 pages of Official Copy).
Office Action received for Chinese Patent Application No. 202011450203.2, mailed on Sep. 1, 2021, 12 pages (6 pages of English Translation and 6 pages of Official Copy).
Office Action received for Chinese Patent Application No. 202110235995.X, mailed on Mar. 22, 2022, 17 pages (9 pages of English Translation and 8 pages of Official Copy).
Office Action received for Danish Patent Application No. PA201770392, mailed on Apr. 17, 2018, 2 pages.
Office Action received for Danish Patent Application No. PA201770392, mailed on Dec. 8, 2017, 4 pages.
Office Action received for Danish Patent Application No. PA201770392, mailed on Jun. 20, 2017, 11 pages.
Office Action received for Danish Patent Application No. PA201770401, mailed on Jan. 31, 2018, 3 pages.
Office Action received for Danish Patent Application No. PA201770401, mailed on May 17, 2018, 3 pages.
Office Action received for Danish Patent Application No. PA201770402, mailed on Apr. 16, 2018, 5 pages.
Office Action received for Danish Patent Application No. PA201770402, mailed on Dec. 18, 2017, 6 pages.
Office Action received for Danish Patent Application No. PA201770402, mailed on Jun. 19, 2017, 11 pages.
Office Action received for Danish Patent Application No. PA201770403, mailed on Dec. 12, 2017, 3 pages.
Office Action received for Danish Patent Application No. PA201770403, mailed on Jun. 16, 2017, 8 pages.

(56) References Cited

OTHER PUBLICATIONS

Office Action received for Danish Patent Application No. PA201770404, mailed on Aug. 8, 2018, 4 pages.

Office Action received for Danish Patent Application No. PA201770404, mailed on Dec. 1, 2017, 5 pages.

Office Action received for Danish Patent Application No. PA201770404, mailed on Feb. 21, 2019, 2 pages.

Office Action received for Danish Patent Application No. PA201770404, mailed on May 1, 2019, 2 pages.

Office Action received for Danish Patent Application No. PA201770406, mailed on Feb. 27, 2018, 7 pages.

Office Action received for Danish Patent Application No. PA201770406, mailed on Jan. 25, 2019, 8 pages.

Office Action received for Danish Patent Application No. PA201770406, mailed on Jun. 22, 2017, 11 pages.

Office Action received for Danish Patent Application No. PA201770406, mailed on Mar. 26, 2019, 3 pages.

Office Action received for Danish Patent Application No. PA201770406, mailed on Nov. 11, 2019, 4 pages.

Office Action received for Danish Patent Application No. PA201770408, mailed on Dec. 21, 2017, 6 pages.

Office Action received for Danish Patent Application No. PA201770408, mailed on Jun. 20, 2017, 9 pages.

Office Action received for Danish Patent Application No. PA201770408, mailed on May 3, 2018, 7 pages.

Office Action received for Danish Patent Application No. PA201770410, mailed on Apr. 9, 2018, 5 pages.

Office Action received for Danish Patent Application No. PA201770410, mailed on Jun. 23, 2017, 9 pages.

Office Action received for Danish Patent Application No. PA201770410, mailed on Nov. 22, 2018, 5 pages.

Office Action received for Danish Patent Application No. PA201870060, mailed on Jan. 15, 2019, 4 pages.

Office Action received for Danish Patent Application No. PA201870060, mailed on Jul. 25, 2019, 2 pages.

Office Action received for Danish Patent Application No. PA201870419, mailed on Feb. 27, 2020, 8 pages.

Office Action received for Danish Patent Application No. PA201870419, mailed on Sep. 30, 2019, 4 pages.

Office Action received for Danish Patent Application No. PA201870598, mailed on May 1, 2019, 3 pages.

Office Action received for Danish Patent Application No. PA201870598, mailed on Nov. 8, 2019, 4 pages.

Office Action received for Danish Patent Application No. PA202070560, mailed on Dec. 11, 2020, 7 pages.

Office Action received for Danish Patent Application No. PA202070560, mailed on Mar. 10, 2021, 7 pages.

Office Action received for Danish Patent Application No. PA202170320, mailed on May 3, 2022, 3 pages.

Office Action received for European Patent Application No. 18197583. 0, mailed on Feb. 28, 2020, 8 pages.

Office Action received for European Patent Application No. 18197589. 7, mailed on Oct. 1, 2019, 5 pages.

Office Action received for European Patent Application No. 18728002. 9, mailed on Dec. 14, 2020, 15 pages.

Office Action received for European Patent Application No. 19207753. 5, mailed on May 10, 2021, 4 pages.

Office Action received for European Patent Application No. 19207753. 5, mailed on Nov. 12, 2020, 5 pages.

Office Action received for European Patent Application No. 20158824. 1, mailed on Jun. 13, 2022, 5 pages.

Office Action received for European Patent Application No. 20158824. 1, mailed on May 18, 2021, 10 pages.

Office Action received for European Patent Application No. 20719301. 2, mailed on Feb. 21, 2022, 9 pages.

Office Action received for European Patent Application No. 20719301. 2, mailed on Jan. 28, 2021, 15 pages.

Office Action received for European Patent Application No. 21160991. 2, mailed on Mar. 24, 2022, 11 pages.

Office Action received for European Patent Application No. 21197457. 1, mailed on Sep. 2, 2022, 8 pages.

Office Action received for Japanese Patent Application No. 2021-026630, mailed on Aug. 20, 2021, 7 pages (3 pages of English Translation and 4 pages of Official Copy).

Office Action received for Korean Patent Application No. 10-2020-7031319, mailed on Dec. 8, 2020, 14 pages (6 pages of English Translation and 8 pages of Official Copy).

Office Action received for Korean Patent Application No. 10-2021-7021047, mailed on Aug. 13, 2021, 5 pages (2 pages of English Translation and 3 pages of Official Copy).

Office Action received for Korean Patent Application No. 10-2022-7006175, mailed on May 27, 2022, 7 pages (3 pages of English Translation and 4 pages of Official Copy).

Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.

Pairing Your Apple Watch With Your AppleTV, Available online at: https://www.youtube.com/watch?v=C4t8YFSJ-UY, Apr. 27, 2015, 3 pages.

Partial European Search Report received for European Patent Application No. 20158824.1, mailed on May 8, 2020, 14 pages.

Partial European Search Report received for European Patent Application No. 18197583.0, mailed on Jan. 14, 2019, 18 pages.

PartyShare—turn your Xperia into a jukebox, Available at: https://forum.xda-developers.com/crossdevice-dev/sony/app-partyshare-xperia-jukebox-t2877807, Sep. 15, 2014, 5 pages.

Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.

Result of Consultation received for European Patent Application No. 18197583.0, mailed on Feb. 24, 2021, 3 pages.

Result of Consultation received for European Patent Application No. 18197589.7, mailed on Dec. 1, 2020, 9 pages.

Result of Consultation received for European Patent Application No. 18197589.7, mailed on Dec. 17, 2020, 6 pages.

Result of Consultation received for European Patent Application No. 20158824.1, mailed on May 17, 2022, 7 pages.

Review: Samsung Radiant R3 Wireless Speakers, Available Online at: <https://www.youtube.com/watch?v=ZBICVE1WdKE>, Jan. 19, 2016, 3 pages.

Samsung, "Control an individual smart device on your watch", Online Available at: https://www.samsung.com/us/support/troubleshooting/TSG01003208/, Nov. 9, 2018, 1 page.

Samsung, "Problems with SmartThings on your Samsung Smartwatch", Online Available at: https://www.samsung.com/US/support/troubleshooting/TSG01003169/#smartthings-error-on-samsung-smartwatch, Nov. 9, 2018, 10 pages.

Samsung, "Samsung—User manual—Galaxy Watch", Online available at: https://content.abt.com/documents/90234/SM-R810NZDAXAR-use.pdf, Aug. 24, 2018, 102 pages.

Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.

Search Report and Opinion received for Danish Patent Application No. PA201770401, mailed on Jun. 19, 2017, 6 pages.

Search Report and Opinion received for Danish Patent Application No. PA201870060 mailed on Apr. 30, 2018, 7 pages.

Search Report and Opinion received for Danish Patent Application No. PA201870419, mailed on Aug. 27, 2018, 7 pages.

Search Report and Opinion received for Danish Patent Application No. PA201870419, mailed on Sep. 10, 2018, 9 pages.

Search Report and Opinion received for Danish Patent Application No. PA201870598, mailed on Dec. 5, 2018, 8 pages.

Search Report and Opinion received for Danish Patent Application No. PA202170320, mailed on Oct. 6, 2021, 9 pages.

Search Report received for Danish Patent Application No. PA201770404, mailed on Jun. 20, 2017, 8 pages.

Search Report received for Danish Patent Application No. PA201770409, mailed on Jun. 20, 2017, 9 pages.

(56) References Cited

OTHER PUBLICATIONS

Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.

Singh Ajit, "MYTUNZ: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.

Smart Home App—What is the Widget, Online Available at: https://support.vivint.com/s/article/Vivint-Smart-Home-App-What-is-the-Widget, Jan. 26, 2019, 4 pages.

Smarttricks, "Top 3 Music Player For Android", Available online at: <https://www.youtube.com/watch?v=He7RTn4CL34>, Feb. 22, 2017, 4 pages.

Sonos, "Sonos Controller App for iPad Product Guide", Available online at: https://www.sonos.com/documents/productguides/en/iPadGuide_EN.pdf, Nov. 2014, 47 pages.

Stroud Forrest, "Screen Lock Meaning & Definition", Online Available at: https://www.webopedia.com/definitions/screen-lock, Jan. 30, 2014, 3 pages.

Summons to Attend Oral Proceedings received for European Patent Application 20158824.1, mailed on Dec. 7, 2021, 6 pages.

Summons to Attend Oral Proceedings received for European Patent Application No. 18197583.0, mailed on Aug. 14, 2020, 12 pages.

Summons to attend Oral proceedings received for European Patent Application No. 18197589.7, mailed on Apr. 9, 2020, 7 pages.

Summons to Attend Oral Proceedings received for European Patent Application No. 18728002.9, mailed on Jun. 3, 2022, 15 pages.

Supplemental Notice of Allowance received for U.S. Appl. No. 16/584,490, mailed on Apr. 13, 2021, 2 pages.

Supplemental Notice of Allowance received for U.S. Appl. No. 16/584,743, mailed on Nov. 25, 2020, 2 pages.

Supplemental Notice of Allowance received for U.S. Appl. No. 17/168,069, mailed on Apr. 20, 2022, 2 pages.

Supplemental Notice of Allowance received for U.S. Appl. No. 17/168,069, mailed on Feb. 2, 2022, 2 pages.

Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.

Woolsey Amanda, "Apple Watch Tips—How To Add and Play Music", Available online at: https://www.youtube.com/watch?v=E0QEuqMaoi8>, Apr. 26, 2015, 3 pages.

Applicant-Initiated Interview Summary received for U.S. Appl. No. 17/978,930, mailed on Apr. 26, 2024, 4 pages.

Office Action received for Chinese Patent Application No. 202080039832.8, mailed on Mar. 23, 2024, 22 pages (12 pages of English Translation and 10 pages of Official Copy).

Office Action received for Indian Patent Application No. 202118049678, mailed on Apr. 18, 2024, 8 pages.

Notice of Allowance received for Japanese Patent Application No. 2022-129377, mailed on Apr. 26, 2024, 4 pages (1 page of English Translation and 3 pages of Official Copy).

Final Office Action received for U.S. Appl. No. 17/978,930, mailed on Apr. 5, 2024, 28 pages.

International Preliminary Report on Patentability received for PCT Patent Application No. PCT/US2022/043733, mailed on Apr. 4, 2024, 9 pages.

Invitation to Pay Search Fees received for European Patent Application No. 21789897.2, mailed on Mar. 14, 2024, 3 pages.

Notice of Allowance received for Korean Patent Application No. 10-2022-7001521, mailed on Mar. 22, 2024, 7 pages (2 pages of English Translation and 5 pages of Official Copy).

Office Action received for Chinese Patent Application No. 201911128105.4, mailed on Mar. 16, 2024, 7 pages (4 pages of English Translation and 3 pages of Official Copy).

Office Action received for Chinese Patent Application No. 201911128105.4, mailed on Mar. 19, 2024, 16 pages (8 pages of English Translation and 8 pages of Official Copy).

Office Action received for Chinese Patent Application No. 202010728711.6, mailed on Feb. 1, 2024, 30 pages (18 pages of English Translation and 12 pages of Official Copy).

Office Action received for Chinese Patent Application No. 202311321231.8, mailed on Mar. 10, 2024, 15 pages (9 pages of English Translation and 6 pages of Official Copy).

103914238, CN, A, Cited by Chinese Patent Office in an Office Action for related Patent Application No. 202080039832.8 on Mar. 23, 2024.

108289239, CN, A, Cited by Chinese Patent Office in an Office Action for related Patent Application No. 202080039832.8 on Mar. 23, 2024.

108958608, CN, A, Cited by Chinese Patent Office in an Office Action for related Patent Application No. 202080039832.8 on Mar. 23, 2024.

109461462, CN, A, Cited by Chinese Patent Office in an Office Action for related Patent Application No. 202080039832.8 on Mar. 23, 2024.

Brief Communication Regarding Oral Proceedings received for European Patent Application No. 21197457.1, mailed on May 23, 2024, 5 pages.

Non-Final Office Action received for U.S. Appl. No. 17/747,804, mailed on Jun. 4, 2024, 20 pages.

Non-Final Office Action received for U.S. Appl. No. 18/229,989, mailed on May 31, 2024, 18 pages.

Notice of Acceptance received for Australian Patent Application No. 2023203357, mailed on May 16, 2024, 3 pages.

Notice of Allowance received for Chinese Patent Application No. 201911128105.4, mailed on May 24, 2024, 2 pages (1 page of English Translation and 1 page of Official Copy).

Office Action received for European Patent Application No. 21789897.2, mailed on May 23, 2024, 12 pages.

Applicant-Initiated Interview Summary received for U.S. Appl. No. 18/229,989, mailed on Jun. 28, 2024, 2 pages.

Brief Communication Regarding Oral Proceedings received for European Patent Application No. 21197457.1, mailed on Jun. 19, 2024, 1 page.

Corrected Notice of Allowance received for U.S. Appl. No. 18/235,291, mailed on Aug. 7, 2024, 2 pages.

Corrected Notice of Allowance received for U.S. Appl. No. 18/235,291, mailed on Jul. 18, 2024, 3 pages.

"Create Confirmation Dialog Box—Matlab Ulconfirm", Online available at: https://www.mathworks.com/help.matlab/ref/uiconfirm.html, 2017, 19 pages.

Decision to Refuse received for Japanese Patent Application No. 2023-022576, mailed on Jul. 26, 2024, 6 pages (3 pages of English Translation and 3 pages of Official Copy).

Examiner-Initiated Interview Summary received for U.S. Appl. No. 18/234,613, mailed on Aug. 9, 2024, 2 pages.

Intention to Grant received for European Patent Application No. 20719301.2, mailed on Jul. 2, 2024, 9 pages.

Intention to Grant received for European Patent Application No. 21197457.1, mailed on Jul. 9, 2024, 12 pages.

Intention to Grant received for European Patent Application No. 23168537.1, mailed on Jul. 25, 2024, 8 pages.

Minutes of the Oral Proceedings received for European Patent Application No. 21197457.1, mailed on Jul. 3, 2024, 9 pages.

Non-Final Office Action received for U.S. Appl. No. 18/234,613, mailed on Jul. 1, 2024, 19 pages.

Notice of Allowance received for Chinese Patent Application No. 202010728711.6, mailed on Jul. 1, 2024, 2 pages (1 page of English Translation and 1 page of Official Copy).

Notice of Allowance received for U.S. Appl. No. 17/978,930, mailed on Aug. 19, 2024, 9 pages.

Notice of Allowance received for U.S. Appl. No. 18/229,989, mailed on Jul. 24, 2024, 5 pages.

Notice of Allowance received for U.S. Appl. No. 18/235,291, mailed on Jul. 3, 2024, 18 pages.

Office Action received for Australian Patent Application No. 2023266353, mailed on Sep. 19, 2024, 2 pages.

(56) References Cited

OTHER PUBLICATIONS

Office Action received for Chinese Patent Application No. 202311305998.1, mailed on May 29, 2024, 13 pages (7 pages of English Translation and 6 pages of Official Copy).

Office Action received for Chinese Patent Application No. 202311321231.8, mailed on Jul. 28, 2024, 9 pages (5 pages of English Translation and 4 pages of Official Copy).

Office Action received for European Patent Application No. 22201007.6, mailed on Jul. 18, 2024, 4 pages.

Office Action received for European Patent Application No. 23190753.6, mailed on Jun. 25, 2024, 10 pages.

Result of Consultation received for European Patent Application No. 22201007.6, mailed on Aug. 20, 2024, 3 pages.

Supplemental Notice of Allowance received for U.S. Appl. No. 18/229,989, mailed on Aug. 7, 2024, 2 pages.

"Window confirm()", Online available at: https://www.w3schools.com/jsref/met_win_confirm.asp, 2014, 5 pages.

Intention to Grant received for European Patent Application No. 22201007.6, mailed on Apr. 4, 2025, 8 pages.

International Preliminary Report on Patentability received for PCT Patent Application No. PCT/US2023/032084, mailed on Mar. 20, 2025, 7 pages.

Office Action received for European Patent Application No. 22786636.5, mailed on Mar. 26, 2025, 6 pages.

Office Action received for European Patent Application No. 23191379.9, mailed on Mar. 24, 2025, 6 pages.

Non-Final Office Action received for U.S. Appl. No. 17/991,708, mailed on Oct. 22, 2024, 20 pages.

Notice of Acceptance received for Australian Patent Application No. 2023266353, mailed on Oct. 1, 2024, 3 pages.

Notice of Allowance received for Chinese Patent Application No. 202010728844.3, mailed on Sep. 29, 2024, 2 pages (1 page of English Translation and 1 page of Official Copy).

Notice of Allowance received for U.S. Appl. No. 18/234,613, mailed on Oct. 11, 2024, 10 pages.

Office Action received for Australian Patent Application No. 2024200283, mailed on Oct. 8, 2024, 2 pages.

Prabeesh R.K., "Android Studio Tutorial—17—Highlight selected item in a ListView", Available Online at: https://www.youtube.com/watch?v=W6bBYmXP0HY, Feb. 24, 2015, 5 pages.

Szogyenyi, Zina, "Improving the usability of multi-selecting from a long list", Available online at: https://medium.com/tripaneer-techblog/improving-the-usability-of-multi-selecting-from-a-long-list-63e1a67aab35, Jun. 13, 2018, 12 pages.

Extended European Search Report received for European Patent Application No. 24208135.4, mailed on Jan. 21, 2025, 13 pages.

Intention to Grant received for European Patent Application No. 22201007.6, mailed on Jan. 29, 2025, 9 pages.

Office Action received for Australian Patent Application No. 2024278098, mailed on Jan. 22, 2025, 3 pages.

Office Action received for European Patent Application No. 23190753.6, mailed on Jan. 30, 2025, 9 pages.

Examiner's Answer to Appeal Brief received for U.S. Appl. No. 17/747,804, mailed on Mar. 5, 2025, 23 pages.

Intention to Grant received for European Patent Application No. 21789897.2, mailed on Feb. 13, 2025, 9 pages.

Corrected Notice of Allowance received for U.S. Appl. No. 18/234,613, mailed on Oct. 28, 2024, 2 pages.

Intention to Grant received for European Patent Application No. 21197457.1, mailed on Oct. 24, 2024, 12 pages.

2016-63531, JP, A, Cited by Japanese Patent Office in an Office Action for related Patent Application No. 2023-0225763 on Dec. 24, 2024.

2017-212096, JP, A, Cited by Japanese Patent Office in an Office Action for related Patent Application No. 2023-0225763 on Dec. 24, 2024.

Applicant-Initiated Interview Summary received for U.S. Appl. No. 17/991,708, mailed on Dec. 16, 2024, 5 pages.

Corrected Notice of Allowance received for U.S. Appl. No. 18/234,613, mailed on Jan. 10, 2025, 5 pages.

Corrected Notice of Allowance received for U.S. Appl. No. 18/234,613, mailed on Nov. 20, 2024, 2 pages.

Decision to Grant received for European Patent Application No. 20719301.2, mailed on Nov. 7, 2024, 3 pages.

Decision to Grant received for European Patent Application No. 21197457.1, mailed on Jan. 7, 2025, 4 pages.

Extended European Search Report received for European Patent Application No. 25154475.5, mailed on Apr. 28, 2025, 11 pages.

Extended European Search Report received for European Patent Application No. 25166659.0, mailed on Apr. 15, 2025, 9 pages.

Final Office Action received for U.S. Appl. No. 17/991,708, mailed on Dec. 30, 2024, 22 pages.

Intention to Grant received for European Patent Application No. 21197457.1, mailed on Nov. 21, 2024, 12 pages.

Intention to Grant received for European Patent Application No. 21789897.2, mailed on Nov. 12, 2024, 9 pages.

Intention to Grant received for European Patent Application No. 23168537.1, mailed on Dec. 2, 2024, 8 pages.

Notice of Acceptance received for Australian Patent Application No. 2024200283, mailed on Nov. 13, 2024, 3 pages.

Notice of Allowance received for Chinese Patent Application No. 202311305998.1, mailed on Jan. 2, 2025, 2 pages (1 page of English Translation and 1 page of Official Copy).

Notice of Allowance received for Chinese Patent Application No. 202311312328.2, mailed on Jan. 3, 2025, 2 pages (1 page of English Translation and 1 page of Official Copy).

Notice of Allowance received for Japanese Patent Application No. 2023-022576, mailed on Dec. 24, 2024, 4 pages (1 page of English Translation and 3 pages of Official Copy).

Notice of Allowance received for U.S. Appl. No. 18/077,891, mailed on Dec. 10, 2024, 9 pages.

Notice of Allowance received for U.S. Appl. No. 18/234,613, mailed on Dec. 12, 2024, 7 pages.

Office Action received for Chinese Patent Application No. 202311305998.1, mailed on Oct. 19, 2024, 6 pages (3 pages of English Translation and 3 pages of Official Copy).

Decision to Grant received for European Patent Application No. 21789897.2, mailed on Jun. 5, 2025, 3 pages.

Decision to Grant received for European Patent Application No. 22201007.6, mailed on Jul. 17, 2025, 4 pages.

Extended European Search Report received for European Patent Application No. 25174339.9, mailed on Jun. 26, 2025, 9 pages.

Intention to Grant received for European Patent Application No. 23190753.6, mailed on Jun. 18, 2025, 9 pages.

Non-Final Office Action received for U.S. Appl. No. 18/237,310, mailed on Aug. 27, 2025, 10 pages.

Office Action received for Australian Patent Application No. 2024205162, mailed on Jul. 31, 2025, 6 pages.

Office Action received for Chinese Patent Application No. 202411704616.7, mailed on Jul. 30, 2025, 14 pages (7 pages of English Translation and 7 pages of Official Copy).

Office Action received for Chinese Patent Application No. 202411713875.6, mailed on May 10, 2025, 17 pages (9 pages of English Translation and 8 pages of Official Copy).

Office Action received for Chinese Patent Application No. 202411715424.6, mailed on May 17, 2025, 16 pages (8 pages of English Translation and 8 pages of Official Copy).

Office Action received for Chinese Patent Application No. 202411716388.5, mailed on Jun. 8, 2025, 14 pages (7 pages of English Translation and 7 pages of Official Copy).

Office Action received for Japanese Patent Application No. 2024-175208, mailed on Sep. 1, 2025, 11 pages (5 pages of English Translation and 6 pages of Official Copy).

Office Action received for Korean Patent Application No. 10-2024-7011347, mailed on Jul. 31, 2025, 7 pages (3 pages of English Translation and 4 pages of Official Copy).

Applicant-Initiated Interview Summary received for U.S. Appl. No. 18/237,310, mailed on Oct. 2, 2025, 2 pages.

Decision on Appeal received for U.S. Appl. No. 17/747,804, mailed on Sep. 26, 2025, 11 pages.

Notice of Allowance received for Japanese Patent Application No. 2024-081986, mailed on Oct. 6, 2025, 4 pages (1 page of English Translation and 3 pages of Official Copy).

(56)                    References Cited

OTHER PUBLICATIONS

Office Action received for Korean Patent Application No. 10-2024-7015715, mailed on Sep. 23, 2025, 9 pages (4 pages of English Translation and 5 pages of Official Copy).
Office Action received for Japanese Patent Application No. 2024-081986, mailed on May 9, 2025, 6 pages (3 pages of English Translation and 3 pages of Official Copy).
Decision to Grant received for European Patent Application No. 23168537.1, mailed on Mar. 20, 2025, 4 pages.
Office Action received for Australian Patent Application No. 2024278098, mailed on Mar. 6, 2025, 3 pages.
Notice of Allowance received for Chinese Patent Application No. 202411713875.6, mailed on Oct. 13, 2025, 4 pages (1 page of English Translation and 3 pages of Official Copy).
Record of Oral Hearing received for U.S. Appl. No. 17/747,804, mailed on Oct. 14, 2025, 10 pages.
Intention to Grant received for European Patent Application No. 22786636.5, mailed on Nov. 18, 2025, 8 pages.

\* cited by examiner

Portable Multifunction Device 100

Speaker 111

Optical Sensor 164

Proximity Sensor 166

210 is SIM card slot
212 is headphone jack

Touch Screen 112

Contact Intensity Sensor(s) 165

Tactile Output Generator(s) 167

Microphone 113

Home 204

Accelerometer(s) 168

External Port 124

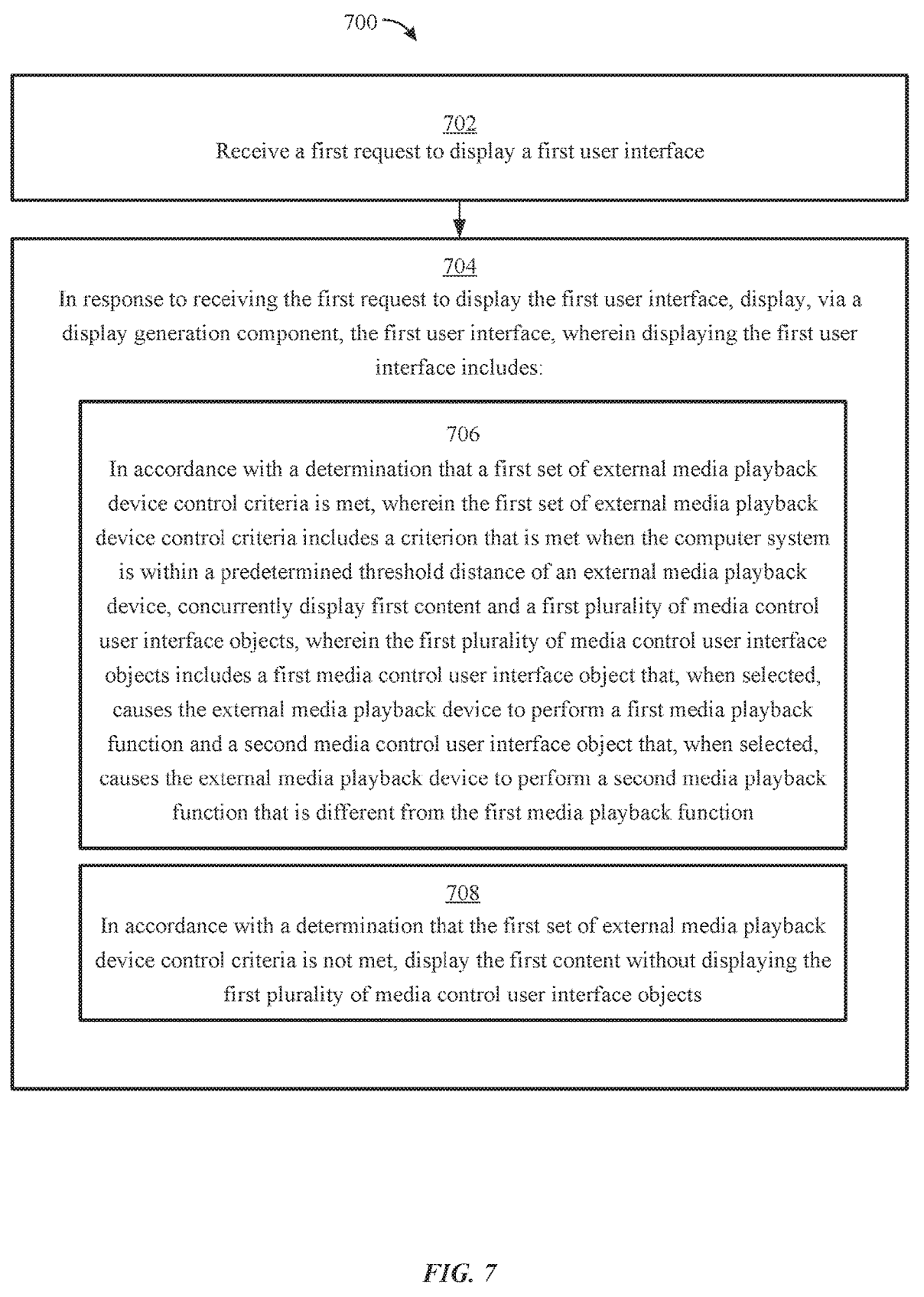

700 ⟍

702
Receive a first request to display a first user interface

704
In response to receiving the first request to display the first user interface, display, via a display generation component, the first user interface, wherein displaying the first user interface includes:

706
In accordance with a determination that a first set of external media playback device control criteria is met, wherein the first set of external media playback device control criteria includes a criterion that is met when the computer system is within a predetermined threshold distance of an external media playback device, concurrently display first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function

708
In accordance with a determination that the first set of external media playback device control criteria is not met, display the first content without displaying the first plurality of media control user interface objects

*FIG. 7*

MEDIA CONTROLS USER INTERFACE

CROSS-REFERENCE TO RELATED APPLICATIONS

This application claims the benefit of priority of U.S. Provisional Patent Application Ser. No. 63/248,385, entitled "MEDIA CONTROLS USER INTERFACE," filed Sep. 24, 2021, the contents of which is hereby incorporated by reference in its entirety.

FIELD

The present disclosure relates generally to computer user interfaces, and more specifically to techniques for displaying media playback controls.

BACKGROUND

Smartphones and other personal electronic devices allow users to control the playback status of speaker devices. Users may use the smart phones and personal electronic devices to cause speaker devices to perform a variety of playback operations such as initiate the playback of a media item or pause the playback of a media item.

BRIEF SUMMARY

Some techniques for displaying media playback controls using electronic devices, however, are generally cumbersome and inefficient. For example, some existing techniques require a user to perform multiple key presses or keystrokes and navigate across a number of complex and time consuming user interfaces to gain access to media playback controls for controlling a desired speaker device. Existing techniques require more time than necessary, wasting user time and device energy. This latter consideration is particularly important in battery-operated devices.

Accordingly, the present technique provides electronic devices with faster, more efficient methods and interfaces for displaying media playback controls. Such methods and interfaces optionally complement or replace other methods for displaying media playback controls. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component. The method comprises: receiving a first request to display a first user interface; and in response to receiving the first request to display the first user interface, displaying, via the display generation component, the first user interface, wherein displaying the first user interface includes: in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function; and in accordance with a determination that the first set of external media playback device control criteria is not met, displaying the first content without displaying the first plurality of media control user interface objects.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: receiving a first request to display a first user interface; and in response to receiving the first request to display the first user interface, displaying, via the display generation component, the first user interface, wherein displaying the first user interface includes: in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function; and in accordance with a determination that the first set of external media playback device control criteria is not met, displaying the first content without displaying the first plurality of media control user interface objects.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: receiving a first request to display a first user interface; and in response to receiving the first request to display the first user interface, displaying, via the display generation component, the first user interface, wherein displaying the first user interface includes: in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function; and in accordance with a determination that the first set of external media playback device control criteria is not met, displaying the first content without displaying the first plurality of media control user interface objects.

In accordance with some embodiments, a computer system that is configured to communicate with a display generation component. The computer system comprises: one or more processors; and memory storing one or more programs configured to be executed by the one or more processors, the one or more programs including instructions for: receiving a first request to display a first user interface; and in response to receiving the first request to display the first user interface, displaying, via the display generation component, the first user interface, wherein displaying the first user interface includes: in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function; and in accordance with a determination that the first set of external media playback device control criteria is not met, displaying the first content without displaying the first plurality of media control user interface objects.

In accordance with some embodiments, a computer system that is configured to communicate with a display generation component and one or more input devices is described. The computer system comprises: means for receiving, a first request to display a first user interface; and means, responsive to receiving the first request to display the first user interface, for displaying, via the display generation component, the first user interface, wherein displaying the first user interface includes: in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function; and in accordance with a determination that the first set of external media playback device control criteria is not met, displaying the first content without displaying the first plurality of media control user interface objects.

In accordance with some embodiments, a computer program product is described. The computer program product comprises one or more programs configured to be executed by one or more processors of a computer system that is in communication with a display generation component. The one or more programs include instructions for: receiving a first request to display a first user interface; and in response to receiving the first request to display the first user interface, displaying, via the display generation component, the first user interface, wherein displaying the first user interface includes: in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes a first media control user interface object that, when selected, causes the external media playback device to perform a first media playback function and a second media control user interface object that, when selected, causes the external media playback device to perform a second media playback function that is different from the first media playback function; and in accordance with a determination that the first set of external media playback device control criteria is not met, displaying the first content without displaying the first plurality of media control user interface objects.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying media playback controls, thereby increasing the effectiveness, efficiency, and user satisfaction with such devices. Such methods and interfaces may complement or replace other methods for displaying media playback controls.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a flow diagram illustrating a method for displaying media playback controls

DESCRIPTION OF EMBODIMENTS

Figure 1A:
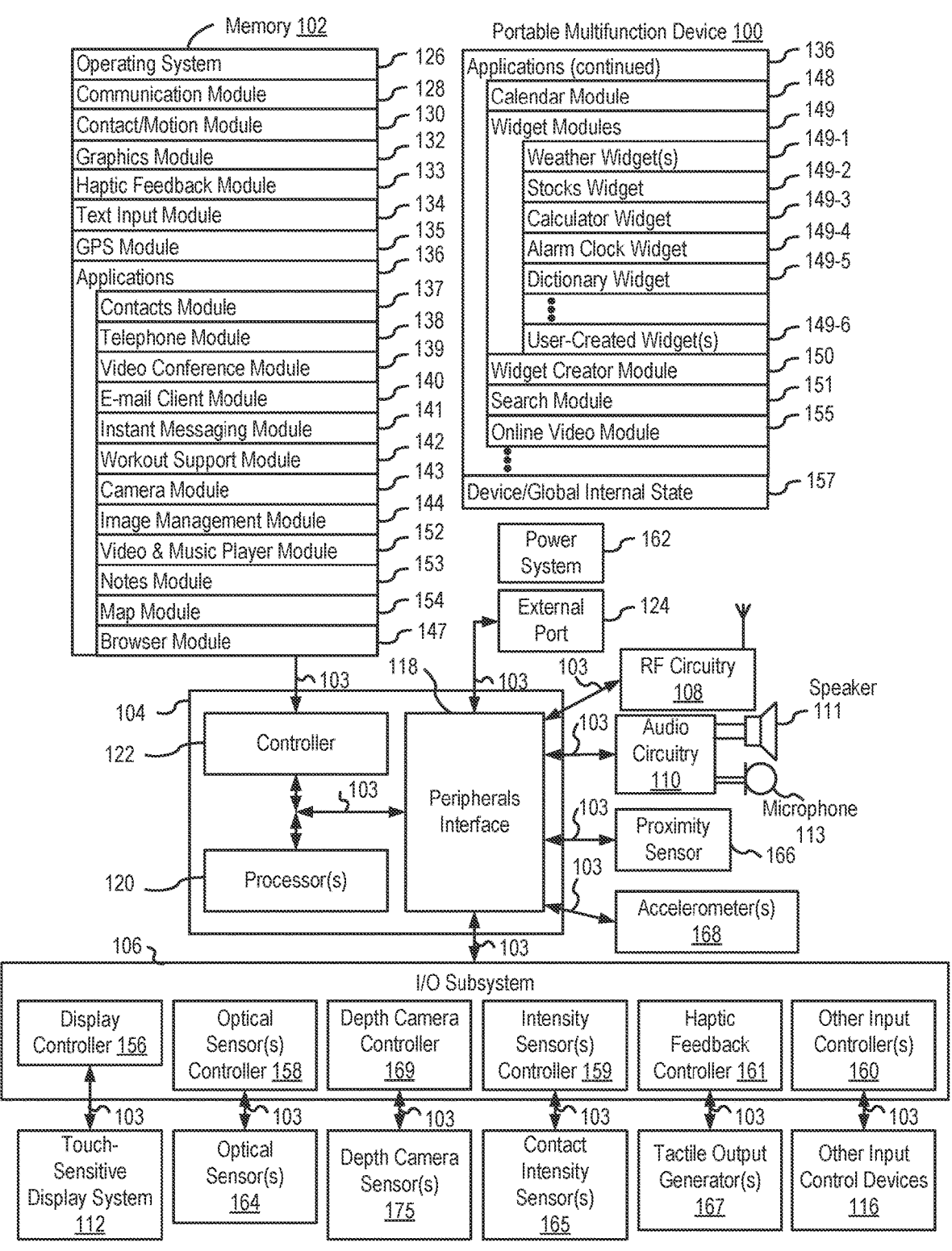
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices and/or computer systems that provide efficient methods and interfaces for displaying media playback controls. For example, there is a need for electronic devices and/or computer systems that allow a user to quickly and efficiently view media playback controls for a speaker device that is of particular interest to the user. Such techniques can reduce the cognitive burden on a user who views media playback controls, thereby enhancing productivity. Further, such techniques can reduce processor and battery power otherwise wasted on redundant user inputs.

Below, FIGS. 1A-1B, 2, 3, 4A-4B, and 5A-5D provide a description of exemplary devices for performing the techniques for managing event notifications. FIGS. 6A-6M illustrate schematics and exemplary user interfaces for displaying media playback controls. FIG. 7 is a flow diagram illustrating methods of displaying media playback controls in accordance with some embodiments. The schematics and user interfaces in FIGS. 6A-6M are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
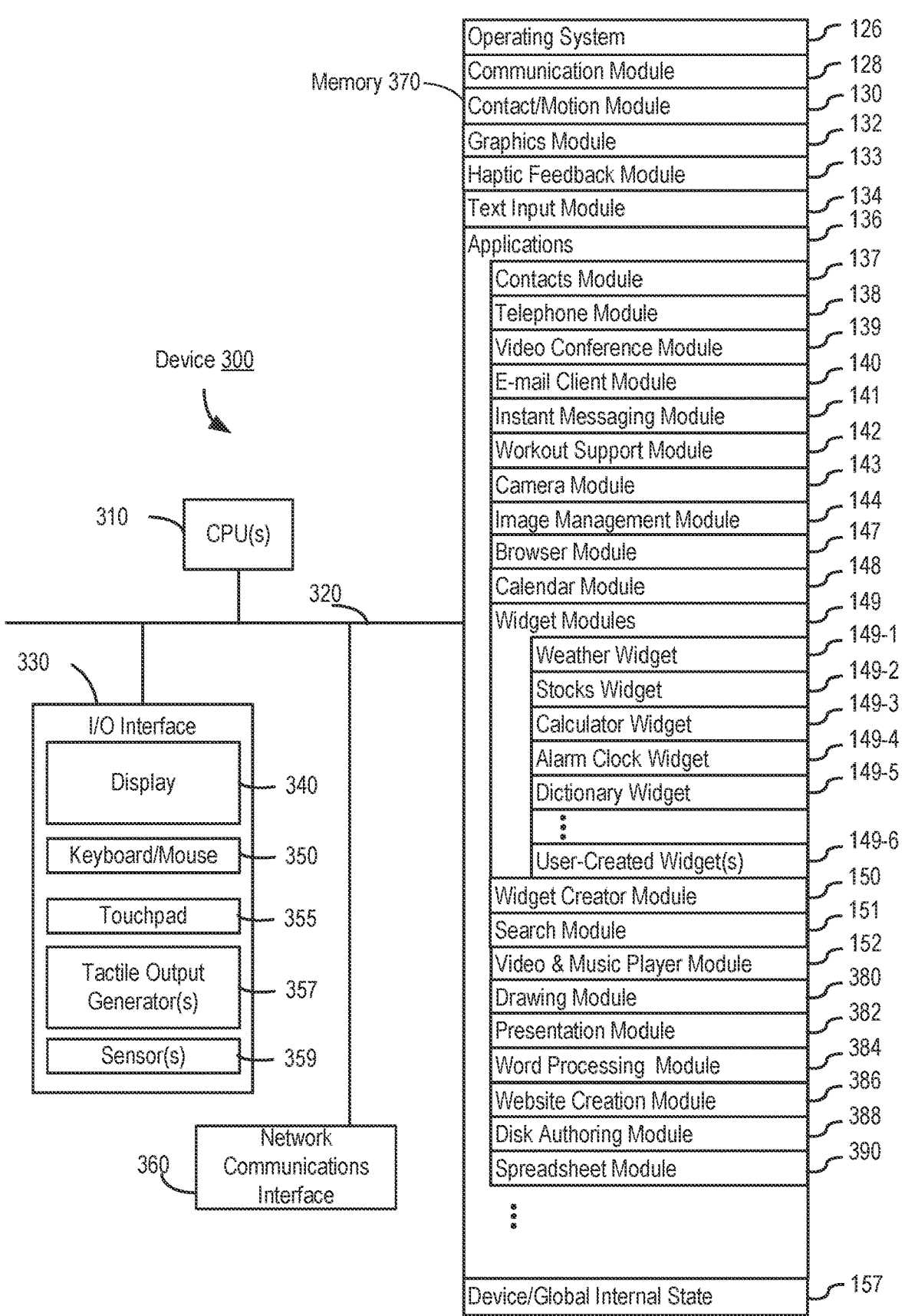
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
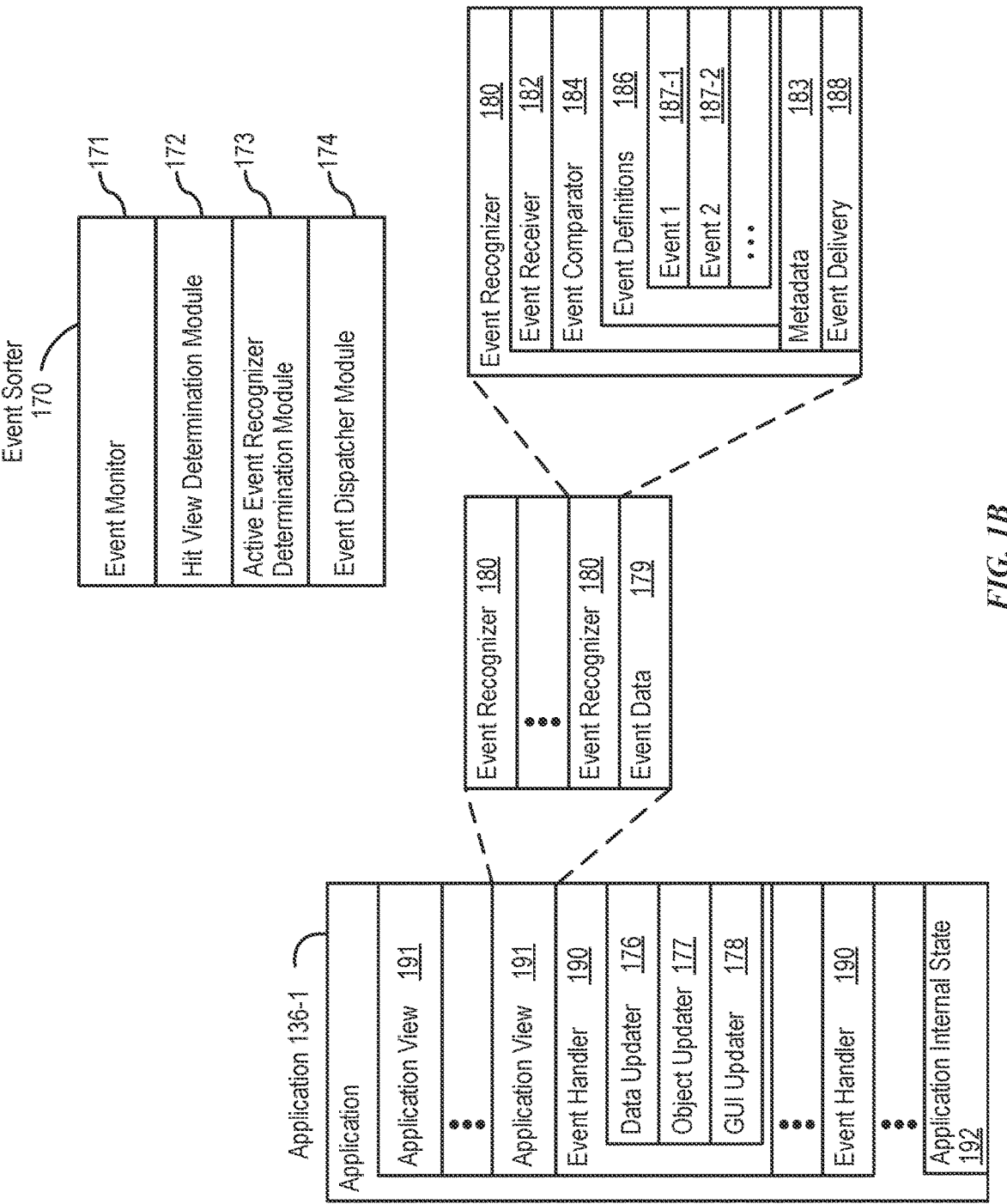
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
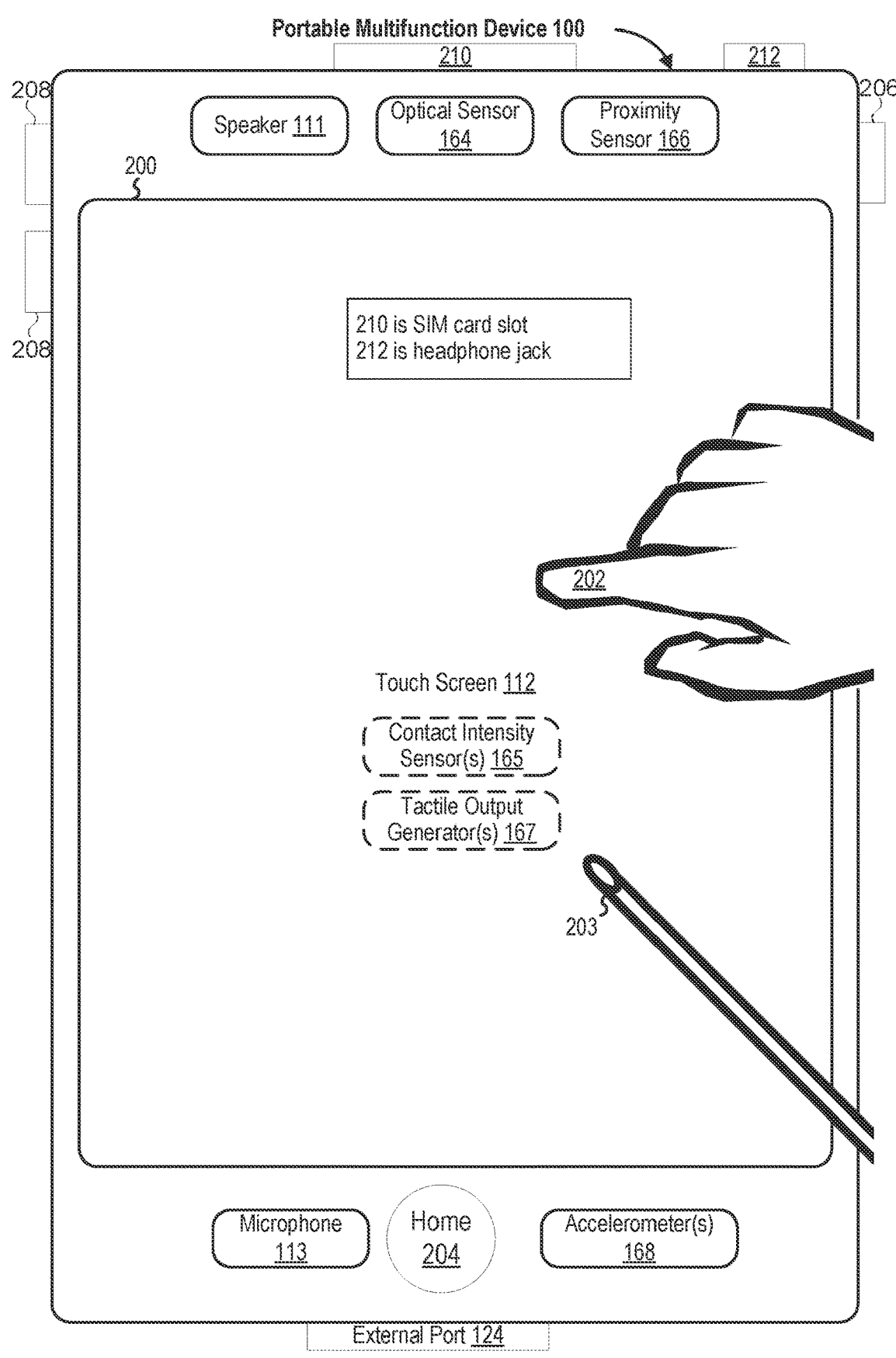
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
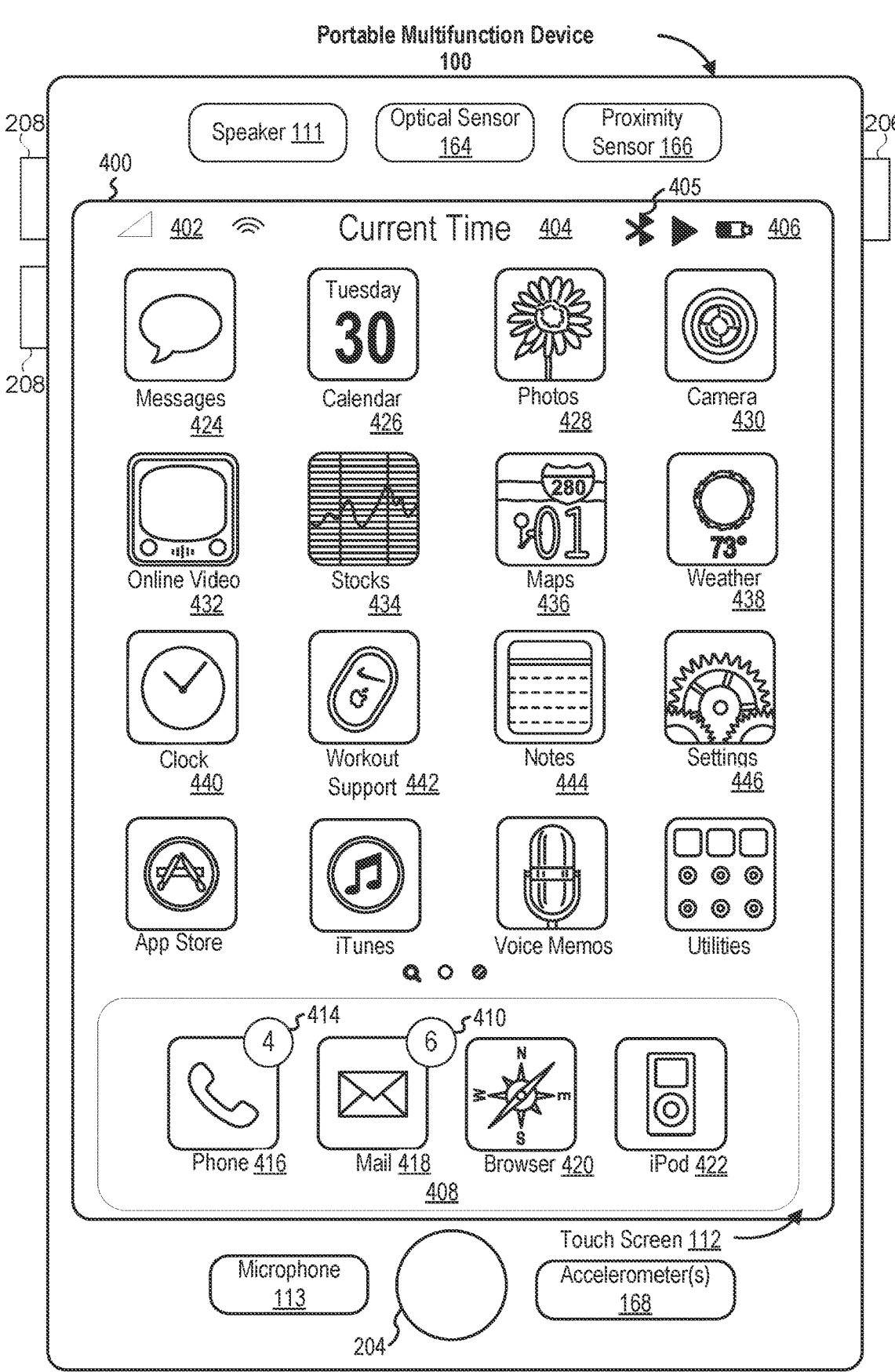
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
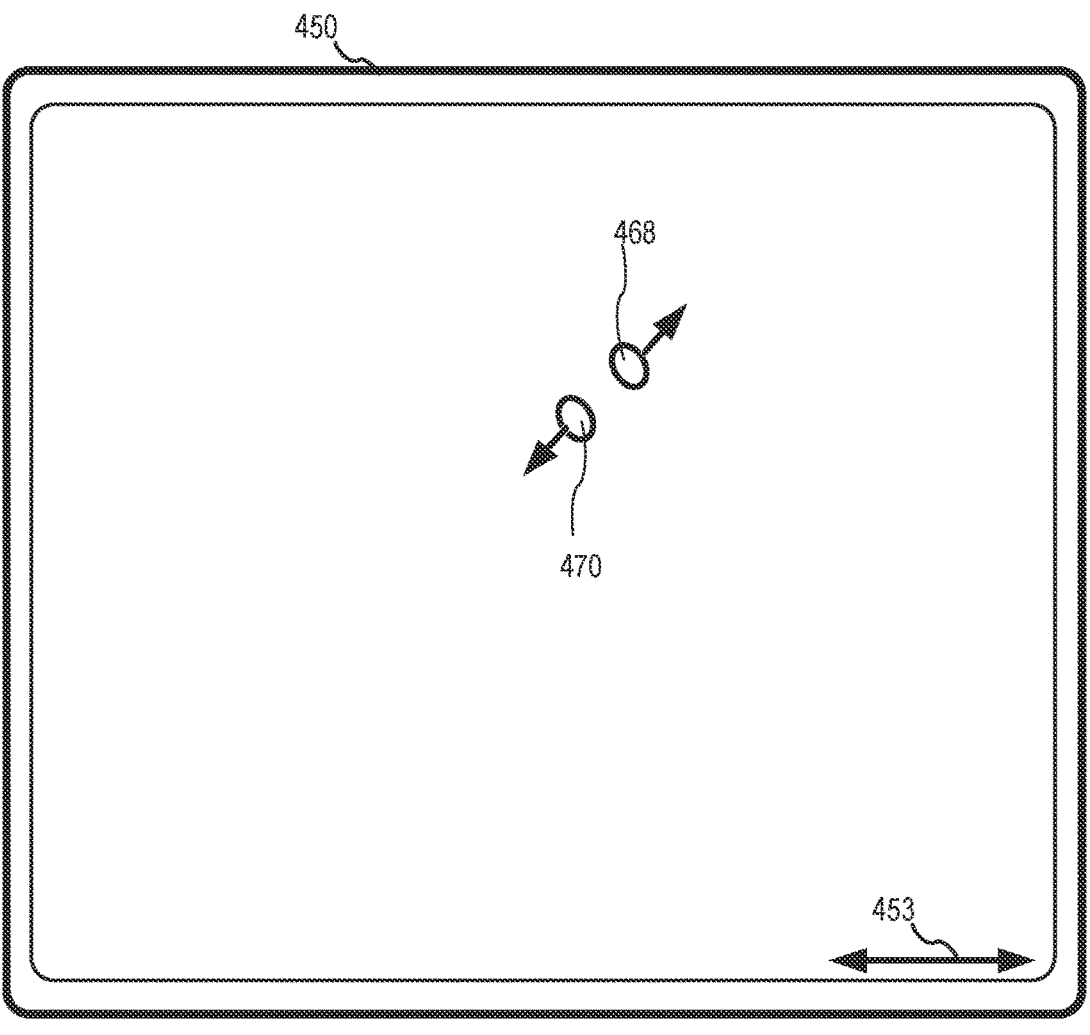
FIG. 4B illustrates an exemplary user interface for a multifunction device with a touch-sensitive surface that is separate from the display in accordance with some embodiments.
Figure 4B:
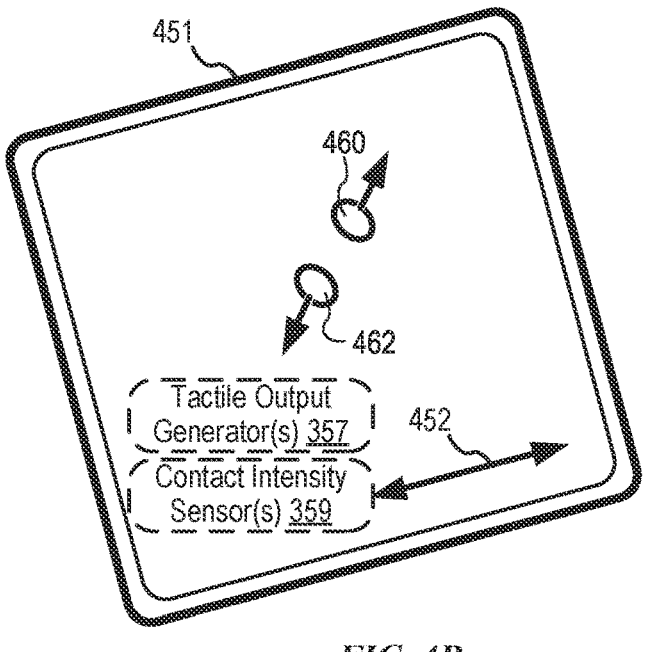

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
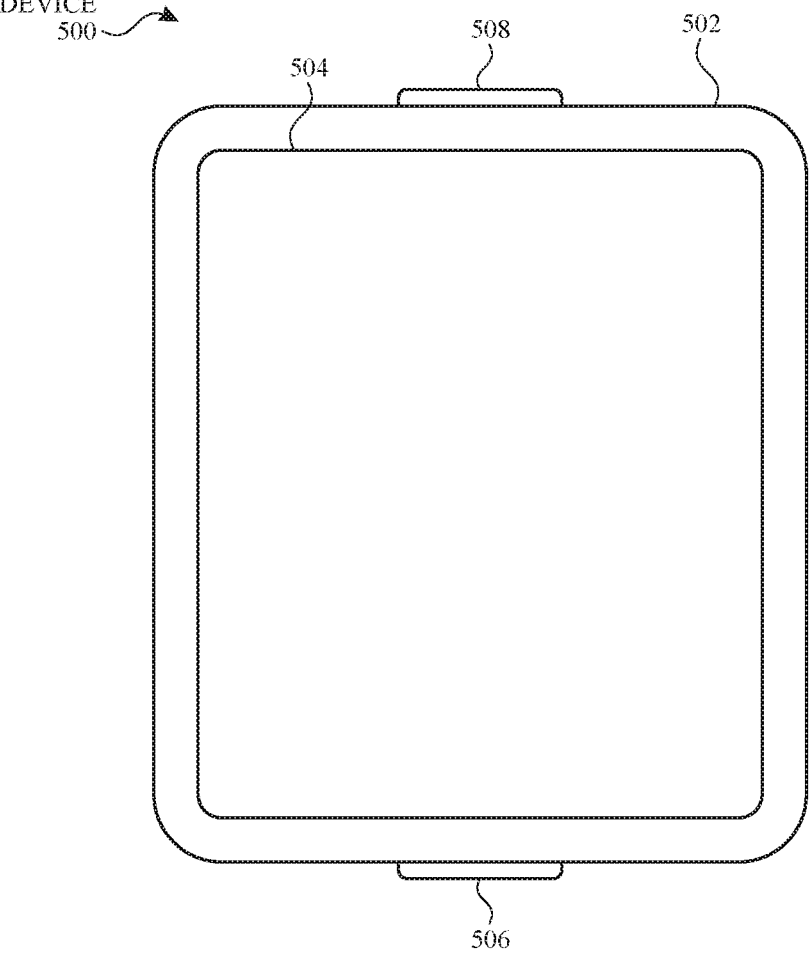
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
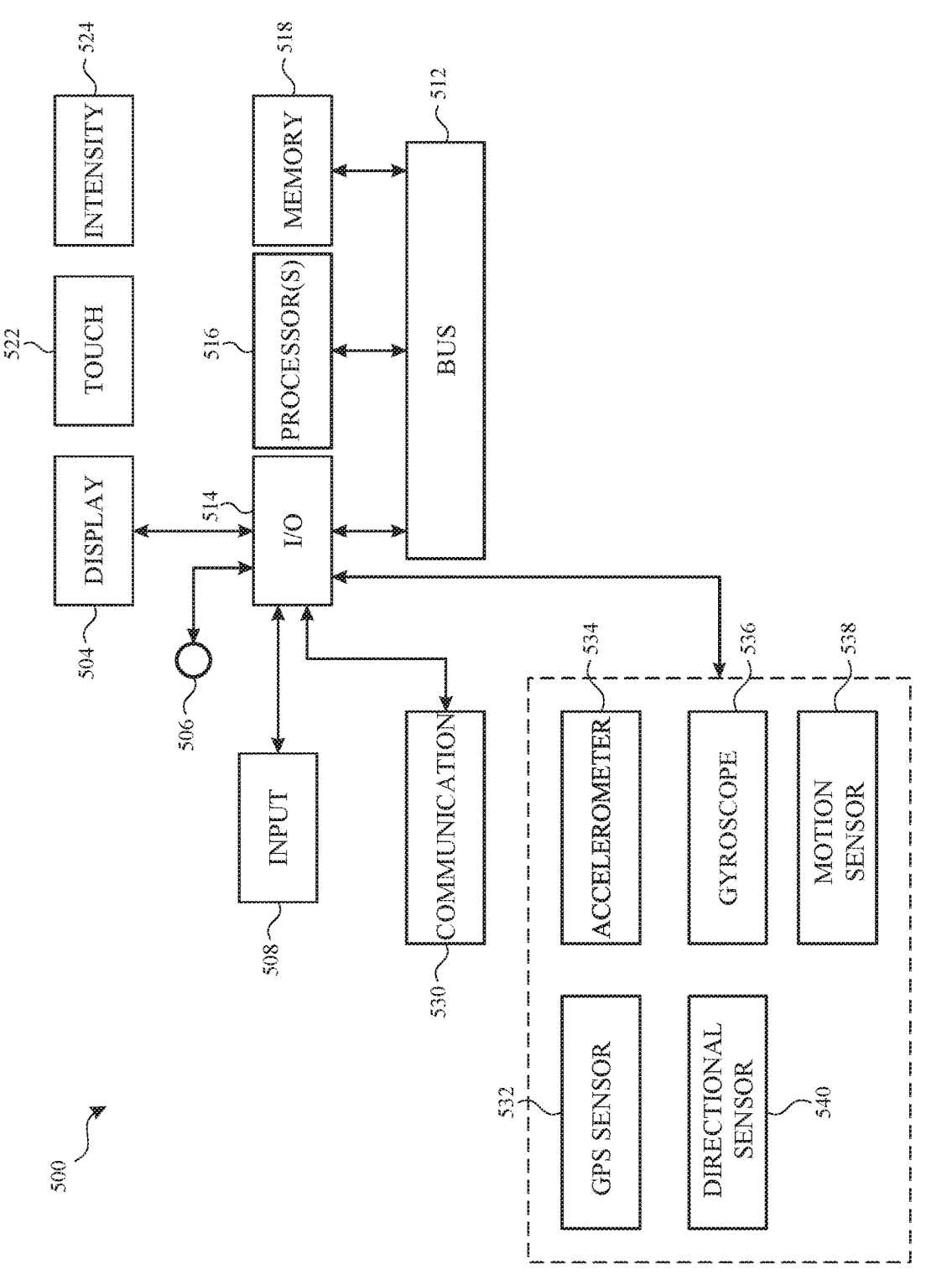
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
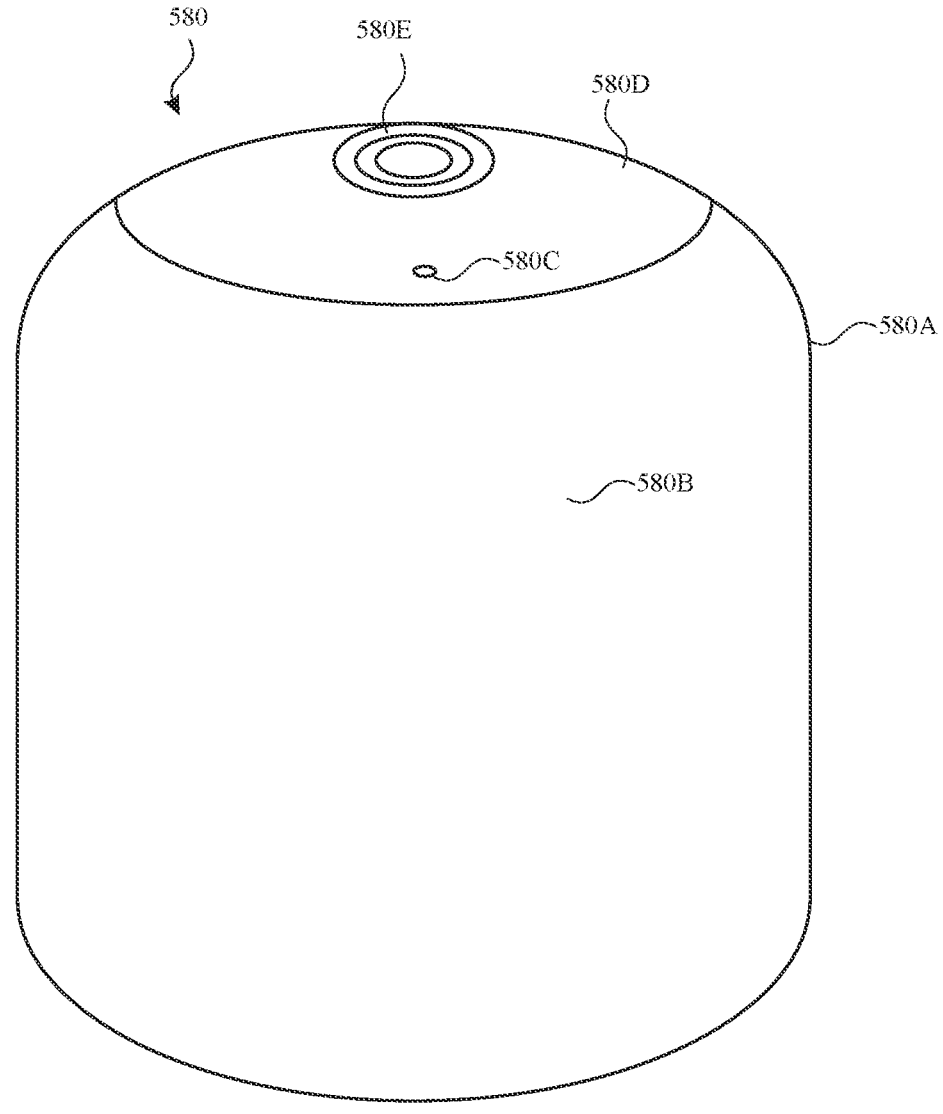
FIG. 5C illustrates an electronic device in accordance with some embodiments.
Figure 5D:
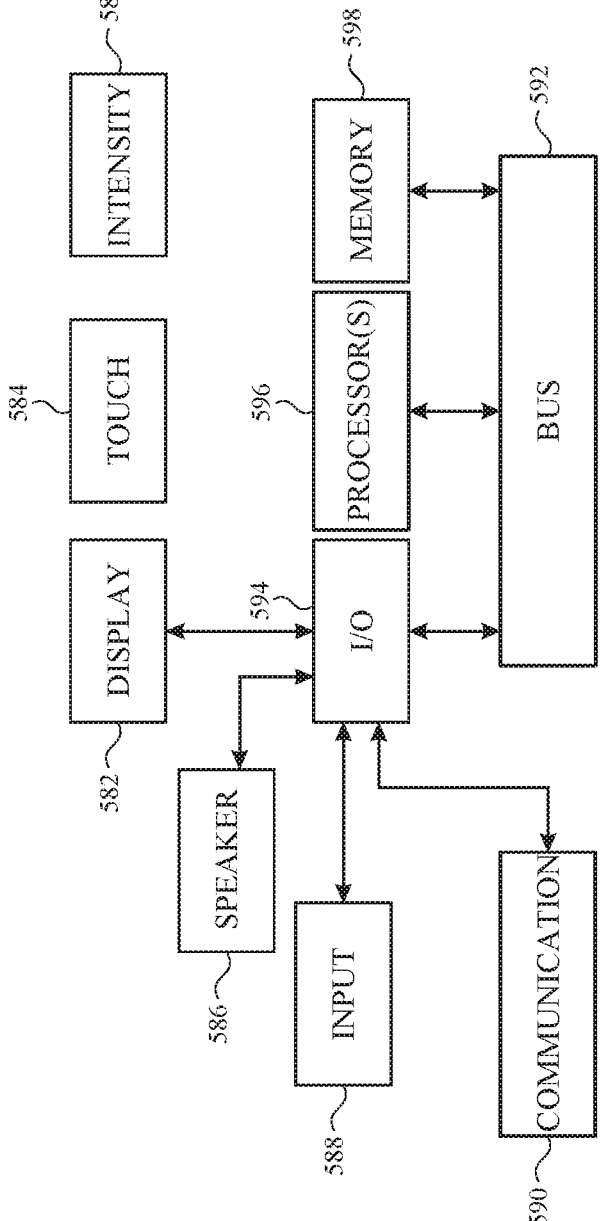
FIG. 5D is a block diagram illustrating an electronic device in accordance with some embodiments.

FIG. 5C illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

FIG. 5C depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

Attention is now directed towards embodiments of user interfaces ("UI") and associated processes that are implemented on an electronic device (e.g., computer system 600), such as portable multifunction device 100, device 300, or device 500.

FIGS. 6A-6M illustrate schematics and exemplary user interfaces for displaying media playback controls, in accordance with some embodiments. The schematics and user interfaces in these figures are used to illustrate the processes described below, including the processes in FIG. 7.

Figure 6A:
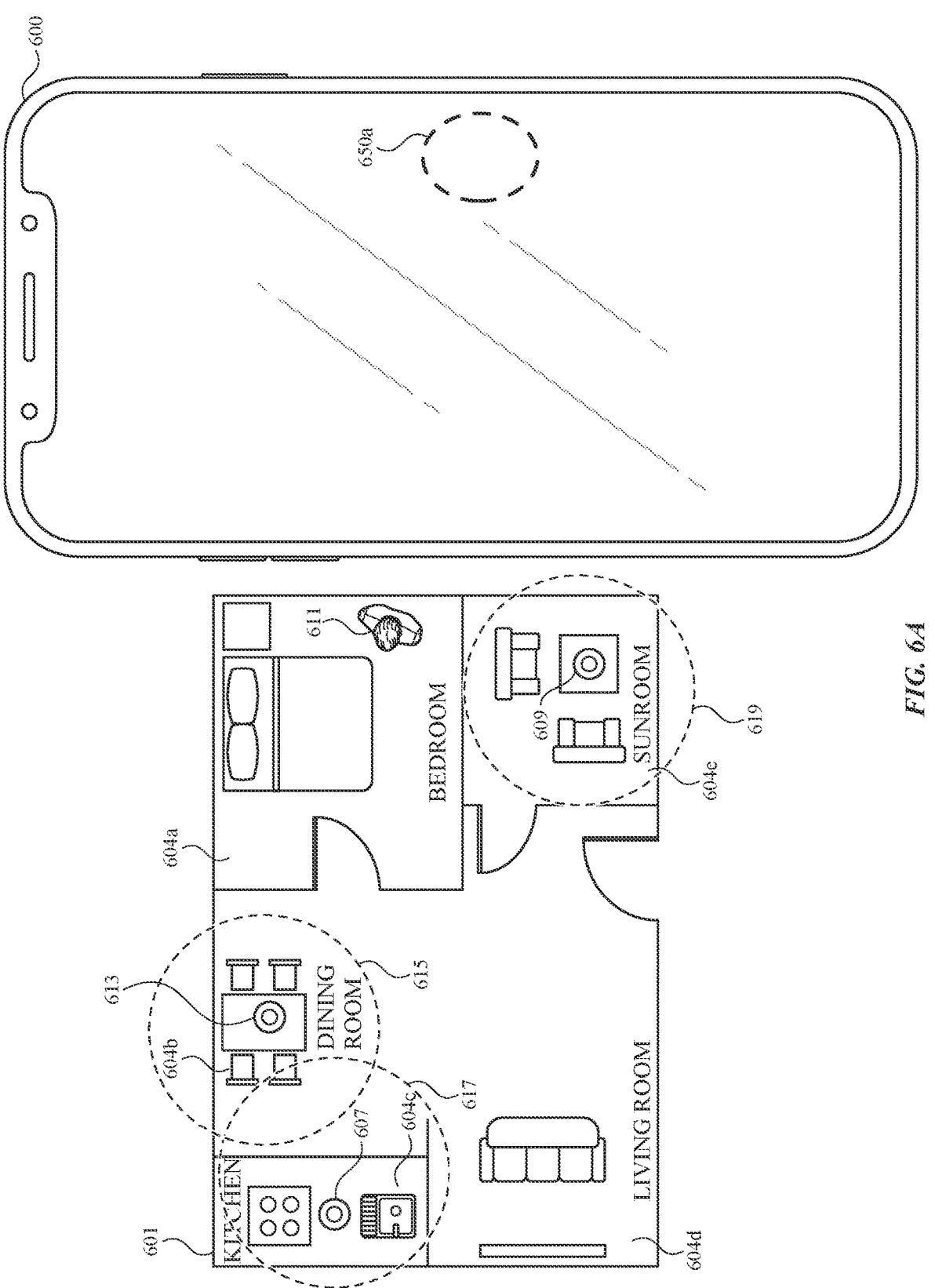
FIGS. 6A-6M illustrate schematics and exemplary user interfaces for displaying media playback controls.

FIGS. 6A-6M include schematic diagram 601 of a home. The interior of the home includes multiple rooms, such as bedroom 604*a*, dining room 604*b*, kitchen 604*c*, living room 604*d*, and sunroom 604*e*. In some embodiments, the home includes rooms other than those depicted in FIG. 6A and/or excludes rooms that are depicted in FIG. 6A. While schematic diagram 601 depicts the home, it should be recognized that this is merely an example and techniques described herein can work with other types of physical structures, such as an office building, a hotel, an apartment. FIGS. 6A-6M also include an indication 611 (e.g., a symbol representing a user of computer system 600). The location of indication 611 within schematic diagram 601 represents a location of computer system 600. In some embodiments, computer system 600 is device 100, 300, and/or 500.

As illustrated in FIG. 6A, various rooms in the home each include at least one speaker (e.g., a smart speaker). For example, kitchen 604*c* includes kitchen speaker 607, sunroom 604*e* includes sunroom speaker 609, and dining room 604*b* includes dining room speaker 613. Each speaker is directly connected to computer system 600 or indirectly connected to computer system 600 via one or more wireless communication protocols (e.g., Bluetooth, NFC, Wi-Fi, 5G). In some embodiments, other smart devices, such as smart appliances, smart thermostats, smart plug outlets, are also connected to computer system 600 via one or more wireless communication protocols. In some embodiments, one or more personal devices can be assigned to the home. In some embodiments, the personal devices that are assigned to the home (e.g., identified as being associated with the home) include computer system 600. In some embodiments, the personal devices include one or more tablets, smartwatches, laptops, and desktops.

As illustrated in FIG. 6A, each speaker is surrounded by a respective indicator that indicates a proximity condition range. For example, indicator 615 surrounds dining room speaker 613, indicator 617 surrounds kitchen speaker 607, and indicator 619 surrounds sunroom speaker 609. The indicators are included in the figures to aid understanding of ranges from each of the respective speakers at which a proximity condition would be met, but are not displayed on computer system 600 or by the speakers. For example, indicator 615 illustrates a range and/or area around dining room speaker 613 in which computer system 600, when it is within the area, would be in sufficient proximity to satisfy a proximity condition with respect to dining room speaker 613. In some embodiments, any appropriate technique can be used to detect proximity between devices. For instance, in some examples, an ultra-wideband wireless connection is used. An ultra-wideband wireless connection is used, for example, to determine one or more of: directionality, distance, and orientation, of one or more devices. Thus, computer system 600 detecting that it is within a respective proximity condition range (e.g., of a speaker) would satisfy a proximity condition for computer system 600 that corresponds to the respective speaker device associated with the respective indicator.

One of ordinary skill in the art would appreciate that a detection range of physical proximity can be non-uniform, can be affected by numerous variables (e.g., wireless interference, air humidity, or the like), and can include points in space in three dimensions, all of which are intended to be within the scope of this disclosure. Thus, the graphical representations of indicators 615, 617, and 619 are not intended to limit the scope of determining whether a proximity condition is satisfied. Furthermore, the figures are not necessarily to scale and are included merely as a visual aid. Thus, unless otherwise noted, the size and scale of features depicted in the figures are not intended as a limitation on a distance required to be in close proximity or to satisfy a proximity condition or proximity condition range.

FIG. 6A illustrates computer system 600 in a sleep state. As illustrated in FIG. 6A, computer system 600 does not display anything on its display while computer system 600 is in the sleep state. FIG. 6A illustrates that computer system 600 is positioned within bedroom 604*a* (e.g., as indicated by the placement of indication 611 within schematic diagram 601). At FIG. 6A, computer system 600 detects tap gesture 650*a* on the display of computer system 600.

Figure 6B:
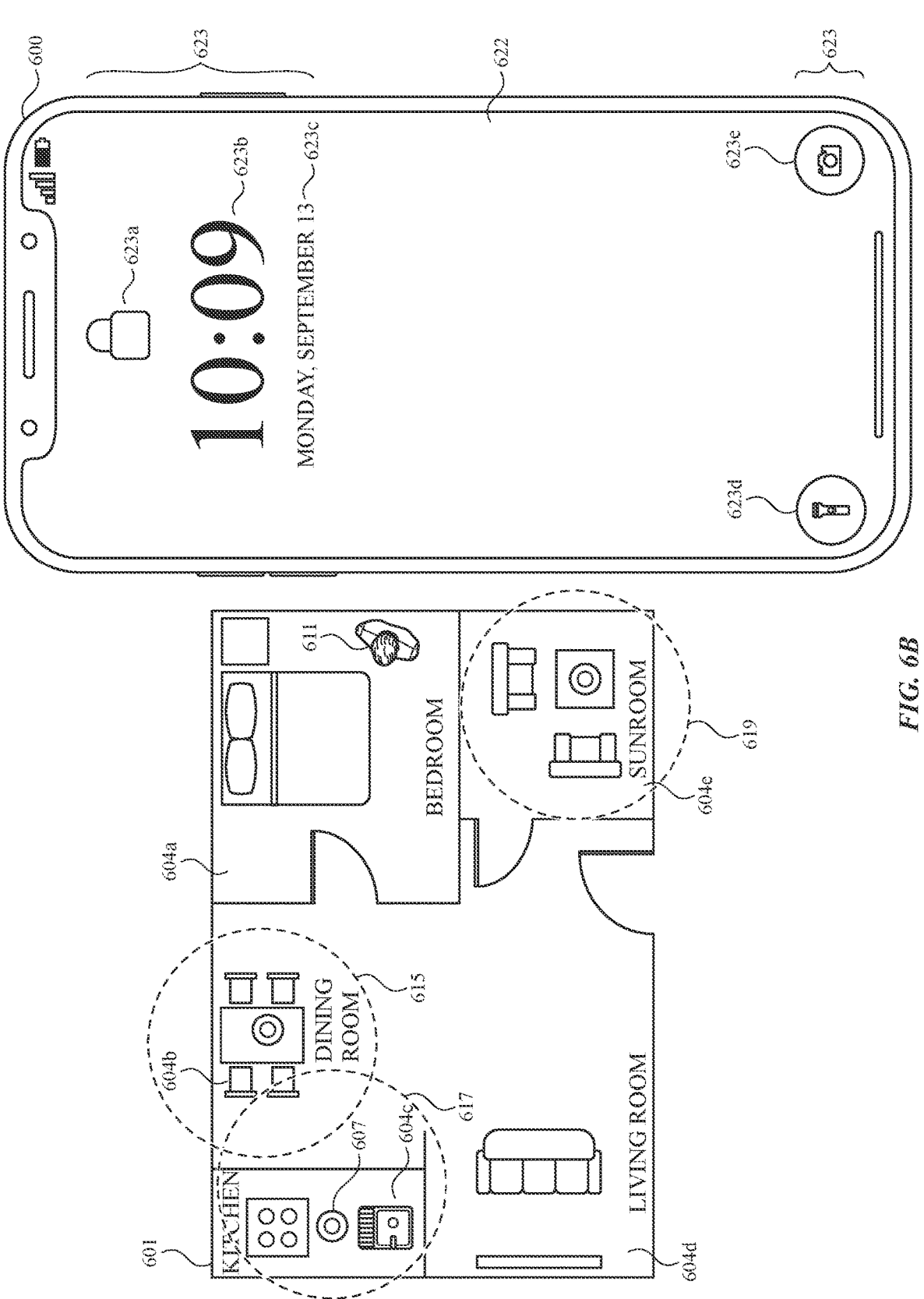

As illustrated in FIG. 6B, in response to detecting tap gesture 650*a*, computer system 600 transitions from a sleep state to a non-sleep state. Further, in response to detecting tap gesture 650*a* computer system 600 displays user interface 622 that indicates that computer system 600 is in a locked state. In some embodiments, computer system transitions from the sleep state to the non-sleep state in response to detecting one or more other conditions such as movement of the computer system, activation of a physical button, and/or a voice command. As illustrated in FIG. 6B, user interface 622 includes first content 623. First content 623 includes: lock icon 623*a* that indicates that computer system 600 is in a locked state, time indicator 623*b* that indicates the current time, date indicator 623*c* that indicates the date of the current day, camera affordance 623*e* that, when selected, launches a camera application; and light affordance 623*d*, that, when selected, powers on/off a light source that is integrated into computer system 600.

As illustrated in FIG. 6B, computer system 600 is located within bedroom 604*a*. At FIG. 6B, a determination is made that computer system 600 is not positioned within any of proximity condition ranges as indicated by indicators 615, 617, or 619. Because computer system 600 is not within any proximity condition ranges as indicated by indicators 615, 617, or 619, user interface 622 does not include controls for controlling any of the speakers in the home (e.g., one of dining room speaker 613, kitchen speaker 607, or sunroom speaker 609).

Figure 6C:
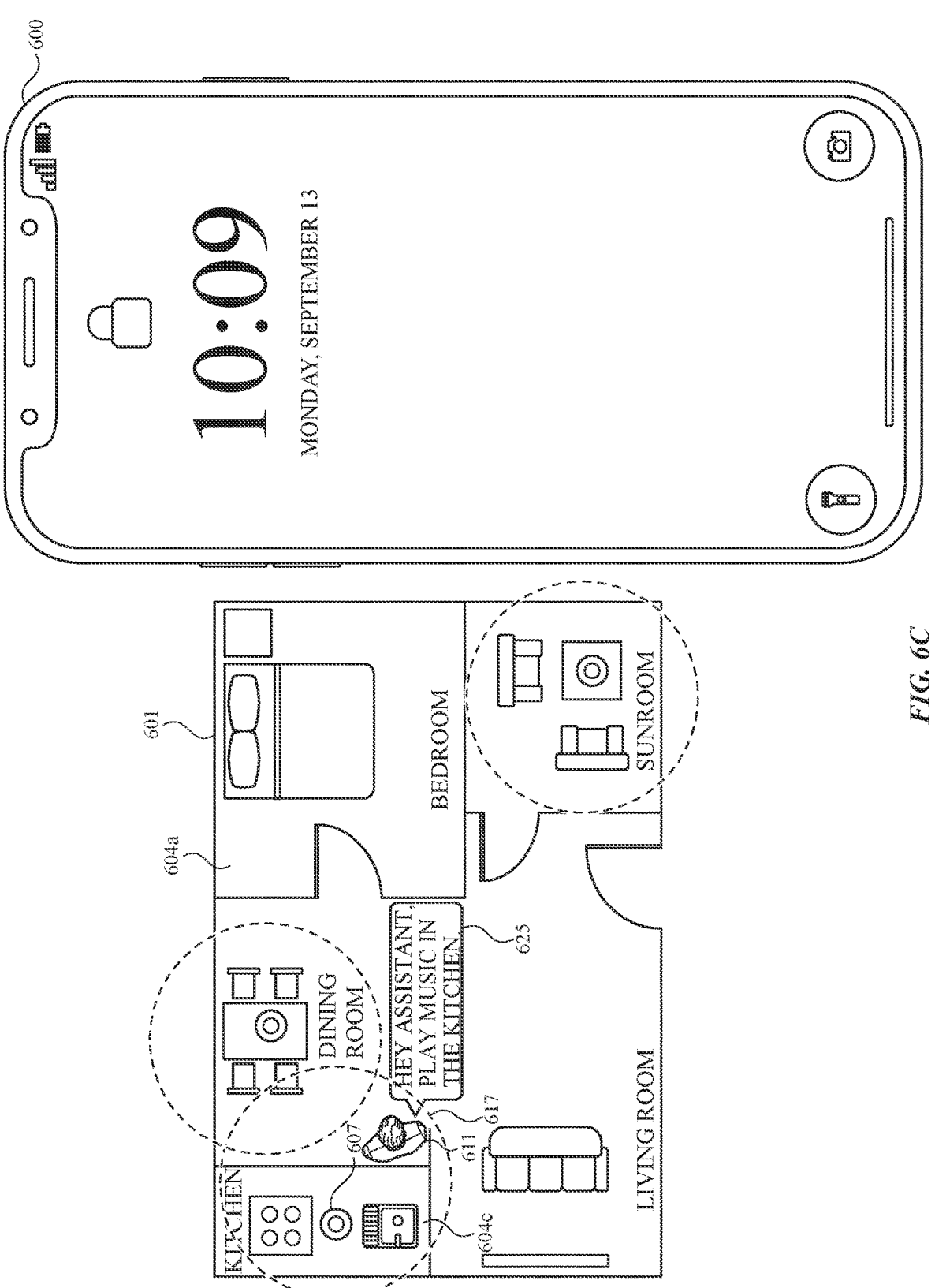

At FIG. 6C, computer system 600 has moved from bedroom 604*a* (e.g., in FIG. 6B) to kitchen 604*c*. After computer system 600 has moved from bedroom 604*a* to kitchen 604*c*, computer system 600 transitions from a sleep state to a non-sleep state. In response to transitioning from the sleep state to the non-sleep state, computer system 600 displays user interface 622 that indicates that computer system is locked.

As illustrated in FIG. 6C, computer system 600 is located within proximity range of kitchen speaker 607, as indicated by indicator 617. In some embodiments, computer system 600 can detect that it is within proximity condition range, as indicated by indicator 617, by using ultra-wideband sensors to send and/or receive high frequency radio waves. In some embodiments, a respective speaker (e.g., kitchen speaker 607, dining room speaker 613, or sunroom speaker 609) determines that computer system 600 is within the respective speaker's proximity condition range by receiving a confirmation signal from computer system 600 that indicates computer system 600 has detected an ultrasonic sound (e.g., a sound that cannot be detected by humans) that is output by the respective speaker. In some embodiments, computer system 600 determines that it is within a respective speaker's proximity condition range in response to detecting the respective speaker's playback of a media item (e.g., using microphones that are integrated into computer system 600).

At FIG. 6C, a determination is made that kitchen speaker 607 is not currently playing a media item. Because a determination is made that kitchen speaker 607 is not currently playing a media item, computer system 600 displays user interface 622 without controls for controlling kitchen speaker 607. That is, even though computer system 600 is located within proximity condition range as indicated by indicator 617, because kitchen speaker 607 is not currently playing back a media item, user interface 622 does not include media playback controls. In some embodiments, the determination is made that kitchen speaker 607 is not currently playing a media item and has not recently played a media item. At FIG. 6C, the user of computer system 600 provides voice command 625 that instructs a virtual assistant (e.g., a virtual assistance that corresponds to kitchen speaker 607 and/or computer system 600) to initiate playback of a media item on kitchen speaker 607.

Figure 6D:
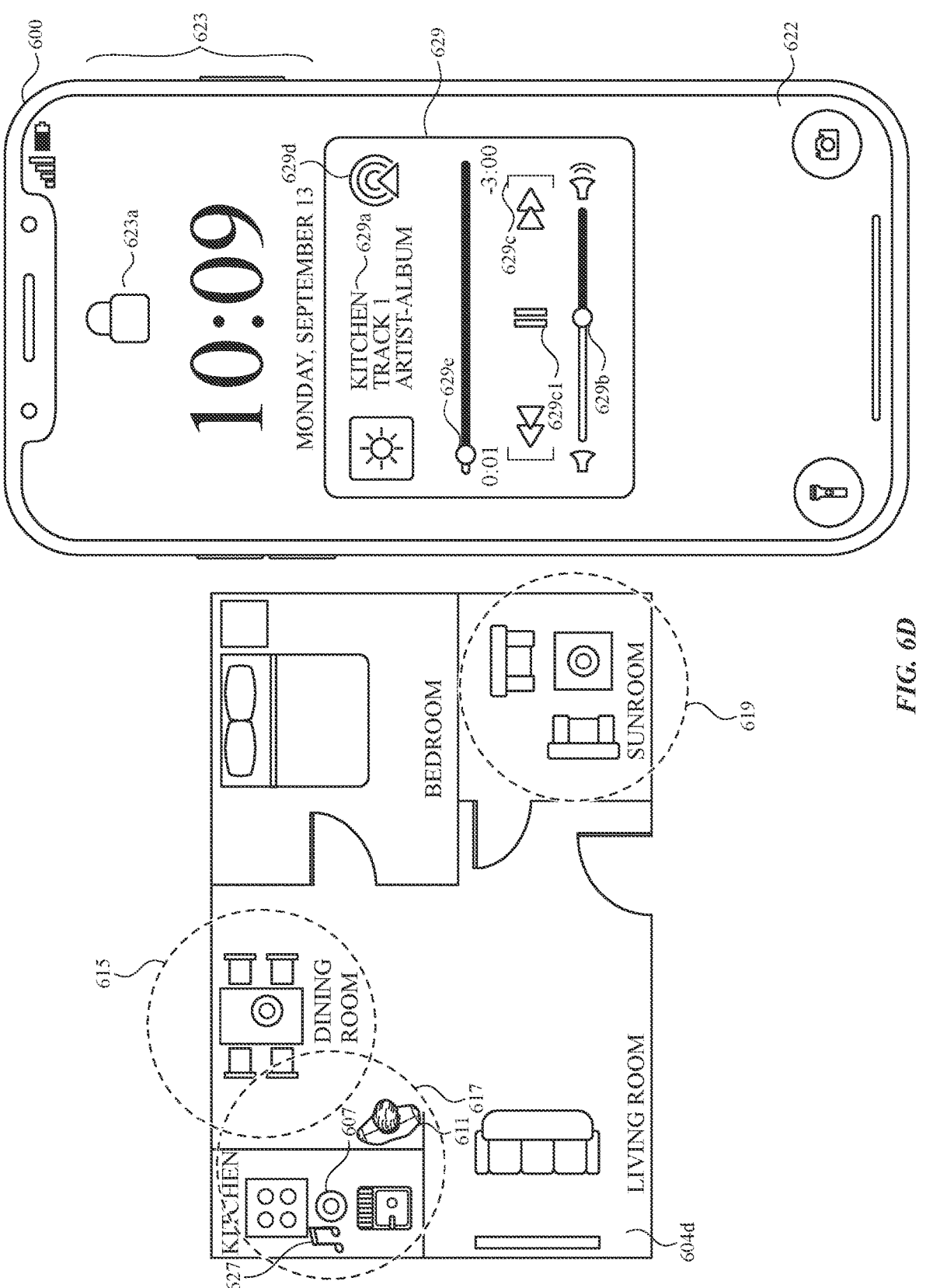

At FIG. 6D, voice command 625 is detected (e.g., by computer system 600 and/or kitchen speaker 607). In response to the detection of voice command 625, kitchen speaker 607 begins playback of a media item, as indicated by music icon 627.

At FIG. 6D, while kitchen speaker 607 is playing music, computer system 600 transitions from a sleep state to a non-sleep state. In response to transitioning from the sleep state to the non-sleep state, computer system 600 displays user interface 622. At FIG. 6D, a determination is made that computer system 600 is located within proximity of kitchen speaker 607, as indicated by indicator 617, and that kitchen speaker 607 is currently playing back a media item. As illustrated in FIG. 6D, because the determination is made that that computer system 600 is within proximity of kitchen speaker 607 and that kitchen speaker 607 is currently playing back a media item, user interface 622 includes media controls 629 for controlling kitchen speaker 607. As illustrated in FIG. 6D, computer system 600 concurrently displays media controls and first content 623. As indicated by lock icon 623a, media controls 629 are displayed while computer system 600 is locked. In some embodiments, media controls 629 are displayed while computer system 600 is unlocked.

Media controls 629 include media item indicator 629a that indicates the media item that is currently being played back by kitchen speaker 607. Media item indicator 629a includes a track name of the media item currently playing back by kitchen speaker 607, the name of the artist of the media item, and the name of the targeted speaker device that is playing the media item (e.g., Kitchen). Further, media item indicator 629a includes a graphic to the left of the track name, representing an album cover that is associated with the media item.

Media controls 629 also include volume control affordance 629b. Volume control affordance 629b can be adjusted (e.g., by moving the volume control affordance to the left or to the right) to adjust the volume level of the media item that is being played back by the targeted speaker (e.g., kitchen speaker 607). Media controls 629 also include media progress indicator 629e (e.g., depicting a temporal progress through the media track (time elapsed) and the amount of time until the end of the current media item (time remaining)). Media controls 629 also include media playback controls 629c (e.g., that when selected, cause the targeted speaker device to perform different playback functions (e.g., pause playback of the current media item, resume playback of the current media item, progress to a next media item in a queue (e.g., playlist), play a previous media item in the queue)). Media controls 629 also include device selection affordance 629d, that, when selected, initiates a process for routing the media item that is currently being played back on the targeted speaker to a different playback device.

Figure 6E:
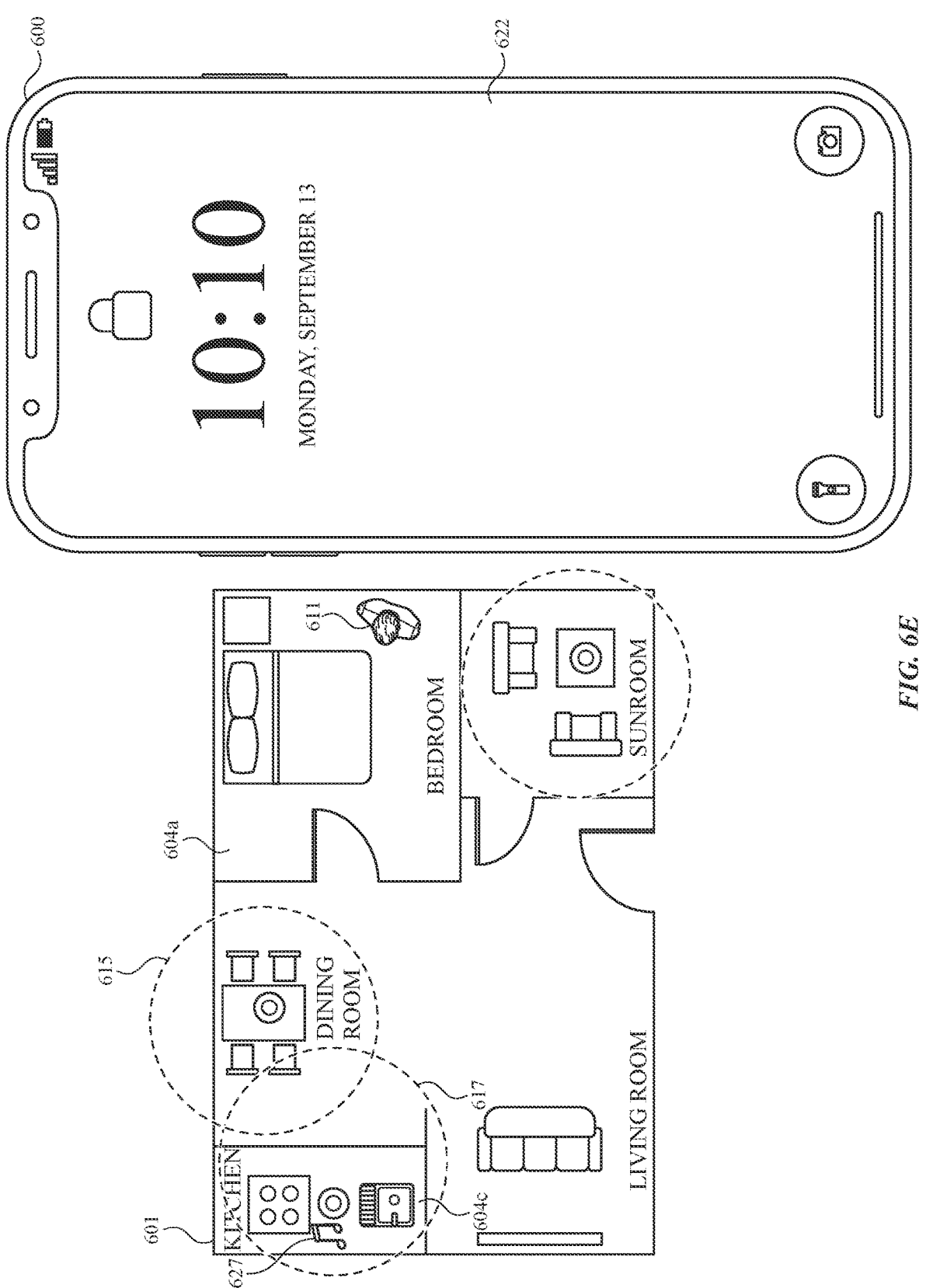

At FIG. 6E, computer system 600 has moved from kitchen 604c (e.g., in FIG. 6D) to bedroom 604a. As illustrated in FIG. 6E, kitchen speaker 607 continues to playback (e.g., as indicated by the display of music icon 627 in close proximity to kitchen speaker 607) the media item as described above in relation to FIG. 6D. After computer system 600 has moved from kitchen 604c to bedroom 604a, computer system 600 transitions from a sleep state to a non-sleep state. In response to transitioning from the sleep state to the non-sleep state, computer system displays user interface 622.

At FIG. 6E, a determination is made that computer system 600 is not within the proximity of kitchen speaker 607, as indicated by indicator 617, and that the user does not have an interest in the playback status of kitchen speaker 607. Because a determination is made that computer system 600 is not within proximity condition range of kitchen speaker 607 and that the user does not have an interest in the playback status of kitchen speaker 607 (or of any other speaker), user interface 622 does not include media controls 629. In some embodiments, computer system 600 can determine a user's interest in the playback status of a speaker device in a variety of ways that include, but is not limited to, detecting that the user elected to modify the playback status of a speaker device (e.g., pause the current playback of a media item, resume the playback of a media item, adjust the volume of the current playback of a media item, proceed to a next media in a queue). In some embodiments, a single determination (e.g., computer system 600 only determines that the user is not interested in the playback status of the targeted device or computer system 600 determines that it is not within proximity of kitchen speaker 607) would result in user interface 622 not including media controls 629.

Figure 6F:
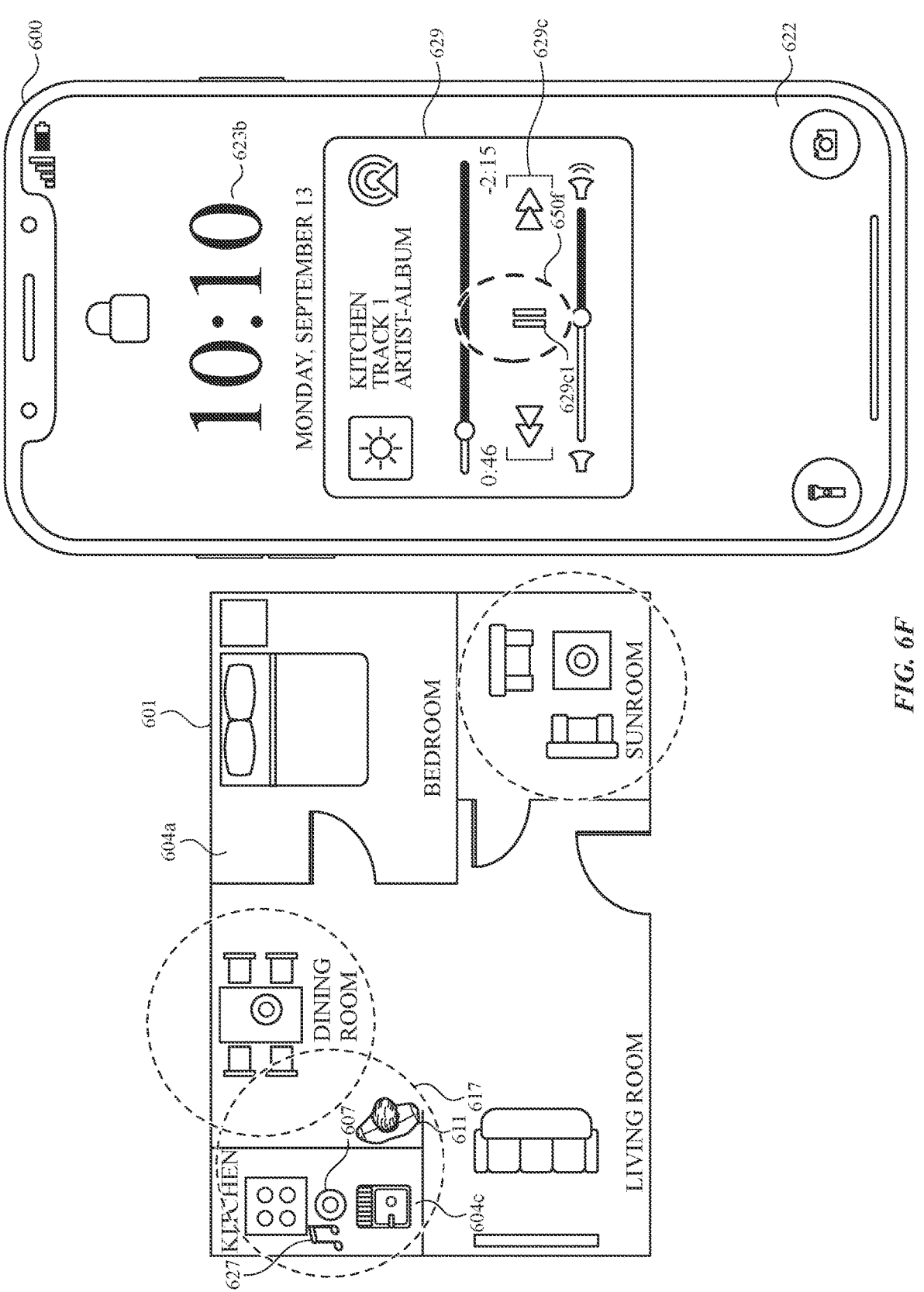

At FIG. 6F, computer system 600 has moved from bedroom 604a (e.g., in FIG. 6E) to kitchen 604c. After computer system 600 has moved from bedroom 604a to kitchen 604c, computer system 600 transitions from a sleep state to a non-sleep state.

At FIG. 6F, in response to transitioning from the sleep state to the non-sleep state, computer system 600 displays user interface 622. At FIG. 6F a determination is made that computer system 600 is within proximity of kitchen speaker 607 and that kitchen speaker 607 is currently playing a media item (e.g., as indicated music icon 627). Because a determination is made that computer system 600 is within proximity of kitchen speaker 607 and that kitchen speaker 607 is currently playing a media item, user interface 622 includes media controls 629 for controlling kitchen speaker 607 (e.g., as described above in relation to FIG. 6D). As illustrated in FIG. 6F, time indicator 623b indicates that the current time is 10:09. At FIG. 6F, computer system 600 detects tap gesture 650F on pause affordance 629c1.

Figure 6G:
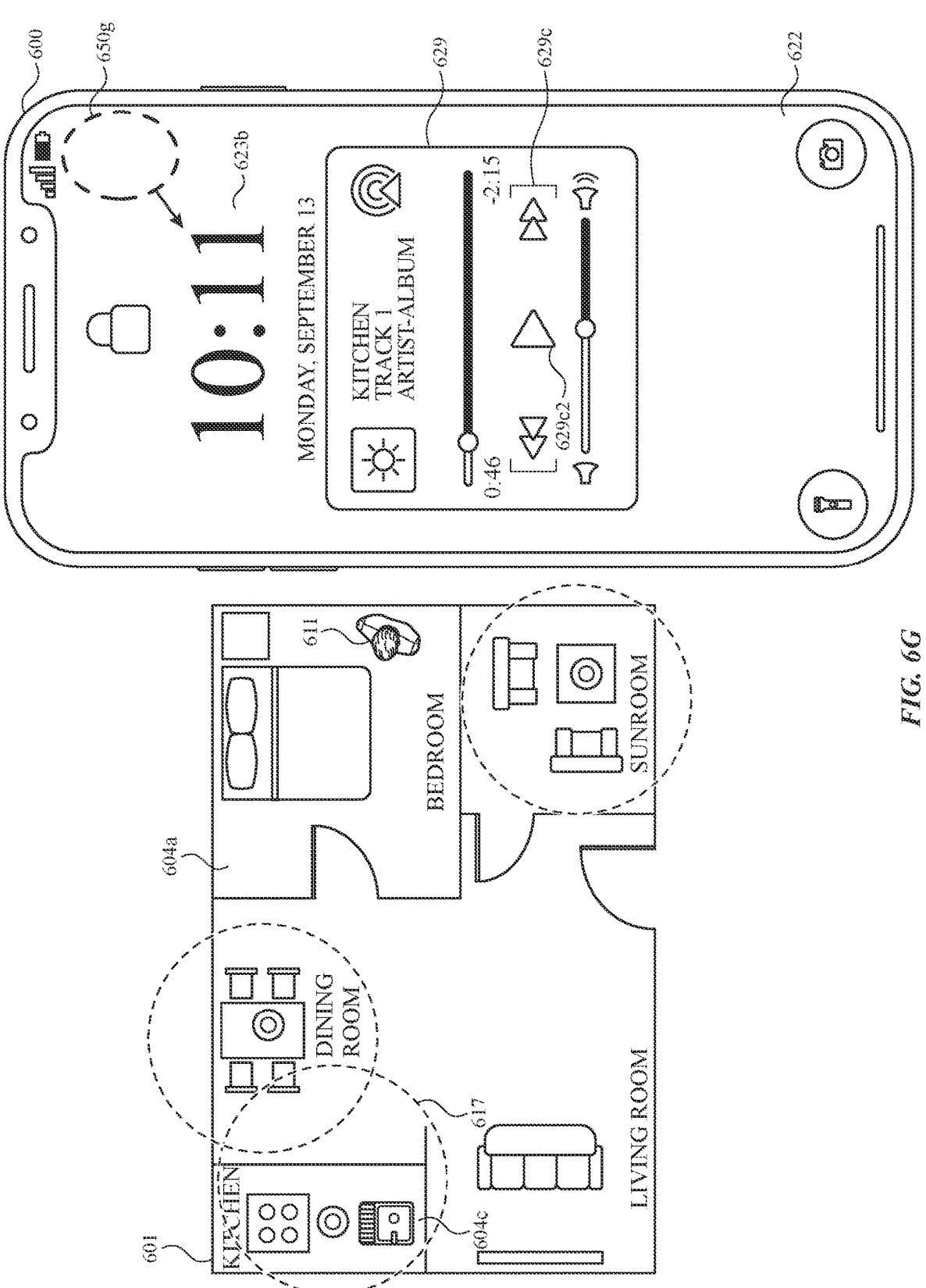

At FIG. 6G, in response to detecting tap gesture 650F, computer system 600 transmits instructions to kitchen speaker 607 to cease the playback of the media item that is currently being played back by kitchen speaker 607 (e.g., as depicted in FIG. 6F).

At FIG. 6G, computer system 600 has moved from kitchen 604c (e.g., in FIG. 6F) to bedroom 604a. After moving to bedroom 604a, computer system 600 transitions from a sleep state to a non-sleep state. In response to transitioning from the sleep state to the non-sleep state, computer system 600 redisplays user interface 622.

At FIG. 6G, a determination is made that computer system 600 satisfies predetermined conditions. The predetermined conditions include, but are not limited to, a condition that is satisfied when media controls 629 were previously used to modify a playback status of a targeted speaker device (e.g., kitchen speaker 607 in FIG. 6F) and/or a condition that is satisfied when a speaker device that is targeted by computer system 600 recently ceased the playback of a media item. Further, at FIG. 6G, a determination is made that computer system 600 redisplays user interface 622 (e.g., transitions from a sleep state to a non-sleep state) within a predetermined amount of time (e.g., 5 minutes, 8 minutes, 10 minutes, or any other suitable amount of time) since media controls 629 were previously displayed by computer system 600 (e.g., since media controls 629 were displayed by computer system 600 in FIG. 6F). As illustrated in FIG. 6G, time indicator 623b indicates that the current time is 10:11 (e.g., one minute has elapsed since the display of media controls 629 in FIG. 6F).

Because a determination is made that computer system 600 satisfies predetermined conditions and that computer system 600 redisplays user interface 622 within the predetermined amount of time (in some embodiments, a predetermined amount of time condition does not have to be satisfied), the display of user interface 622 includes media controls 629 for controlling kitchen speaker 607 even though computer system 600 is not positioned within proximity range of kitchen speaker 607, as indicated by indicator 617, and kitchen speaker 607 is not playing back a media item. In some embodiments, when user interface 622 is redisplayed outside of the predetermined amount of time, user interface 622 is displayed without media controls 629 (e.g., regardless of whether media controls 629 were previously used to modify a playback status of a targeted speaker device). In some embodiments, selection of media controls 629 that are displayed as part of the redisplay of user interface 622 can be used to initiate playback of a media item on a targeted device. At FIG. 6G, computer system 600 detects swipe gesture 650g.

Figure 6H:
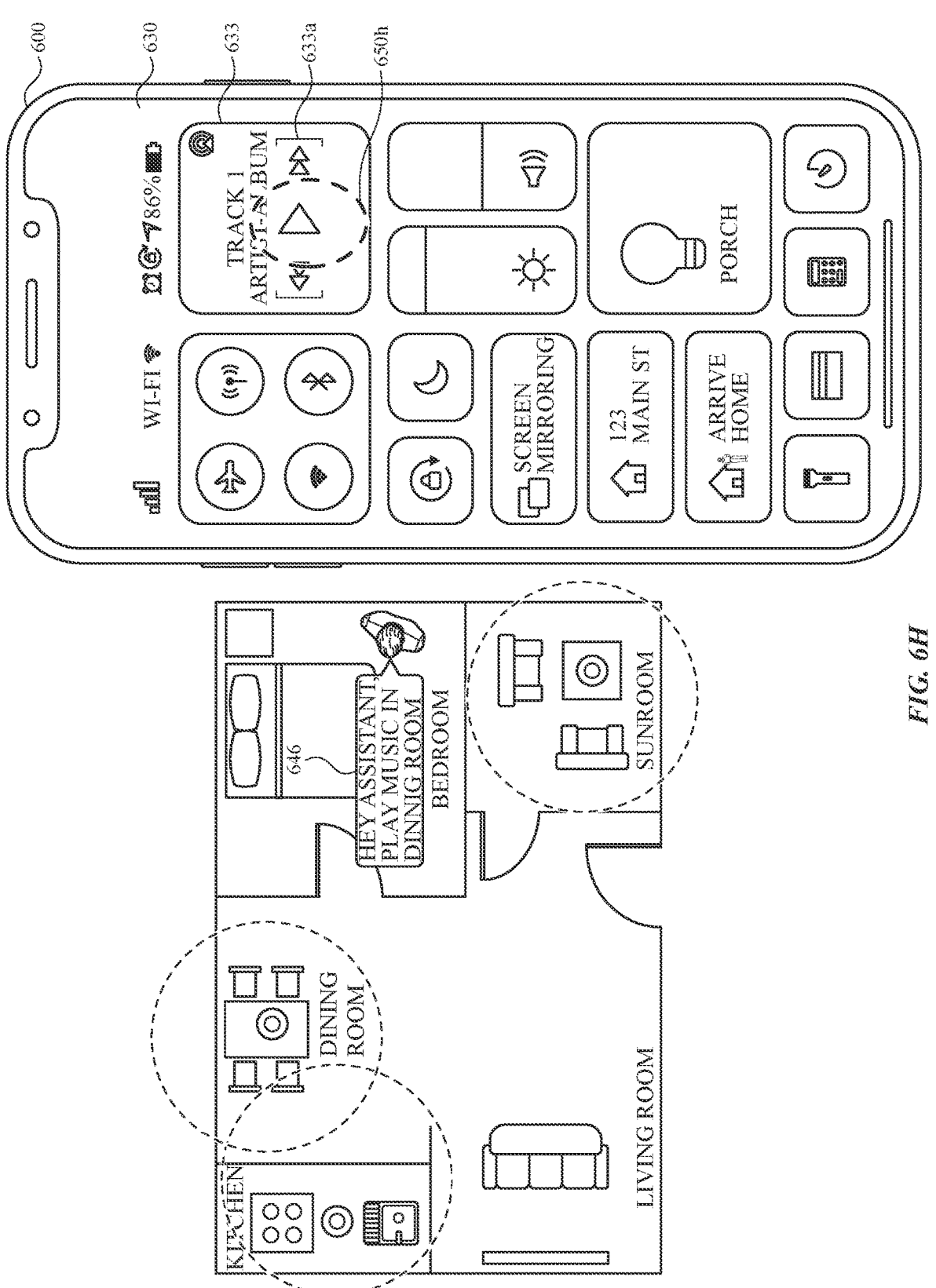

As illustrated in FIG. 6H, in response to detecting swipe gesture 650g, computer system 600 displays user interface 630. User interface 630 includes subgroup of media controls 633. Similar to media controls 629, subgroup of media controls 633 include an indication of the title of the media item that is configured to playback on a targeted device and an indication of the artist of the media item. Further, subgroup of media controls 633 includes subgroup of media playback controls 633a. Subgroup of media playback controls 633a, when selected, cause computer system 600 to transmit instructions to a targeted device that causes the targeted device to modify its playback status. In some embodiments, computer system 600 displays user interface 630 in response to two or more inputs (e.g., two or more inputs performed by a user) instead of a swipe gesture.

As shown in FIG. 6G, subgroup of media controls 633 are a subset of the controls that are included in media controls 629. In some embodiments, subgroup of media controls 633 include volume control affordance 629b (e.g., as described above in relation to FIG. 6D) and media progress indicator 629e (e.g., as described above in relation to FIG. 6D). At FIG. 6H, computer system 600 detects tap gesture 650h. Further, at FIG. 6H, the user provides voice command 646 instructing a virtual assistant (e.g., a virtual assistance that corresponds to dining room speaker 613 and/or computer system 600) to initiate playback of music on dining room speaker 613.

Figure 6I:
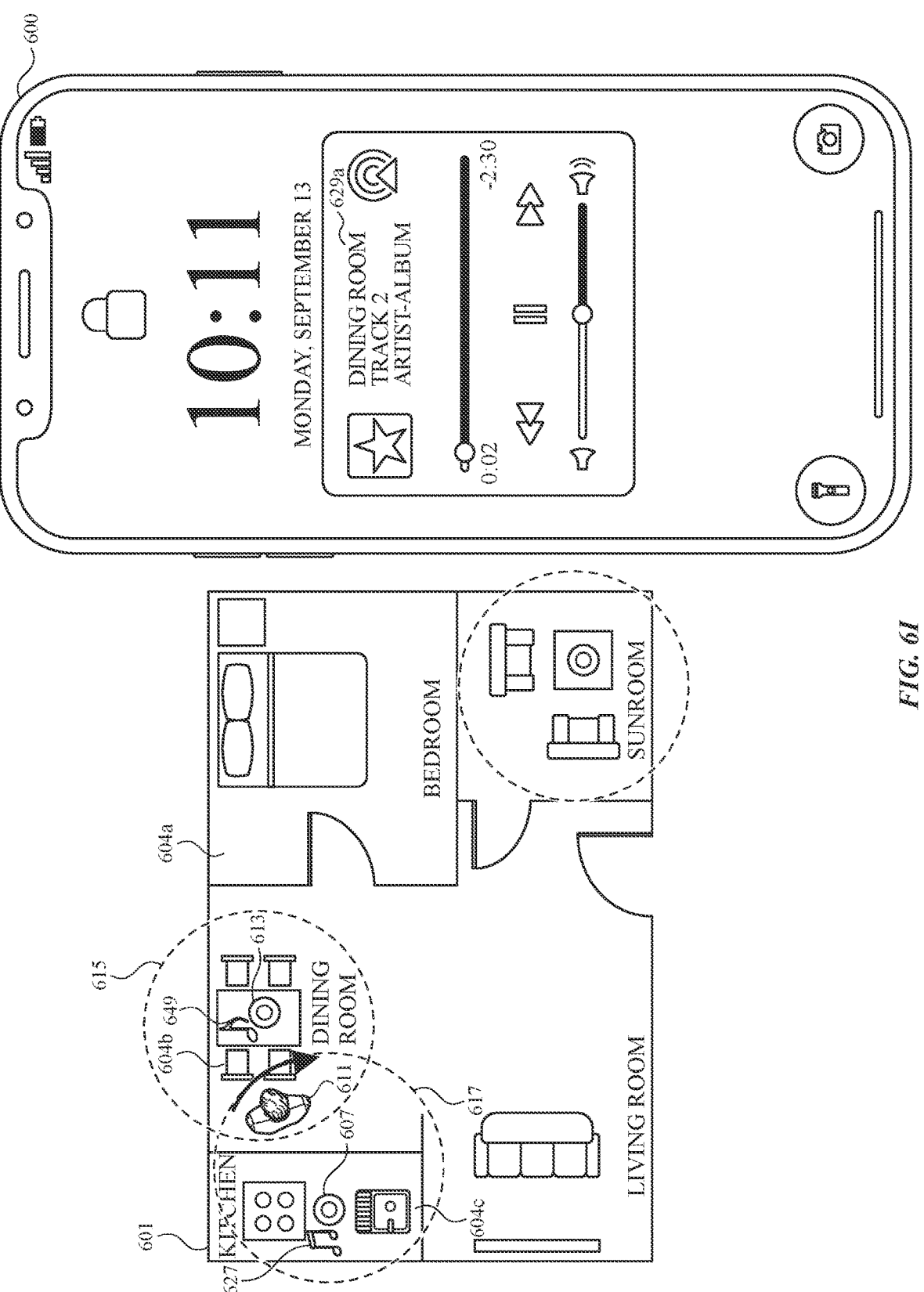

At FIG. 6I, voice command 646 is detected (e.g., by computer system 600). In response to the voice command 646, dining room speaker 613 initiates playback of a media item (e.g., as indicated by music icon 649). At FIG. 6I, in response to detecting tap gesture 650h, computer system 600 transmits an instruction to kitchen speaker 607 to initiate playback of a different media item (e.g., different than the media item that is played back on dining room speaker 613) (e.g., as indicated by music icon 627). At FIG. 6I, both kitchen speaker 607 and dining room speaker 613 are concurrently playing different media items. At FIG. 6I computer system 600 has moved from bedroom 604a (e.g., in FIG. 6H) to dining room 604b. After moving to dining room 604b, computer system 600 transitions from a sleep state to a non-sleep state. In response to transitioning from the sleep state to the non-sleep state, computer system 600 displays user interface 622.

As illustrated in FIG. 6I, computer system 600 is positioned within proximity of kitchen speaker 607, as indicated by indicator 617, and within proximity of dining room speaker 613, as indicated by indicator 615. At FIG. 6I, a determination is made that computer system 600 is positioned closer to dining room speaker 613 than kitchen speaker 607. Because a determination is made that computer system 600 is positioned closer to dining room speaker 613 than kitchen speaker 607, computer system 600 displays user interface 622 that includes media controls 629 for controlling the playback of the media item currently being played back by dining room speaker 613.

As illustrated in FIG. 6I, media item indicator 629a indicates the name of the media item and the artist of the media item that is being played back by dining room speaker 613. Further, media item indicator 629a indicates that dining room speaker 613 is currently being targeted by computer system 600. In some embodiments, computer system 600 displays user interface 622 that includes media controls 629 for controlling the playback of a media item currently being played back on a speaker that computer system 600 detected first and not the speaker that is closest to computer system 600. At FIG. 6I, the spatial positioning of computer system 600 is redirected (e.g., due to the user turning his body) such that computer system 600 becomes pointed towards kitchen speaker 607, as indicated by the arrow near indication 611.

Figure 6J:
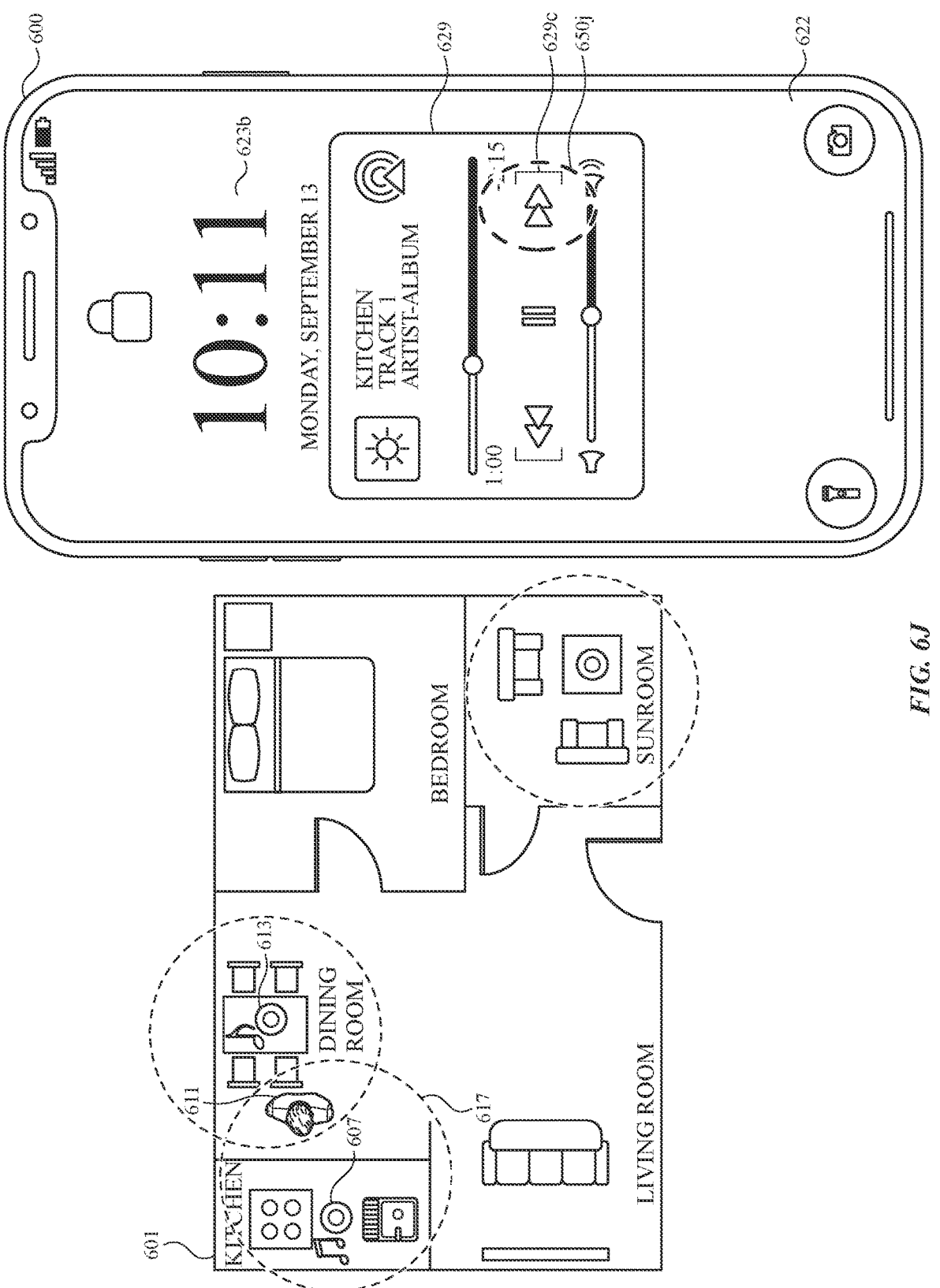

At FIG. 6J, while computer system is pointed towards kitchen speaker 607, computer system 600 transitions from a sleep state to a non-sleep state. In response to transitioning from the sleep state to the non-sleep state, computer system 600 redisplays user interface 622. At FIG. 6J, a determination is made that kitchen speaker 607 is currently playing music and that computer system 600 is pointed towards kitchen speaker 607. Because a determination is made that kitchen speaker 607 is currently playing music and that computer system 600 is pointed towards kitchen speaker 607, user interface includes media controls 629 for controlling kitchen speaker 607. That is, even though computer system 600 is positioned closer to dining room speaker 613, because computer system is pointed towards kitchen speaker 607, media controls 629 correspond to kitchen speaker 607 and not dining room speaker 613. At FIG. 6J, computer system 600 detects tap gesture 650*j*.

Figure 6K:
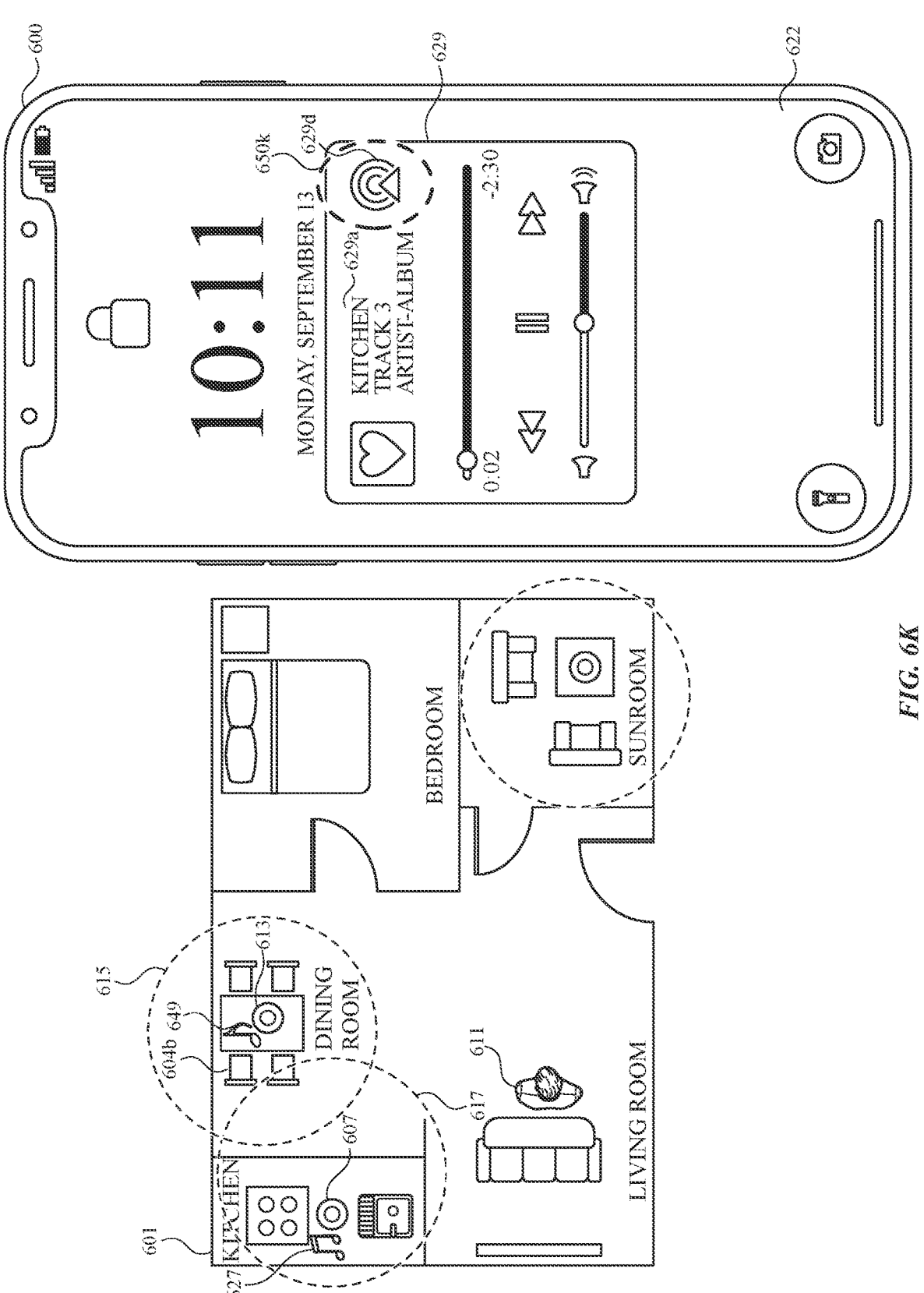

At FIG. 6K, in response to detecting tap gesture 650*j*, computer system 600 sends instructions to kitchen speaker 607 to initiate playback of a new media item. At FIG. 6K, as indicated by the positioning of indication 611 in schematic diagram 601, computer system 600 has moved from dining room 604*b* (e.g., in FIG. 6J) to living room 604*d*. Further, schematic diagram 601 shows that computer system 600 is no longer within proximity of dining room speaker 613 and kitchen speaker 607.

At FIG. 6K a determination is made that kitchen speaker 607 is currently playing back a media item (e.g., as indicated by music icon 627) and a determination is made that the user is interested in the playback status of kitchen speaker 607 (e.g., the determination that the user is interested in the playback status of kitchen speaker 607 is made as a result of the user providing an input to modify the playback status of kitchen speaker 607 in FIG. 6J). Though computer system 600 is no longer within proximity of kitchen speaker 607, because a determination is made that kitchen speaker 607 is currently playing back a media item and that the user is interested in the playback status of kitchen speaker 607, computer system 600 continues to (e.g., maintains) display of user interface 622 that includes media controls 629 for controlling kitchen speaker 607.

As illustrated in FIG. 6K, display of media controls 629 is updated to indicate that kitchen speaker 607 is playing a new media item than what kitchen speaker 607 was playing prior to computer system 600 detecting tap gesture 650*j*. In some embodiments, computer system 600 determines that the user is interested in the playback status of kitchen speaker 607 in response to detecting an input, that is different than tap gesture 650*j* (e.g., an input that corresponds to a different affordance of media playback controls 629*c*), that corresponds to media controls 629. At FIG. 6K, computer system 600 detects tap gesture 650*k* that corresponds to selection of device selection affordance 629*d*.

Figure 6L:
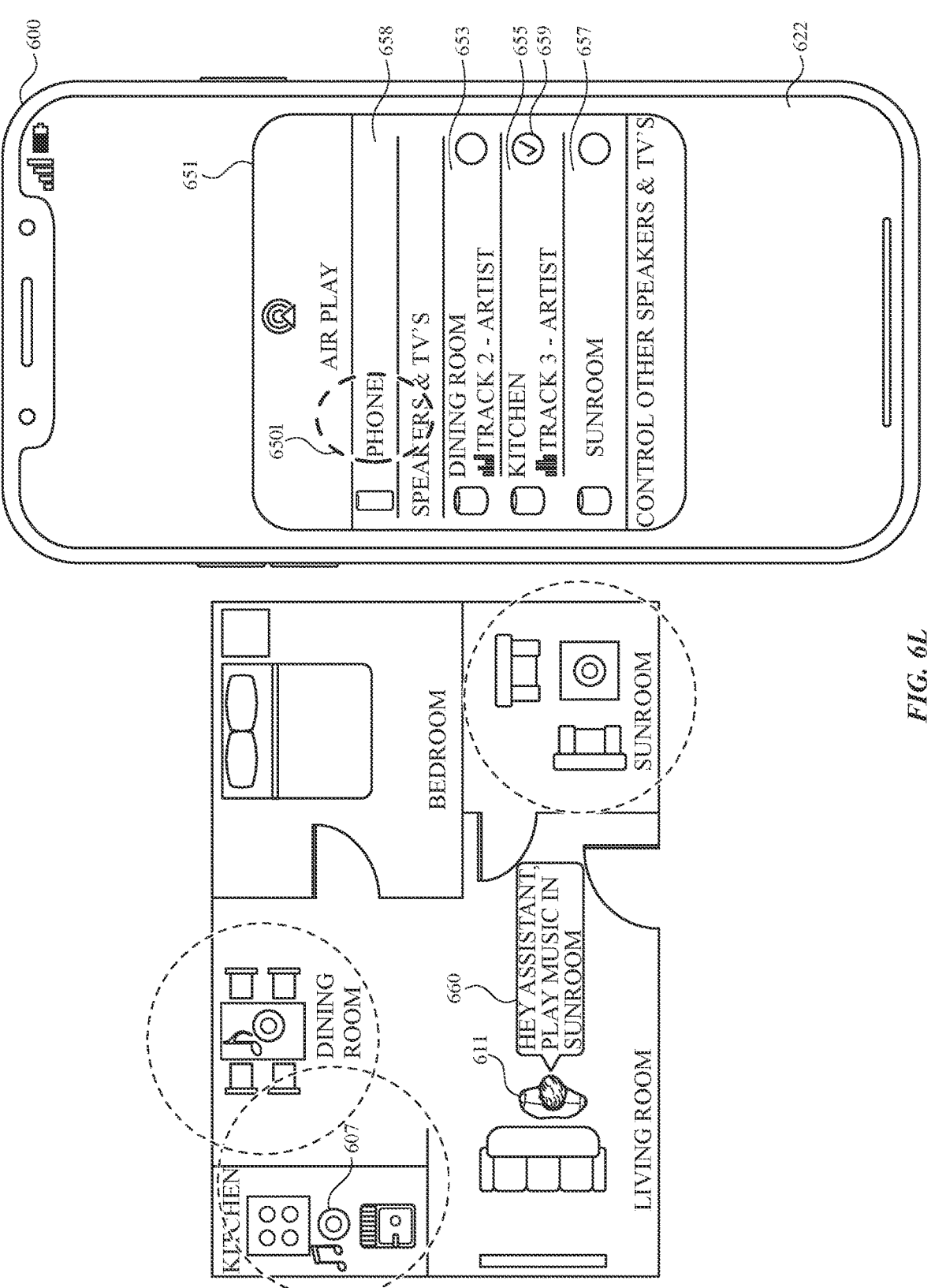

As illustrated in FIG. 6L, in response to detecting tap gesture 650*k*, computer system 600 displays media output user interface 651. As illustrated in FIG. 6L, media output user interface 651 includes phone output affordance 658, dining room output affordance 653, kitchen output affordance 655, and sunroom output affordance 657. Kitchen output affordance 655 is displayed with selection indication 659 to indicate that media (e.g., media that is represented by media item indicator 629*a* in FIG. 6K) is configured to be played back (and/or controlled) via kitchen speaker 607. In some embodiments, when a device is configured to play back media, the device is currently outputting the media. At FIG. 6L, computer system 600 detects tap gesture 650*l* on phone output affordance 658. Further, at FIG. 6L, the user provides voice command 660 instructing a virtual assistant (e.g., a virtual assistance that corresponds to sunroom speaker 609 and/or computer system 600) to initiate playback of music on sunroom speaker 609.

Figure 6M:
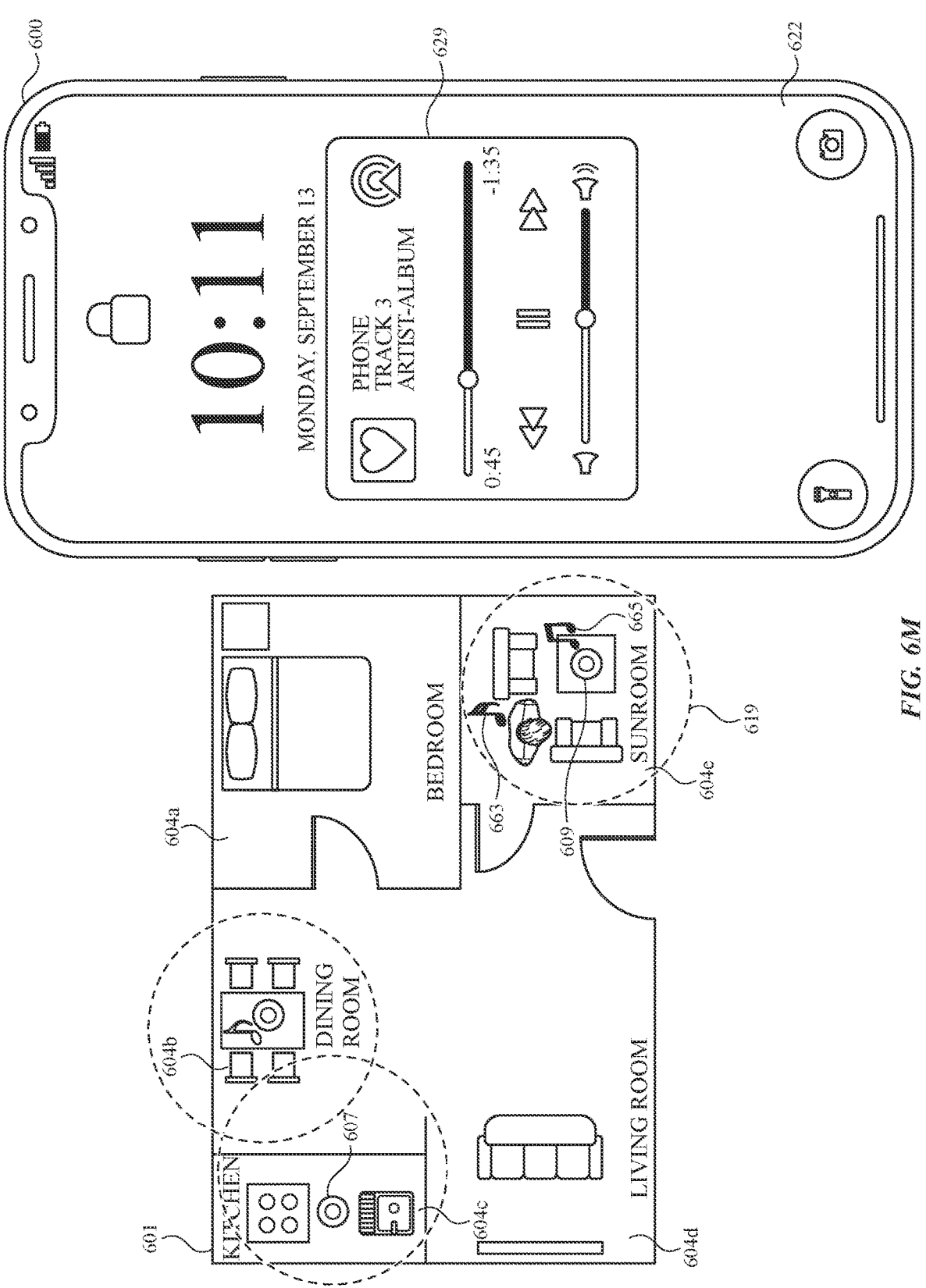

At FIG. 6M, in response to detecting tap gesture 650*l*, computer system 600 transmits instructions to kitchen speaker 607 to cease the playback of the media item that was playing on kitchen speaker 607 (e.g., in FIG. 6L) and initiates playback of said media item on computer system 600 (e.g., as indicated by music icon 663). At FIG. 6M, voice command 660 is detected (e.g., by computer system 600 and/or sunroom speaker 609). In response to the detection of voice command 660, sunroom speaker 609 initiates playback of a media item (e.g., a media item that is different than the media item being played back by computer system 600), as indicated by music icon 665.

At FIG. 6M, schematic diagram 601 shows that computer system 600 has moved from living room 604*d* (e.g., in FIG. 6L) to sunroom 604*e*. As illustrated in FIG. 6M, computer system 600 is within proximity of sunroom speaker 609, as indicated by indicator 619. After computer system 600 has moved from living room 604*d* to sunroom 604*e*, computer system 600 transitions from a sleep state to a non-sleep state.

At FIG. 6M, in response to computer system 600 transitioning from a sleep state to a non-sleep state, computer system 600 displays user interface 622. At FIG. 6M, a determination is made that computer system 600 is currently playing back a media item. In response to making the determination that computer system 600 is currently playing back a media item, computer system displays user interface 622 with media controls 629 for controlling the media item that is currently being played back by computer system 600. That is, though computer system 600 is within proximity range of sunroom speaker 609, as indicated by indicator 619, and sunroom speaker 609 is currently playing a media item, because computer system 600 is currently playing back a media item, user interface 622 includes media controls 629 for controlling the playback of media on computer system 600 and does not include media controls for controlling the playback of sunroom speaker 609.

FIG. 7 is a flow diagram illustrating a method for displaying media controls using a computer system in accordance with some embodiments. Method 700 is performed at a computer system (e.g., 100, 300, 500) (e.g., a smartphone, a desktop computer, a laptop, a tablet, and/or a smartwatch) that is in communication with a display generation component (e.g., a display controller, a touch-sensitive display system). In some embodiments, the computer system is in communication with one or more input devices (e.g., a touch-sensitive surface). In some embodiments, the computer system is in communication with an external media playback device. Some operations in method 700 are, optionally, combined, the orders of some operations are, optionally, changed, and some operations are, optionally, omitted.

As described below, method 700 provides an intuitive way for displaying media controls. The method reduces the cognitive burden on a user for accessing media controls thereby creating a more efficient human-machine interface. For battery-operated computing devices, enabling a user to access media controls faster and more efficiently conserves power and increases the time between battery charges.

The computer system receives (700) a first request (e.g., 650*a*) (e.g., movement of the computer system (upward movement of the computer system in a direction towards a user's face), tactile input (e.g., swipe gesture, tap gesture) on the display generation component) to display a first user interface (e.g., 622) (e.g., a lock screen user interface (e.g., a user interface that is displayed while the computer system's functionality is limited) (e.g., displayed when the computer system is in a locked state)).

In response to receiving the first request to display the first user interface, the computer system displays (704), via the display generation component, the first user interface, wherein displaying the first user interface includes, in accordance with a determination that a first set of external media playback device control criteria is met, wherein the first set of external media playback device control criteria includes a criterion that is met when the computer system is within a predetermined threshold distance (e.g., 615, 617, 619) of an external media playback device (e.g., 607, 609, 613) (e.g., a speaker, television, and/or digital media player), the computer system concurrently displays (706) first content (e.g., 623) (e.g., a graphical indication of the current time of day, a graphical indication of the date of current day, a graphical indication (e.g., lock icon) of the computer system's accessibility status, a camera user interface object (e.g., that when selected causes the computer system to launch a camera application)), and/or one or more representations of text) and a first plurality of media control user interface objects (e.g., 629), (e.g., a play user interface object, a pause user interface object, a next track user interface object, a previous track user interface object, and/or a volume control slider) wherein the first plurality of media control user interface objects includes a first media control user interface object that, when selected, causes the external media playback device to perform a first media playback function (e.g., begin playback of media, pause or stop the playback of media, transition from the currently playing media to different media, a fast-forward operation, a rewind operation, and/or a volume increase or decrease operation) and a second media control user interface object (e.g., different from the first media control user interface object) that, when selected, causes the external media playback device to perform a second media playback function that is different from the first media playback function and in accordance with a determination that the first set of external media playback device control criteria is not met, the computer system displays (708) the first content without displaying the first plurality of media control user interface objects. In some embodiments, the computer system transmits a command directly or indirectly (e.g., via a server) to the external media playback device to cause the external media playback device to perform the first/second media playback function. In some embodiments, the plurality of media control user interface objects are displayed in-between a first portion of the first content (e.g., a graphical indication of the current time of day, a graphical representation of the date of the current day) and a second portion of the first content (e.g., a camera user interface object). In some embodiments, in accordance with the determination that the set of external media playback device control criteria is met, the display of the first user interface is updated to include the plurality of media control user interface objects. In some embodiments, the plurality of media controls is not displayed over the first content that is included in the first user interface (e.g., the plurality of media controls are displayed on a portion of the first user interface that does not include the first content). In some embodiments, the plurality of media controls is displayed underneath (e.g., all of) the first content. In some embodiments, in response to receiving the first request to display the first user interface and in accordance with a determination that a set of information-only criteria are met, the computer system displays information regarding a media item that is currently being played back without displaying the first plurality of media control user interface objects. In some embodiments, the determination that the first set of external media playback device control criteria is met occurs independent of (e.g., any) user inputs (e.g., the determination occurs automatically) on (e.g., any) application associated with the computer system). In some embodiments, the set of external media playback device control criteria do not include any criterion based on the movement of the computer system (e.g., based on accelerometer data). In some embodiments, the set of external media playback device control criteria do not include any criterion based on a physical orientation of the computer system (e.g., based on accelerometer or gyroscope data). In some embodiments, the set of criteria includes a criterion that is met when a user and/or user account currently associated with the computer system meets a set of permission criteria. In some embodiments, the computer system determines that it is within the predetermined threshold distance of the external media playback device by detecting the output of an ultrasonic sound and/or media item by the external media playback device. In some embodiments, in accordance with a determination that the external media playback device is a first type of playback device type, the first plurality of media control user interface objects are of a first type and in accordance with a determination that the external media playback device is a second type of playback device type, the first plurality of media control user interface objects are of a second type. Displaying a plurality of media control user interface objects for an external media playback device when a first set of external media playback control criteria are met, that includes the computer system being proximate to the external media playback device, provides a user with visual feedback as to how close the computer system is to the external media playback device. Displaying a first plurality of media control user interface objects for controlling an external media playback device when a set of external media playback device control criteria are met conditionally provides the user with those user interface objects, without the user having to navigate specifically to those controls, which performs an operation when a set of conditions has been met without requiring further user input.

In some embodiments, the first set of external media playback device control criteria includes a criterion that is met when the computer system is not playing back (e.g., not currently playing back; not playing/causing playback of media at one or more speakers connected to or integrated into the computer system) a second media item (e.g., audio media item (e.g., music media item, podcast media item) video media item) (e.g., as seen in FIG. 6D). Displaying a first plurality of media control user interface objects under conditions that include the computer system not currently playing media provides the user with feedback as to the media playback state of the computer system, which provides improved visual feedback.

In some embodiments, displaying the first user interface includes (e.g., as seen in FIG. 6M), in accordance with a determination that the computer system is playing back (e.g., currently playing back; playing/causing playback of media at one or more speakers connected to or integrated into the computer system) (e.g., as indicated by music icon 663) a third media item, displaying a third media control user interface object that, when selected, causes the computer system to perform a third media playback function (e.g., begin playback of media, pause or stop the playback of media, transition from the currently playing media to different media, a fast-forward operation, a rewind operation, and/or a volume increase or decrease operation) (e.g., without causing the external media playback device to perform the third media function). In some embodiments, the computer system also displays a fourth media control user interface object (e.g., different from the third media control user interface object) that, when selected, causes the computer system to perform a fourth media playback function (e.g., without causing the external media playback device to perform the fourth media function) that is different from the third media playback function. In some embodiments, the computer system displays the third media control user interface object without displaying the first plurality of media control user interface objects. Automatically displaying a third media control user interface object that, when selected, causes the computer system to perform a playback function when certain prescribed conditions are satisfied (e.g., in accordance with a determination that the computer system is playing back a third media item) provides the user with the ability to control the playback of a media item that is currently being played back by the computer system when the required conditions are met, which performs an operation when a set of conditions has been met without requiring further user input.

In some embodiments, the first set of external media playback device control criteria includes a criterion that is met when the external media playback device is playing back (e.g., currently playing back; playing/causing playback of media at one or more speakers connected to or integrated into the computer system) a fourth media item (e.g., an audio media item, a video media item) (e.g., as seen in FIG. 6C). In some embodiments, the first set of external media playback device control criteria include a criterion that is met when a user (e.g., user account) associated with the computer system is authorized to remotely control the external media playback device. In some embodiments, the first set of external media playback control criteria includes a criterion that is met when media playback (e.g., currently active media playback) at the external media playback device was initiated by the user of the computer system. Displaying a first plurality of media control user interface objects under conditions that include the external media playback device is currently playing media provides the user with feedback as to the media playback state of the external media playback device, which provides improved visual feedback.

In some embodiments, while displaying, via the display generation component, the first plurality of media control user interface objects (e.g., 629) (e.g., as seen in FIG. 6K), the computer system receives an indication that the computer system is not within a second predetermined threshold distance (e.g., 615, 617, 619) of the external media playback device (e.g., 607, 609, 613) (e.g., as seen in FIG. 6K). In some embodiments, in response to receiving the indication that the computer system is not within the second predetermined threshold distance of the external media playback device and in accordance with a determination that a second set of external media playback device control criteria is met, the computer system continues to display (e.g., maintains display) the first plurality of media control user interface objects (e.g., 629) (e.g., as seen in FIG. 6K). In some embodiments, the indication is received directly from a component of the computer system, and/or from the external media playback device (e.g., via a wired or wireless connect). In some embodiments, the data is received via an intermediate server. In some embodiments, the second predetermined threshold distance is the same distance as the predetermined threshold distance. In some embodiments, in accordance with a determination that the second set of external media playback device criteria is not met, the computer system ceases display of the first plurality of media control user interface objects. In some embodiments, the display of the first content (e.g., a graphical representation of the current time of day) is updated while the computer system continues to (e.g., maintains) display the first plurality of media control user interface objects. Continuing to display the first plurality of media control user interface objects when the computer system is not within a predetermined distance of the external media playback device, when certain prescribed conditions are satisfied provides the user with the ability to reposition the computer system to a position that is away from the external media playback device while still being able to view and access the first plurality of media control user interface objects on the computer system, which performs an operation when a set of conditions has been met without requiring further user input.

In some embodiments, the second set of external media playback device control criteria includes a criterion that is met when a user has modified a media playback status (e.g., adjusted playback of media, paused or stopped the playback of media, transitioned from a currently playing media item to different media, performed a fast-forward operation, performed a rewind operation, and/or increased or decreased the volume of the playback of media a media item) of the external media playback device (e.g., 607 in FIG. 6J) (e.g., as seen in FIG. 6J) using the first plurality of media control user interface objects (e.g., 629 in FIG. 6J) and a criterion that is met when the external media playback device is playing back (e.g., currently playing back) a fifth media item (e.g., as indicated by music icon 627 in FIG. 6K). Continuing to display the first plurality of media control user interface objects while the external media playback device is playing back a media item and after a user has controlled the external media playback device using the first plurality of media provides the user with visual feedback regarding an external media playback device that is of specific interest to the user, which provides improved visual feedback.

In some embodiments, after displaying and ceasing to display the first plurality of media control user interface objects (e.g., and while the computer system is not displaying the first plurality of media control user interface objects), the computer system receives a request (e.g., 650a) (e.g., movement of the computer system (upward movement of the computer system in a direction towards a user's face), tactile input (e.g., swipe gesture, tap gesture) on the display generation component) to redisplay the first user interface (e.g., 622 as described above in relation to FIG. 6G). In some embodiments, the computer system is not within the predetermined threshold distance of the external media playback device when the request to redisplay the first user interface is received) (e.g., as seen in FIG. 6G). In some embodiments, in response to receiving the request to redisplay the first user interface, the computer system redisplays, via the display generation component, the first user interface (e.g., 622 in FIG. 6G). In some embodiments, redisplaying the first user interface includes, in accordance with a determination that a third set of external media playback device control criteria, different from the first set of external media playback device control criteria, is met (e.g., the third set of external media playback device control criteria include: a criterion that is met when the external media playback device has recently stopped the playback of a media item and/or a criterion that is met when controls for the external media playback device were recently used) displaying, via the display generation component, the first plurality of media control user interface objects. In some embodiments, the redisplay of the first user interface includes an updated display of the first content. In some embodiments, the third set of external media playback device control criteria does not include a distance-based criterion or includes a distance-based criterion that is based on a second predetermined threshold distance, greater than the predetermined threshold distance. Automatically displaying the first plurality of media control user interface objects when certain prescribed conditions are satisfied, provides the user with information with respect to a media item that is associated (e.g., recently played by the external media playback device) with the external media playback device and provides the user with the ability to control the playback functions of the external media playback device, which provides improved visual feedback and performs an operation when a set of conditions has been met without requiring further user input.

In some embodiments, the third set of external media playback device control criteria include a criterion that is met when the request to redisplay the first user interface is received within a predetermined amount of time (e.g., 5 minutes, 8 minutes, 10 minutes, and/or any other suitable amount of time) since a predetermined condition occurred (e.g., as discussed above in relation to FIG. 6G). In some embodiments, the predetermined condition is receipt of the request to display the first user interface. In some embodiments, the predetermined condition is ceasing display of the first plurality of media control user interface objects. Redisplaying the first user interface in response to receiving a request to redisplay the first user interface under conditions that include the request to redisplay the first user interface was received within a predetermined amount of time since the request to initially display the first user interfaces, provides the user with feedback as to the recency of when the first user interface was initially displayed, which provides improved visual feedback.

In some embodiments, the computer system is in communication with a first external media playback device (e.g., 607, 609, 613) (e.g., a speaker, television, and/or digital media player) and a second external media playback device (e.g., 607, 609, 613) (e.g., the second external media playback device is a same type of device as the first external media playback device). In some embodiments, the computer system is within the predetermined threshold distance (e.g., 615, 617, 619) of the first external media playback device and the second external media playback device (e.g., as seen in FIG. 6I). In some embodiments, in accordance with a determination that the first external media playback device meets a first set of selection criteria, the external media playback device is the first external media playback device. In some embodiments, in accordance with a determination that the second external media playback device meets a second set of selection criteria, the external media playback device is the second external media playback device (e.g., as discussed above in relation to FIG. 6I). In some embodiments, while the first external media playback device meets the first set of selection criteria and in accordance with a determination that computer system 600 is directed (e.g. pointed by a user) in a direction of the second external media playback device, the second is the external media playback device. In some embodiments, the first and second sets of selection criteria are the same. In some embodiments, the first and second sets of selection criteria are different. Automatically displaying a first plurality of media control user interface objects that corresponds to a respective external media playback device when certain prescribed conditions are satisfied (e.g., in accordance with a determination that the respective external media playback device meets a set of selection criteria) automatically prioritizes the display of controls for one external media playback device over the display of controls for a different external media playback device, which performs an operation when a set of conditions has been met.

In some embodiments, the first set of selection criteria includes a criterion that is met when the first external media playback device is detected (e.g., detected by the computer system) before detecting the second external media playback device (e.g., as discussed above in relation to FIG. 6I).

In some embodiments, the first set of selection criteria includes a criterion that is met when the first external media playback device is closer (e.g., the first external media playback device is at a position that is closer to the computer system than the position of the second external media playback device) to the computer system than the second external media playback device (e.g., as seen in FIG. 6I). In some embodiments, the set of selection criteria include criterion that is met when the first external media playback device is closer to the computer system than the second external media playback device and when the first external media playback device is detected before detecting the second external media playback device. Displaying the first plurality of media control user interface objects that corresponds to a first external media playback device when the first external media playback device is closer to the computer system than a second external media playback device provides the user with feedback as to the detected proximities of the external devices relative to the computer system, which provides improved visual feedback.

In some embodiments, the first plurality of media control user interface objects (e.g., 629) are displayed while the computer system is in a locked state (e.g., as seen in FIGS. 6D, 6F, 6G, 6I, 6K and 6M)(e.g., where at least some functionality of the computer system is not accessible without requiring authentication (e.g., password authentication, biometric authentication, etc.) as opposed to an unlocked state (e.g., wherein access to at least some functionality of the computer system does not require authentication (e.g., password authentication, biometric authentication))). Displaying a first plurality of media control user interface objects while the computer system is in a locked state provides a user with information regarding a media item, which provides improved visual feedback.

In some embodiments, while displaying the first plurality of media control user interface objects (e.g., 629 in FIG. 6G), the computer system receives a set of one or more user inputs (e.g., 650G) (e.g., a swipe input) (e.g., the user input is received while the phone is locked). In some embodiments, in response to receiving the set of one or more user inputs, the computer system displays a second user interface (e.g., 630) (e.g., different from the first user interface) (e.g., a control center (e.g., user interface with a plurality of selectable user interface objects that control (e.g., set) one or more settings on the computer system (e.g., one or more Wi-Fi settings, Bluetooth settings, display settings (e.g., brightness controls), sound settings) or one or more accessory devices that are in communication with the computer system)). In some embodiments, displaying the second user interface includes displaying a second plurality (e.g., a subset of the first plurality of media control user interface objects) of media control user interface objects (e.g., 633) that includes a fourth media control user interface object (e.g., 633a) that, when selected, causes the external media playback device to perform a third media playback function. In some embodiments, the second plurality of media control user interface objects is different from the first plurality of user interface objects. In some embodiments, the second and first plurality of media control user interface objects are the same.

In some embodiments, the first plurality of media control user interface objects includes an indication (e.g., 629a in FIG. 6D) (e.g., a graphical indication (e.g., an image) or textual indication) of a sixth media item that is currently being played back (e.g., currently being played back) by the external media playback device (e.g., 607 in FIG. 6D)). Displaying an indication of a media item that is currently being played back by the external media playback device allows a user to quickly and easily ascertain information with respect to the media item that is being played back by the computer, which provides improved visual feedback.

In some embodiments, the computer system includes an ultra-wideband transmitter and/or receiver. In some embodiments, a distance between the computer system and the external media playback device is determined based on data obtained from the ultra-wideband transmitter and/or receiver.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to allow a user to control a playback status of a speaker device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver geo-targeted content based on the location of the user that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location services, the present technology can be configured to allow users to select to "opt in" or "opt out" of participation in the collection of personal information data during registration for services or anytime thereafter. In another example, users can select not to provide location data for targeted media services. In yet another example, users can select to limit the length of time location data is maintained or entirely prohibit the development of a geographic profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media playback controls can be provided to user by inferring a user's media playback habits and preferences based on non-personal information data or a bare minimum amount of personal information, such as the content being requested by the device associated with a user, other non-personal information available to the computer system, or publicly available information.

What is claimed is:

1. A computer system configured to communicate with a display generation component, comprising:

one or more processors; and memory storing one or more programs configured to be executed by the one or more processors, the one or more programs including instructions for:

receiving a first request to display a first user interface;

in response to receiving the first request to display the first user interface and without receiving further user input, displaying, via the display generation component, the first user interface, wherein displaying the first user interface includes:

in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes:

a first media control user interface object that, when selected, causes the computer system to transmit a first command to the external media playback device to perform a first media playback function; and a second media control user interface object that, when selected, causes the computer system to transmit a second command to the external media playback device to perform a second media playback function that is different from the first media playback function; and in accordance with a determination that the first set of external media playback device control criteria is not met, displaying the first content without displaying the first plurality of media control user interface objects;

while displaying, via the display generation component, the first plurality of media control user interface objects, receiving an indication that the computer system is not within a second predetermined threshold distance of the external media playback device; and in response to receiving the indication that the computer system is not within the second predetermined threshold distance of the external media playback device:

in accordance with a determination that a second set of external media playback device control criteria is met, continuing to display the first plurality of media control user interface objects; and in accordance with a determination that the second set of external media playback device control criteria is not met, ceasing to display the first plurality of media control user interface objects.

2. The computer system of claim 1, wherein the first set of external media playback device control criteria includes a criterion that is met when the computer system is not playing back a first media item.

3. The computer system of claim 1, wherein displaying the first user interface includes:

in accordance with a determination that the computer system is playing back a second media item, displaying a third media control user interface object that, when selected, causes the computer system to perform a third media playback function.

4. The computer system of claim 1, wherein the first set of external media playback device control criteria includes a criterion that is met when the external media playback device is playing back a third media item.

5. The computer system of claim 1, wherein the second set of external media playback device control criteria includes:

a criterion that is met when a user has modified a media playback status of the external media playback device using the first plurality of media control user interface objects; and a criterion that is met when the external media playback device is playing back a fourth media item.

6. The computer system of claim 1, wherein the one or more programs further include instructions for:

after displaying and ceasing to display the first plurality of media control user interface objects, receiving a request to redisplay the first user interface; and in response to receiving the request to redisplay the first user interface, redisplaying, via the display generation component, the first user interface, wherein redisplaying the first user interface includes:

in accordance with a determination that a third set of external media playback device control criteria, different from the first set of external media playback device control criteria, is met, displaying, via the display generation component, the first plurality of media control user interface objects.

7. The computer system of claim 6, wherein the third set of external media playback device control criteria include a criterion that is met when the request to redisplay the first user interface is received within a predetermined amount of time since a predetermined condition occurred.

8. The computer system of claim 1, wherein the computer system is in communication with a first external media playback device and a second external media playback device, wherein the computer system is within the predetermined threshold distance of the first external media playback device and the second external media playback device, and wherein:

in accordance with a determination that the first external media playback device meets a first set of selection criteria, the external media playback device is the first external media playback device; and in accordance with a determination that the second external media playback device meets a second set of selection criteria, the external media playback device is the second external media playback device.

9. The computer system of claim 8, wherein the first set of selection criteria includes a criterion that is met when the first external media playback device is detected before detecting the second external media playback device.

10. The computer system of claim 8, wherein the first set of selection criteria includes a criterion that is met when the first external media playback device is closer to the computer system than the second external media playback device.

11. The computer system of claim 1, wherein the first plurality of media control user interface objects is displayed while the computer system is in a locked state.

12. The computer system of claim 1, wherein the one or more programs further include instructions for:

while displaying the first plurality of media control user interface objects, receiving a set of one or more user inputs; and in response to receiving the set of one or more user inputs, displaying a second user interface, wherein displaying the second user interface includes displaying a second plurality of media control user interface objects that includes a fourth media control user interface object that, when selected, causes the external media playback device to perform a third media playback function.

13. The computer system of claim 1, wherein the first plurality of media control user interface objects includes an indication of a fifth media item that is currently being played back by the external media playback device.

14. The computer system of claim 1, wherein the computer system includes an ultra-wideband transmitter and/or receiver, and wherein a distance between the computer system and the external media playback device is determined based on data obtained from the ultra-wideband transmitter and/or receiver.

15. A non-transitory computer-readable storage medium storing one or more programs configured to be executed by one or more processors of a computer system that is in communication with a display generation component, the one or more programs including instructions for:

receiving a first request to display a first user interface;

in response to receiving the first request to display the first user interface and without receiving further user input, displaying, via the display generation component, the first user interface, wherein displaying the first user interface includes:

in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes:

a first media control user interface object that, when selected, causes the computer system to transmit a first command to the external media playback device to perform a first media playback function; and a second media control user interface object that, when selected, causes the computer system to transmit a second command to the external media playback device to perform a second media playback function that is different from the first media playback function; and in accordance with a determination that the first set of external media playback device control criteria is not met, displaying the first content without displaying the first plurality of media control user interface objects;

while displaying, via the display generation component, the first plurality of media control user interface objects, receiving an indication that the computer system is not within a second predetermined threshold distance of the external media playback device; and in response to receiving the indication that the computer system is not within the second predetermined threshold distance of the external media playback device:

in accordance with a determination that a second set of external media playback device control criteria is met, continuing to display the first plurality of media control user interface objects; and in accordance with a determination that the second set of external media playback device control criteria is not met, ceasing to display the first plurality of media control user interface objects.

16. The non-transitory computer-readable storage medium of claim 15, wherein the first set of external media playback device control criteria includes a criterion that is met when the computer system is not playing back a first media item.

17. The non-transitory computer-readable storage medium of claim 15, wherein displaying the first user interface includes:

in accordance with a determination that the computer system is playing back a second media item, displaying a third media control user interface object that, when selected, causes the computer system to perform a third media playback function.

18. The non-transitory computer-readable storage medium of claim 15, wherein the first set of external media playback device control criteria includes a criterion that is met when the external media playback device is playing back a third media item.

19. The non-transitory computer-readable storage medium of claim 15, wherein the second set of external media playback device control criteria includes:

a criterion that is met when a user has modified a media playback status of the external media playback device using the first plurality of media control user interface objects; and a criterion that is met when the external media playback device is playing back a fourth media item.

20. The non-transitory computer-readable storage medium of claim 15, wherein the one or more programs further include instructions for:

after displaying and ceasing to display the first plurality of media control user interface objects, receiving a request to redisplay the first user interface; and in response to receiving the request to redisplay the first user interface, redisplaying, via the display generation component, the first user interface, wherein redisplaying the first user interface includes:

in accordance with a determination that a third set of external media playback device control criteria, different from the first set of external media playback device control criteria, is met, displaying, via the display generation component, the first plurality of media control user interface objects.

21. The non-transitory computer-readable storage medium of claim 20, wherein the third set of external media playback device control criteria include a criterion that is met when the request to redisplay the first user interface is received within a predetermined amount of time since a predetermined condition occurred.

22. The non-transitory computer-readable storage medium of claim 15, wherein the computer system is in communication with a first external media playback device and a second external media playback device, wherein the computer system is within the predetermined threshold distance of the first external media playback device and the second external media playback device, and wherein:

in accordance with a determination that the first external media playback device meets a first set of selection criteria, the external media playback device is the first external media playback device; and in accordance with a determination that the second external media playback device meets a second set of selection criteria, the external media playback device is the second external media playback device.

23. The non-transitory computer-readable storage medium of claim 22, wherein the first set of selection criteria includes a criterion that is met when the first external media playback device is detected before detecting the second external media playback device.

24. The non-transitory computer-readable storage medium of claim 22, wherein the first set of selection criteria includes a criterion that is met when the first external media playback device is closer to the computer system than the second external media playback device.

25. The non-transitory computer-readable storage medium of claim 15, wherein the first plurality of media control user interface objects is displayed while the computer system is in a locked state.

26. The non-transitory computer-readable storage medium of claim 15, wherein the one or more programs further include instructions for:

while displaying the first plurality of media control user interface objects, receiving a set of one or more user inputs; and in response to receiving the set of one or more user inputs, displaying a second user interface, wherein displaying the second user interface includes displaying a second plurality of media control user interface objects that includes a fourth media control user interface object that, when selected, causes the external media playback device to perform a third media playback function.

27. The non-transitory computer-readable storage medium of claim 15, wherein the first plurality of media control user interface objects includes an indication of a fifth media item that is currently being played back by the external media playback device.

28. The non-transitory computer-readable storage medium of claim 15, wherein the computer system includes an ultra-wideband transmitter and/or receiver, and wherein a distance between the computer system and the external media playback device is determined based on data obtained from the ultra-wideband transmitter and/or receiver.

29. A method, comprising:

at a computer system that is in communication with a display generation component:

receiving a first request to display a first user interface;

in response to receiving the first request to display the first user interface and without receiving further user input, displaying, via the display generation component, the first user interface, wherein displaying the first user interface includes:

in accordance with a determination that a first set of external media playback device control criteria is met, wherein the first set of external media playback device control criteria includes a criterion that is met when the computer system is within a predetermined threshold distance of an external media playback device, concurrently displaying first content and a first plurality of media control user interface objects, wherein the first plurality of media control user interface objects includes:

a first media control user interface object that, when selected, causes the computer system to transmit a first command to the external media playback device to perform a first media playback function; and a second media control user interface object that, when selected, causes the computer system to transmit a second command to the external media playback device to perform a second media playback function that is different from the first media playback function; and in accordance with a determination that the first set of external media playback device control criteria is not met, displaying the first content without displaying the first plurality of media control user interface objects;

while displaying, via the display generation component, the first plurality of media control user interface objects, receiving an indication that the computer system is not within a second predetermined threshold distance of the external media playback device; and in response to receiving the indication that the computer system is not within the second predetermined threshold distance of the external media playback device:

in accordance with a determination that a second set of external media playback device control criteria is met, continuing to display the first plurality of media control user interface objects; and in accordance with a determination that the second set of external media playback device control criteria is not met, ceasing to display the first plurality of media control user interface objects.

30. The method of claim 29, wherein the first set of external media playback device control criteria includes a criterion that is met when the computer system is not playing back a first media item.

31. The method of claim 29, wherein displaying the first user interface includes:

in accordance with a determination that the computer system is playing back a second media item, displaying a third media control user interface object that, when selected, causes the computer system to perform a third media playback function.

32. The method of claim 29, wherein the first set of external media playback device control criteria includes a criterion that is met when the external media playback device is playing back a third media item.

33. The method of claim 29, wherein the second set of external media playback device control criteria includes:

a criterion that is met when a user has modified a media playback status of the external media playback device using the first plurality of media control user interface objects; and a criterion that is met when the external media playback device is playing back a fourth media item.

34. The method of claim 29, further comprising:

after displaying and ceasing to display the first plurality of media control user interface objects, receiving a request to redisplay the first user interface; and in response to receiving the request to redisplay the first user interface, redisplaying, via the display generation component, the first user interface, wherein redisplaying the first user interface includes:

in accordance with a determination that a third set of external media playback device control criteria, different from the first set of external media playback device control criteria, is met, displaying, via the display generation component, the first plurality of media control user interface objects.

35. The method of claim 34, wherein the third set of external media playback device control criteria include a criterion that is met when the request to redisplay the first user interface is received within a predetermined amount of time since a predetermined condition occurred.

36. The method of claim 29, wherein the computer system is in communication with a first external media playback device and a second external media playback device, wherein the computer system is within the predetermined threshold distance of the first external media playback device and the second external media playback device, and wherein:

in accordance with a determination that the first external media playback device meets a first set of selection criteria, the external media playback device is the first external media playback device; and in accordance with a determination that the second external media playback device meets a second set of selection criteria, the external media playback device is the second external media playback device.

37. The method of claim 36, wherein the first set of selection criteria includes a criterion that is met when the first external media playback device is detected before detecting the second external media playback device.

38. The method of claim 36, wherein the first set of selection criteria includes a criterion that is met when the first external media playback device is closer to the computer system than the second external media playback device.

39. The method of claim 29, wherein the first plurality of media control user interface objects is displayed while the computer system is in a locked state.

40. The method of claim 29, further comprising:

while displaying the first plurality of media control user interface objects, receiving a set of one or more user inputs; and in response to receiving the set of one or more user inputs, displaying a second user interface, wherein displaying the second user interface includes displaying a second plurality of media control user interface objects that includes a fourth media control user interface object that, when selected, causes the external media playback device to perform a third media playback function.

41. The method of claim 29, wherein the first plurality of media control user interface objects includes an indication of a fifth media item that is currently being played back by the external media playback device.

42. The method of claim 29, wherein the computer system includes an ultra-wideband transmitter and/or receiver, and wherein a distance between the computer system and the external media playback device is determined based on data obtained from the ultra-wideband transmitter and/or receiver.

\* \* \* \* \*